(12) United States Patent
Eckhoff et al.

(10) Patent No.: US 8,427,014 B2
(45) Date of Patent: Apr. 23, 2013

(54) SYSTEM INCLUDING WEARABLE POWER RECEIVER AND WEARABLE POWER-OUTPUT DEVICE

(75) Inventors: Philip Andrew Eckhoff, Bellevue, WA (US); William Gates, Redmond, WA (US); Peter L. Hagelstein, Carlisle, MA (US); Roderick A. Hyde, Redmond, WA (US); Jordin T. Kare, Seattle, WA (US); Robert Langer, Newton, MA (US); Eric C. Leuthardt, St. Louis, MO (US); Erez Lieberman, Cambridge, MA (US); Nathan P. Myhrvold, Bellevue, WA (US); Michael Schnall-Levin, Cambridge, MA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 250 days.

(21) Appl. No.: 12/800,244

(22) Filed: May 11, 2010

(65) Prior Publication Data
US 2011/0278956 A1 Nov. 17, 2011

(51) Int. Cl.
*H02J 7/00* (2006.01)
(52) U.S. Cl.
USPC ........................................................ 307/150
(58) Field of Classification Search .................. 307/150, 307/104
See application file for complete search history.

(56) References Cited

U.S. PATENT DOCUMENTS

| | | | |
|---|---|---|---|
| 5,283,722 A | 2/1994 | Koenen et al. | |
| 5,437,277 A | 8/1995 | Dumoulin et al. | |
| 5,816,676 A | 10/1998 | Koenen Myers et al. | |
| 6,388,422 B1 | 5/2002 | Lew | |
| 6,476,581 B2 | 11/2002 | Lew | |
| 6,626,901 B1 | 9/2003 | Treat et al. | |
| 6,955,444 B2 | 10/2005 | Gupta | |
| 7,076,206 B2 | 7/2006 | Elferich et al. | |
| 7,083,613 B2 | 8/2006 | Treat | |
| 7,128,741 B1 * | 10/2006 | Isaacson et al. | 606/41 |
| 7,210,810 B1 | 5/2007 | Iversen et al. | |
| 7,211,079 B2 | 5/2007 | Treat | |

(Continued)

OTHER PUBLICATIONS

"E-cell Rechargeable Fuel Cells"; notabattery.com; 2006-2007; p. 1; E-Village, Inc.; located at http://www.notabattery.com/index.htm; printed on Jul. 24, 2009.

(Continued)

*Primary Examiner* — Daniel Cavallari
(74) *Attorney, Agent, or Firm* — Workman Nydegger

(57) ABSTRACT

Described embodiments include a system, apparatus, and method. A described system includes a power-receiving connector configured to be usable after sterilization, to releasably couple with a power-source connector, and configured to be carried by a health care provider proximate to a first body portion. If coupled, the power-receiving connector is operable to receive an electrical or radiant power from the power-source connector. The system also includes a power-output device configured to be usable after sterilization, to interact with a power-receiving device connected to a handheld medical device, and configured to be carried by the health care provider proximate to a second body portion. If interacting, the received electrical or radiant power is transferred from the power-output device to the power-receiving device. The system further includes a wearable connective structure configured to be usable after sterilization, and to transfer the received electrical or radiant power from the power-receiving connector to the power-output device.

51 Claims, 41 Drawing Sheets

U.S. PATENT DOCUMENTS

| | | | |
|---|---|---|---|
| 7,211,080 | B2 | 5/2007 | Treat et al. |
| 7,245,956 | B2 | 7/2007 | Matthews et al. |
| 7,317,159 | B2 | 1/2008 | Adachi et al. |
| 7,382,104 | B2 | 6/2008 | Jacobson et al. |
| 7,462,951 | B1 | 12/2008 | Baarman |
| 7,489,111 | B2 | 2/2009 | Wise |
| 7,531,917 | B2 | 5/2009 | Stone et al. |
| 7,839,018 | B2 | 11/2010 | Chen et al. |
| 7,863,859 | B2 | 1/2011 | Soar |
| 7,952,322 | B2 | 5/2011 | Partovi et al. |
| 8,004,235 | B2 | 8/2011 | Baarman et al. |
| 8,049,370 | B2 | 11/2011 | Azancot et al. |
| 8,076,797 | B2 | 12/2011 | Kramer et al. |
| 8,188,619 | B2 | 5/2012 | Azancot et al. |
| 8,195,304 | B2 | 6/2012 | Strother et al. |
| 8,324,759 | B2 | 12/2012 | Karalis et al. |
| 8,339,096 | B2 | 12/2012 | Osada |
| 2001/0021108 | A1 | 9/2001 | Shimada et al. |
| 2003/0214255 | A1 | 11/2003 | Baarman et al. |
| 2004/0130915 | A1 | 7/2004 | Baarman |
| 2004/0130916 | A1 | 7/2004 | Baarman |
| 2005/0010992 | A1 | 1/2005 | Klotz et al. |
| 2005/0058893 | A1 | 3/2005 | O'Neal |
| 2005/0117327 | A1 | 6/2005 | Gupta |
| 2006/0122592 | A1 | 6/2006 | Treat |
| 2006/0142751 | A1 | 6/2006 | Treat et al. |
| 2006/0285315 | A1 | 12/2006 | Tufenkjian |
| 2006/0285316 | A1 | 12/2006 | Tufenkjian et al. |
| 2007/0018797 | A1 | 1/2007 | Chen et al. |
| 2007/0055304 | A1 | 3/2007 | Whitman |
| 2007/0060795 | A1 | 3/2007 | Vayser et al. |
| 2007/0139003 | A1 | 6/2007 | Paul |
| 2007/0208330 | A1 | 9/2007 | Treat et al. |
| 2007/0298846 | A1 | 12/2007 | Greene et al. |
| 2008/0018303 | A1 | 1/2008 | Scheucher |
| 2008/0084187 | A1 | 4/2008 | Cutrona |
| 2008/0114349 | A1 | 5/2008 | Treat |
| 2008/0258681 | A1 | 10/2008 | Baarman et al. |
| 2008/0278264 | A1 | 11/2008 | Karalis et al. |
| 2009/0058361 | A1 | 3/2009 | John |
| 2009/0108997 | A1 | 4/2009 | Petterson et al. |
| 2010/0007307 | A1 | 1/2010 | Baarman et al. |
| 2010/0109445 | A1 | 5/2010 | Kurs et al. |
| 2010/0164296 | A1 | 7/2010 | Kurs et al. |
| 2010/0181964 | A1 | 7/2010 | Huggins et al. |
| 2010/0264747 | A1 | 10/2010 | Hall et al. |
| 2010/0280676 | A1 | 11/2010 | Pabon et al. |
| 2011/0022033 | A1* | 1/2011 | Guzman .......................... 606/1 |
| 2011/0031928 | A1 | 2/2011 | Soar |
| 2011/0101788 | A1 | 5/2011 | Sun et al. |
| 2011/0262415 | A1 | 10/2011 | Grimaldi et al. |
| 2011/0278942 | A1 | 11/2011 | Eckhoff et al. |
| 2011/0278943 | A1 | 11/2011 | Eckhoff et al. |
| 2011/0278944 | A1 | 11/2011 | Eckhoff et al. |
| 2011/0278957 | A1 | 11/2011 | Eckhoff et al. |
| 2011/0282415 | A1 | 11/2011 | Eckhoff et al. |
| 2012/0062378 | A1 | 3/2012 | Bolling |
| 2012/0153893 | A1 | 6/2012 | Schatz et al. |

OTHER PUBLICATIONS

"ecoupled real intelligent wireless power video channel"; eCoupled Wireless Power Technology; 2009; p. 1-6; Fulton Innovation, Inc.; located at http://www.ecoupled.com/?_kk=wireless%20power&_kt=061e . . . ; printed on May 18, 2009.

"eCoupled Technology"; 2009; p. 1-10; Fulton Innovation.

"Extended Life Wearable Battery Pack"; Aqua Communications, Inc.; p. 1-2; Aqua Communications, Inc.; located at www.snakeeye.com; printed on May 14, 2009.

"Features and Benefits"; Powermat; 2009; p. 1; Powermat Ltd.; located at http://www.pwrmat.com/features.html; printed on May 28, 2009.

"First International Wireless Power Consortium Pursues Standard"; Press Release—Wireless Power Consortium; Dec. 17, 2008; p. 1-2; Wireless Power Consortium; located at http://www.wirelesspowerconsortium.com/news/press-releases/first-international-wireless-power-consortium-pursues-standard.html; printed on May 28, 2009.

"House Without Wires"; Powermat; 2009; p. 1; Powermat Ltd.; located at http://www.pwrmat.com/no-wires.html; printed on May 28, 2009.

Karalis, et al.; "Efficient wireless non-radiative mid-range energy transfer"; Annals of Physics; 2008; p. 34-48; vol. 323; Elsevier Inc.; printed on May 20, 2009.

"Lithium Batteries for wearable power"; Advanced Battery Technology; Feb. 1999; p. 1-2; Battery Engineering Inc.; located at http://findarticles.com/p/articles/mi_qa3864/is_199902/ai_n8834694/; printed on May 14, 2009.

Ma, et al.; "Wearable Computers in the Operating Room Environment"; Human-Computer Interaction. Interaction Platforms and Techniques; 2007; p. 1165-1172 (1st page provided); vol. 4551/2007; Springer Berlin/Heidelberg; printed on May 14, 2009.

"Major Update to Medical Electrical Equipment Standard"; 60601-1, The Third Edition; 2009; p. 1; AAMI Publications: Standards; located at http://www.aami.org/publications/standards/60601.html; printed on May 18, 2009.

Matthews; "Fuel cells dominate DoD Wearable Power contest"; Army Times; Nov. 3, 2008; p. 1-3; located at http://www.armytimes.com/news/2008/11/army_wearablepower; printed on May 15, 2009.

"Overview"; Powermat; 2009; p. 1; Powermat Ltd.; located at http://www.pwrmat.com/products.html; printed on May 28, 2009.

"Patents"; eCoupled Wireless Power Technology; 2009; p. 1-4; Fulton Innovation, Inc.; located at http://ecoupled.com/technologyPatents.html; printed on Aug. 3, 2009.

"Powermat—The future of wireless power has arrived"; Powermat; 2009; p. 1; Powermat Ltd.; located at http://www.pwrmat.com/ ; printed on May 28, 2009.

"Radiant power"; Photonics Dictionary; 1996-2009; p. 1; Laurin Publishing; located at http://www.photonics.com/directory/dictionary/lookup.asp?url=1 . . . ; printed on May 26, 2009.

"SilverGlide Non-Stick Bipolar Forceps"; Stryker Neuro Spine ENT; 2007; p. 1-5; Stryker; USA; printed on May 18, 2009.

"Technology approach"; Splashpower; p. 1; Splashpower.com; located at http://splashpower.com/Technology; printed on May 14, 2009.

"The Design"; Powermat; 2009; p. 1; Powermat Ltd.; located at http://www.pwrmat.com/design.html; printed on May 28, 2009.

"The Powermat System"; Powermat; 2009; p. 1-3; HoMedics Powermat North America; located at http://www.powermatusa.com/powermat-system.html; printed on May 28, 2009.

"The Powermat System"; Powermat; 2009; p. 1; Powermat Ltd.; located at http://www.powermatusa.com/powermat-system.html; printed on May 28, 2009.

"The Technology"; Powermat; 2009; p. 1; HoMedics Powermat North America; located at http://www.powermatusa.com/technology.html; printed on May 28, 2009.

"The Technology"; Powermat; 2009; p. 1; Powermat Ltd.; located at http://www.pwrmat.com/technology.html; printed on May 28, 2009.

"Wearable Power Prize Competition"; Mar. 28, 2008; p. 1-3; Department of Defense; USA.

"Wearable Power Prize Rules"; Aug. 12, 2008; p. 1-16; Department of Defense; USA; printed on May 18, 2009.

"What is eCoupled technology?"; eCoupled Wireless Power Technology; 2009; p. 1-3; Fulton Innovation, Inc.; located at http://www.ecoupled.com/technologyMain.html; printed on Aug. 3, 2009.

"Wireless energy transfer"; Wikipedia; May 18, 2009; p. 1-16; Wikimedia Foundation, Inc.; located at http://en.wikipedia.org/wiki/Wireless_energy_transfer; printed on May 19, 2009.

"Wireless Power Energizes Many Devices"; Wired; Jan. 9, 2009; p. 1-2; Wired.com; located at http://www.wired.com/video/gadgets/ces-2009/6310841001/wired; printed on May 28, 2009.

* cited by examiner

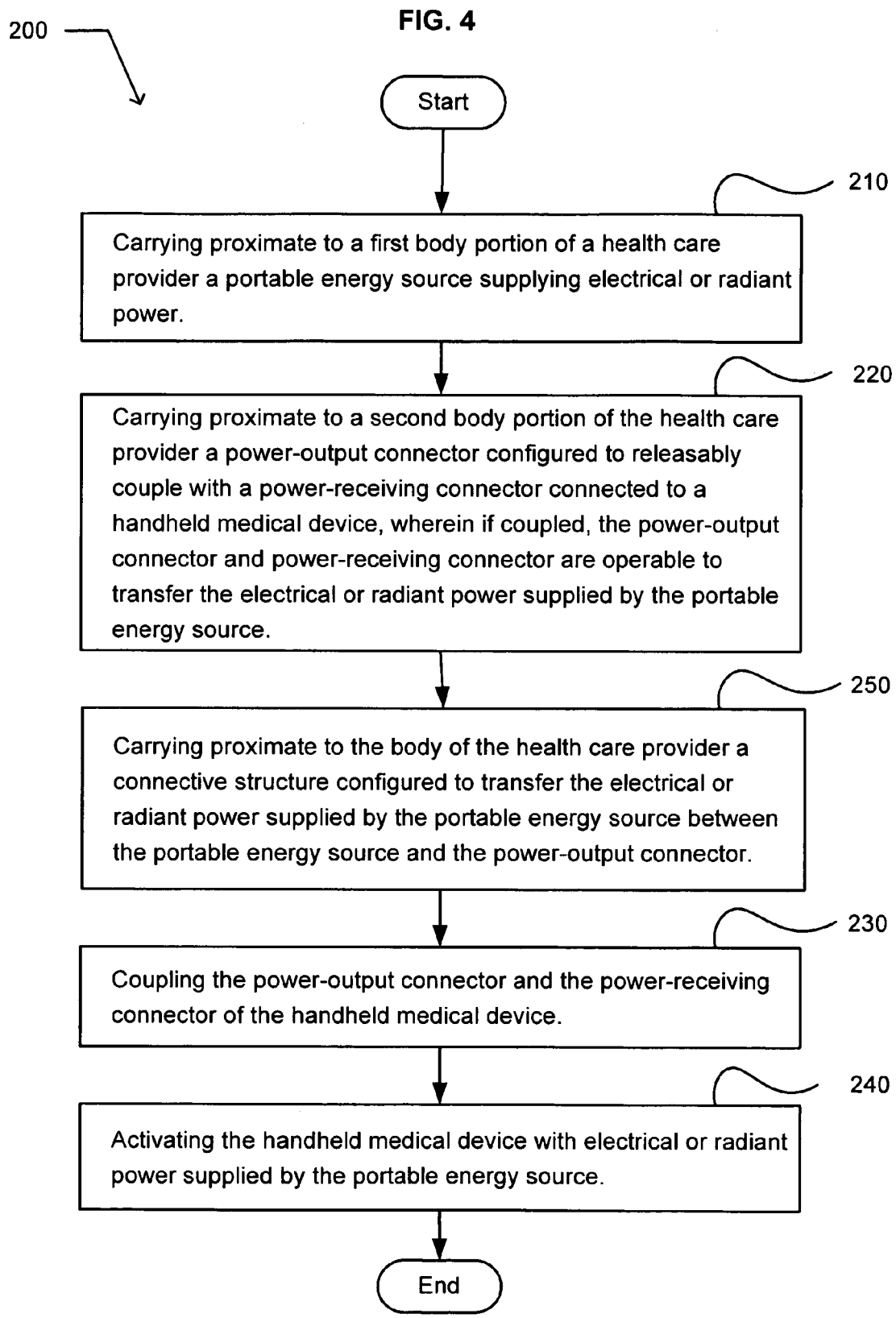

Carrying proximate to a second body portion of the health care provider a power-output connector configured to releasably couple with a power-receiving connector connected to a handheld medical device, wherein if coupled, the power-output connector and power-receiving connector are operable to conduct the electrical or radiant power supplied by the portable energy source.

222 The first body portion of the heath care provider is not the same as the second body portion.

224 The first body portion of the heath care provider is substantially similar to the second body portion.

226 The second body portion of the health care provider is a limb portion of the health care provider.

228 The second body portion of the health care provider is at a position distal of a shoulder joint of the health care provider.

229 The second body portion of the health care provider is at a position distal of a elbow joint of the health care provider.

FIG. 7

300 — A system.

310 Means for carrying proximate to a first body portion of a health care provider a portable energy source supplying electrical or radiant power.

320 Means for carrying proximate to a second body portion of the health care provider a power-output connector configured to releasably couple with a power-receiving connector connected to a handheld medical device, wherein if coupled, the power-output connector and power-receiving connector are operable to transfer the electrical or radiant power supplied by the portable energy source.

330 Means for carrying proximate to the body of the health care provider a connective structure configured to transfer the electrical or radiant power supplied by the portable energy source between the portable energy source and the power-output connector.

340 Means coupling the power-output connector and the power-receiving connector of the handheld medical device.

350 Means for activating the handheld medical device with the electrical or radiant power supplied by the portable energy source.

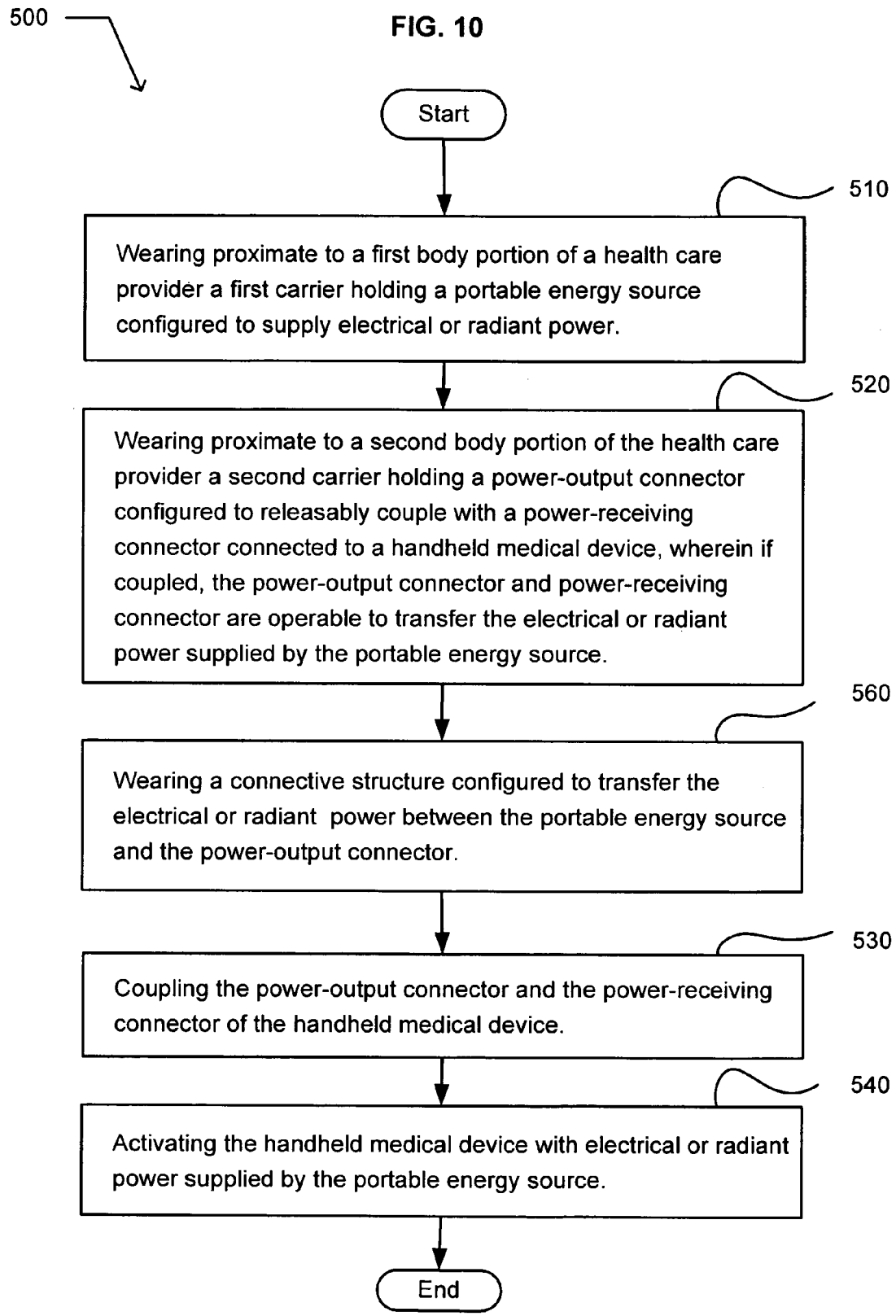

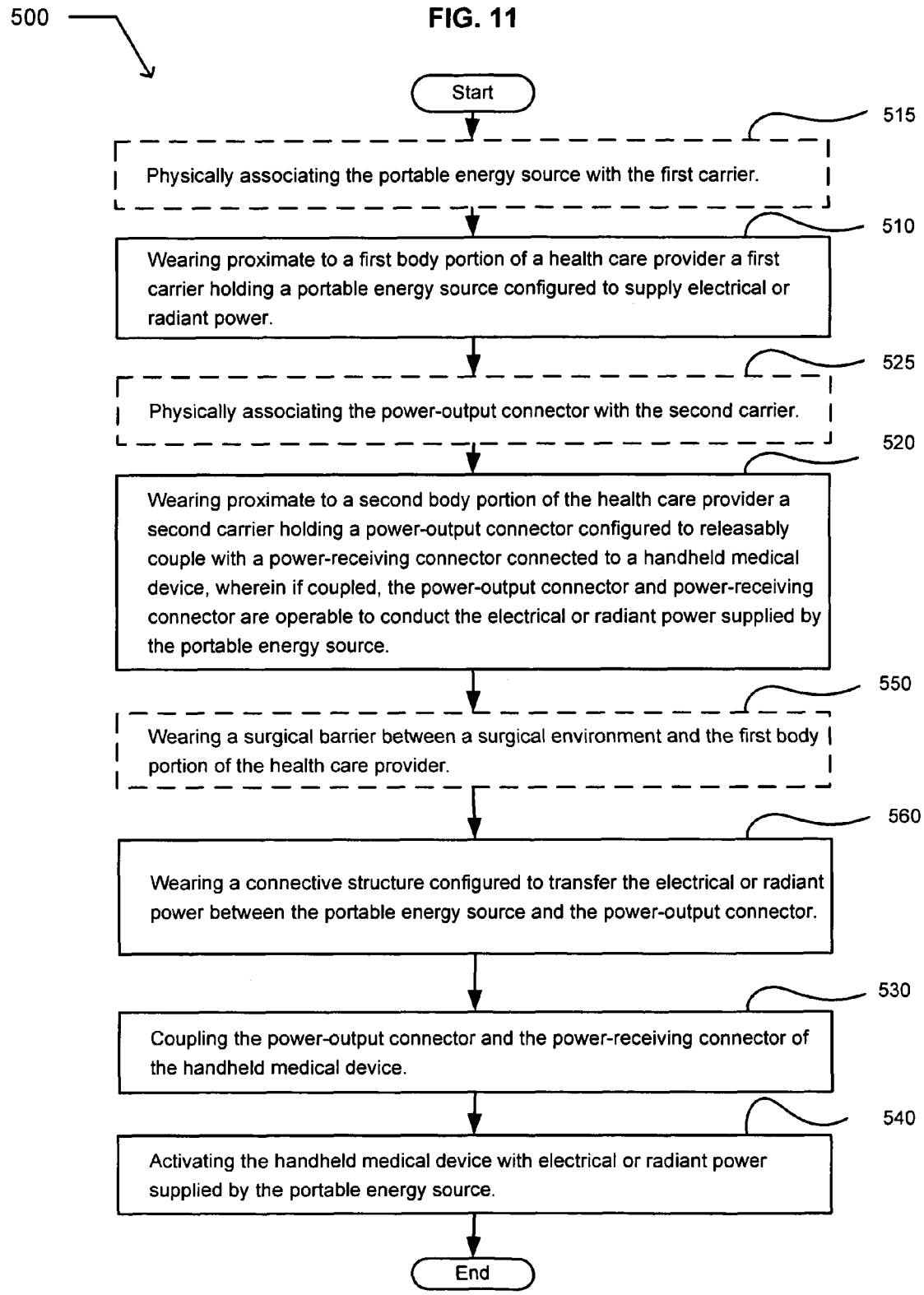

510 — Start → Wearing proximate to a first body portion of a health care provider a first carrier holding a portable energy source configured to supply electrical or radiant power.

520 — Wearing proximate to a second body portion of the health care provider a second carrier holding a power-output connector configured to releasably couple with a power-receiving connector connected to a handheld medical device, wherein if coupled, the power-output connector and power-receiving connector are operable to conduct the electrical or radiant power supplied by the portable energy source.

560 — Wearing a connective structure configured to transfer the electrical or radiant power between the portable energy source and the power-output connector.

530 — Coupling the power-output connector and the power-receiving connector of the handheld medical device.

540 — Activating the handheld medical device with electrical or radiant power supplied by the portable energy source.

570 — Decoupling the power-output connector and the power-receiving connector connected to the handheld medical device; and Coupling the power-output connector and another power-receiving connector connected to another handheld medical device, wherein if coupled, the power-output connector and the another power-receiving connector are operable to conduct the electrical or radiant power supplied by the portable energy source.

End

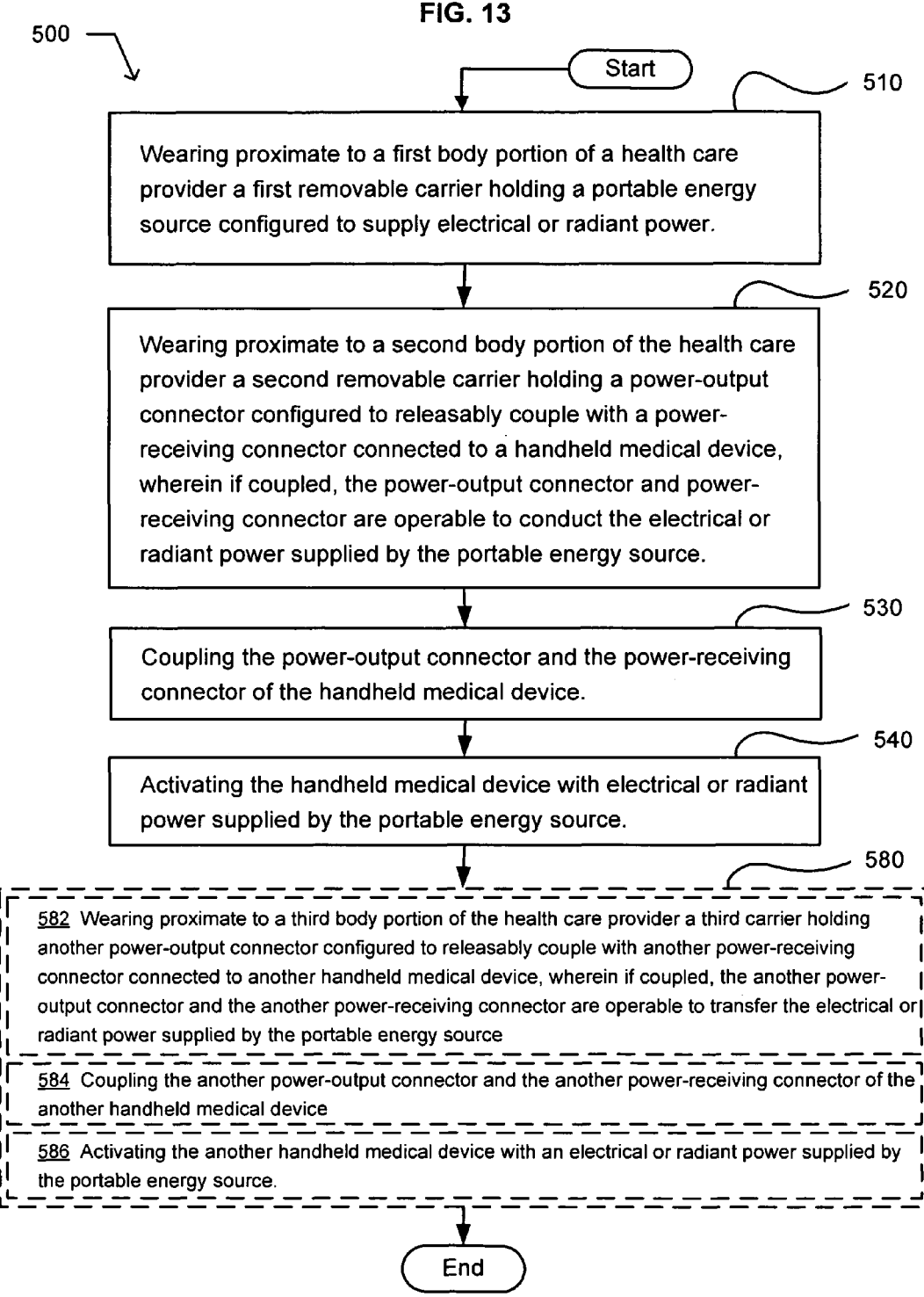

Start → 610

Physically associating a portable energy source configured to supply electrical or radiant power with a first carrier.

↓ 620

Donning proximate to a first body portion of a health care provider the first carrier and the physically-associated portable energy source.

↓ 630

Physically associating a power-output connector with a second carrier, the power-output connector configured to releasably couple with a power-receiving connector connected to a handheld medical device, wherein if coupled, the power-output connector and power-receiving connector are operable to conduct the electrical or radiant power supplied by the portable energy source.

↓ 640

Donning proximate to a second body portion at a position at a position distal of a shoulder joint of the health care provider the second carrier and the physically associated power-output connector.

↓ 650

*Activating a coupling of the power-output connector and the power-receiving connector connected to the handheld medical device.*

↓ 660

Donning a connective structure configured to transfer the electrical or radiant power between the portable energy source and the power-output connector, the connective structure having a first portion coupled with the portable energy source and a second portion coupled with the power-output connector.

↓ 670

*Wearing a surgical barrier between a surgical environment and the first body portion of the health care provider.*

↓ 680

*Activating the handheld medical device with the electrical or radiant power supplied by the portable energy source.*

↓

End

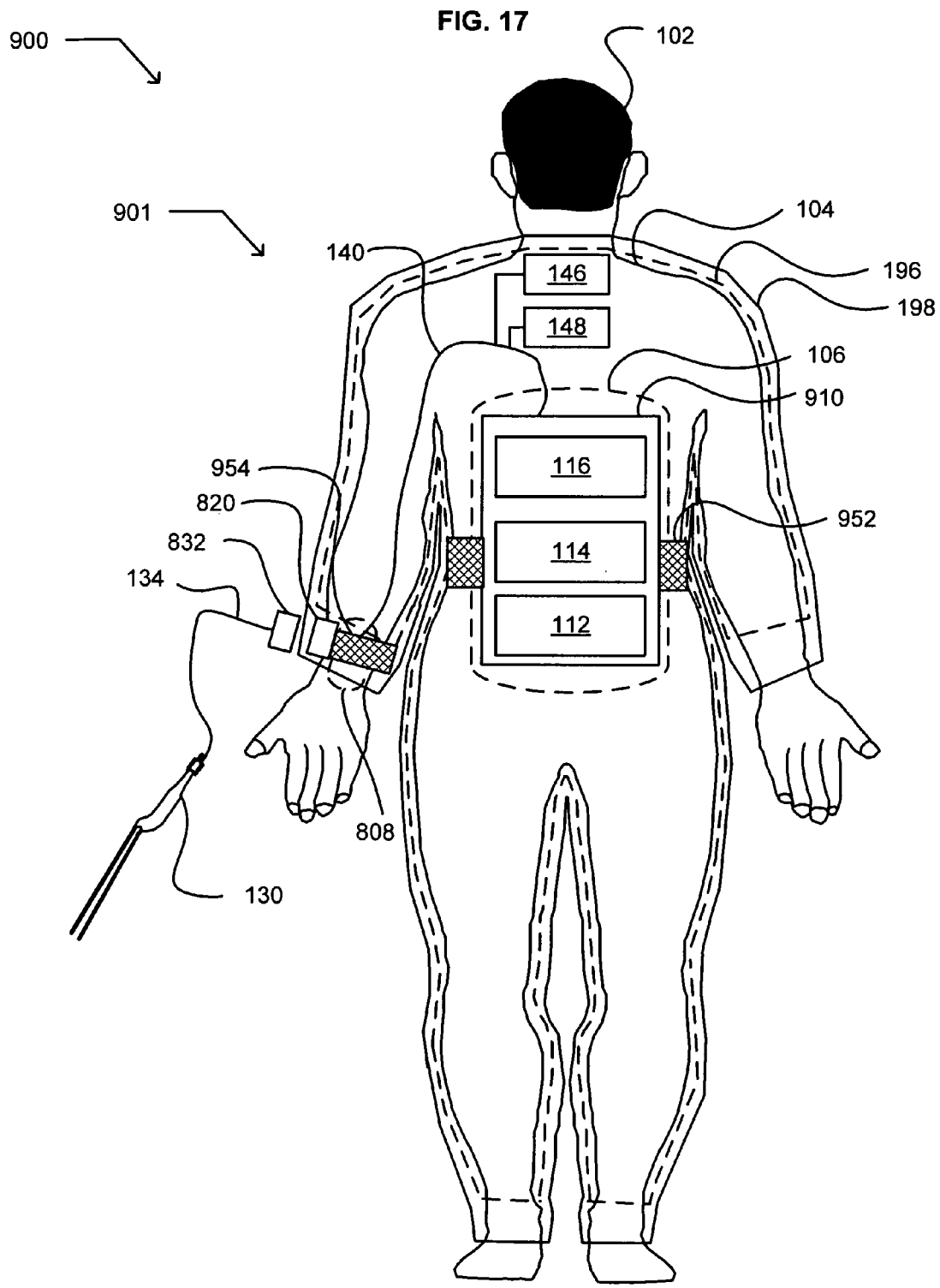

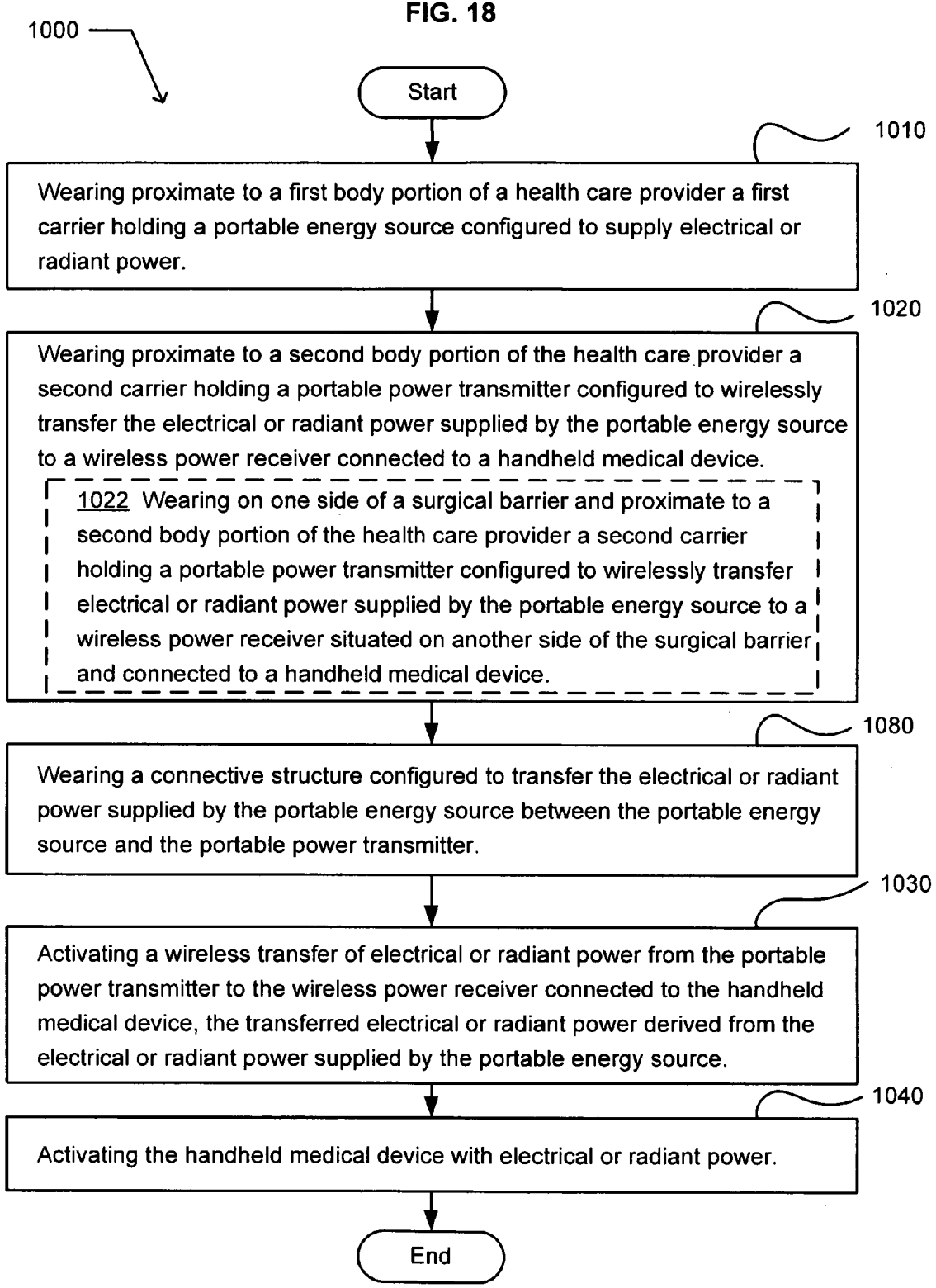

Activating a wireless transfer of the electrical or radiant power supplied by the portable energy source from the portable power transmitter to the wireless power receiver connected to the handheld medical device.

1032 Moving the portable power transmitter and the wireless power receiver into an alignment providing a wireless transfer of the electrical or radiant power supplied by the portable energy source from the portable power transmitter to the wireless power receiver.

1034 Moving the portable power transmitter and the wireless power receiver into an orientation providing an efficient wireless transfer of the electrical or radiant power supplied by the portable energy source from the portable power transmitter to the wireless power receiver.

1036 Moving the wireless power receiver connected to the handheld medical device and the portable power transmitter into a physical proximity providing a strong coupling of the electrical or radiant power supplied by the portable energy source.

1038 Moving the wireless power receiver connected to the handheld medical device and the portable power transmitter into a physical proximity providing an inductive, optical, radiant, or power beam coupling of the electrical or radiant power supplied by the portable energy source.

1042 The health care provider grasping the handheld medical device.

1044 Initiating a wireless transfer of the electrical or radiant power supplied by the portable energy source from the portable power transmitter to the wireless power receiver connected to the handheld medical device.

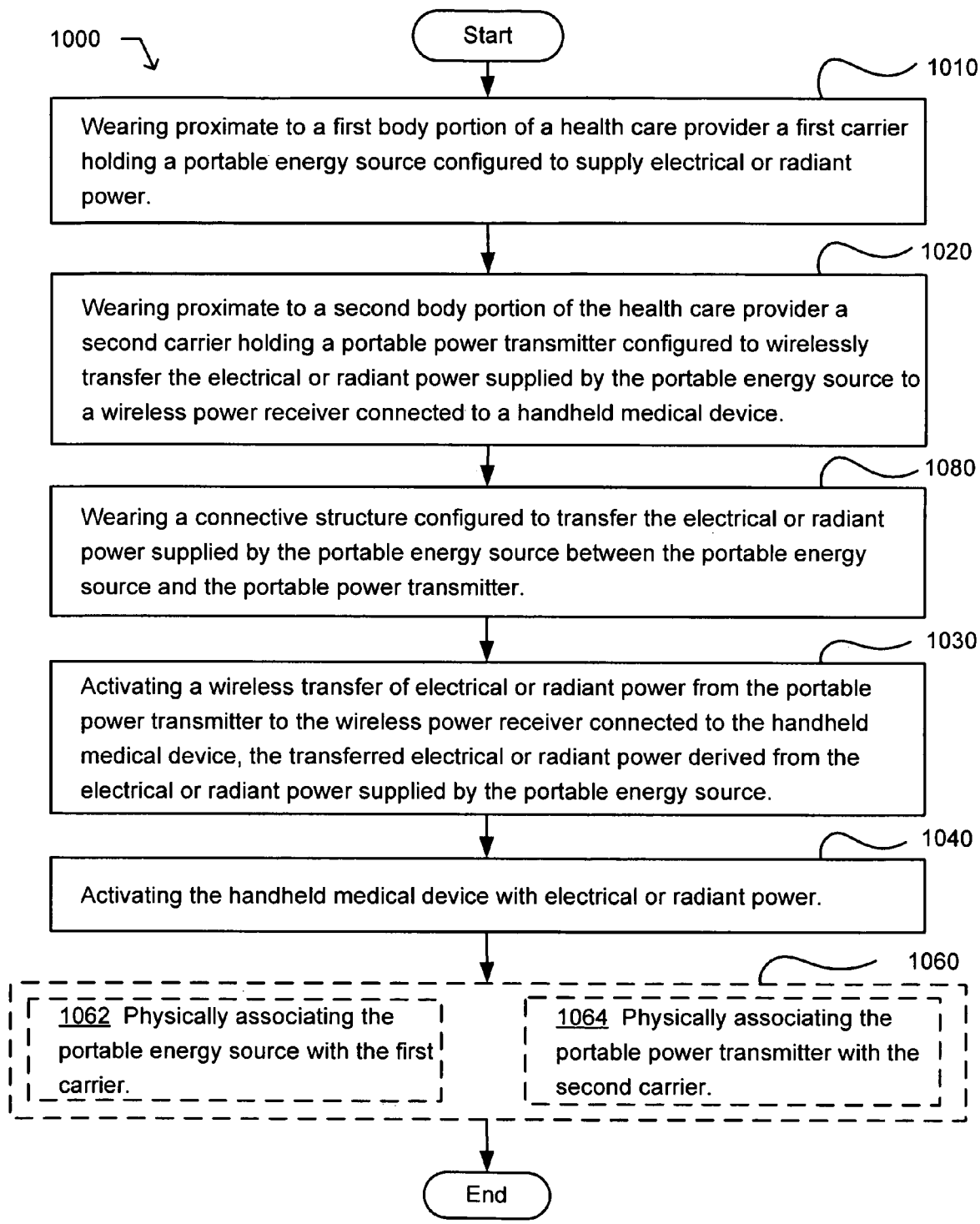

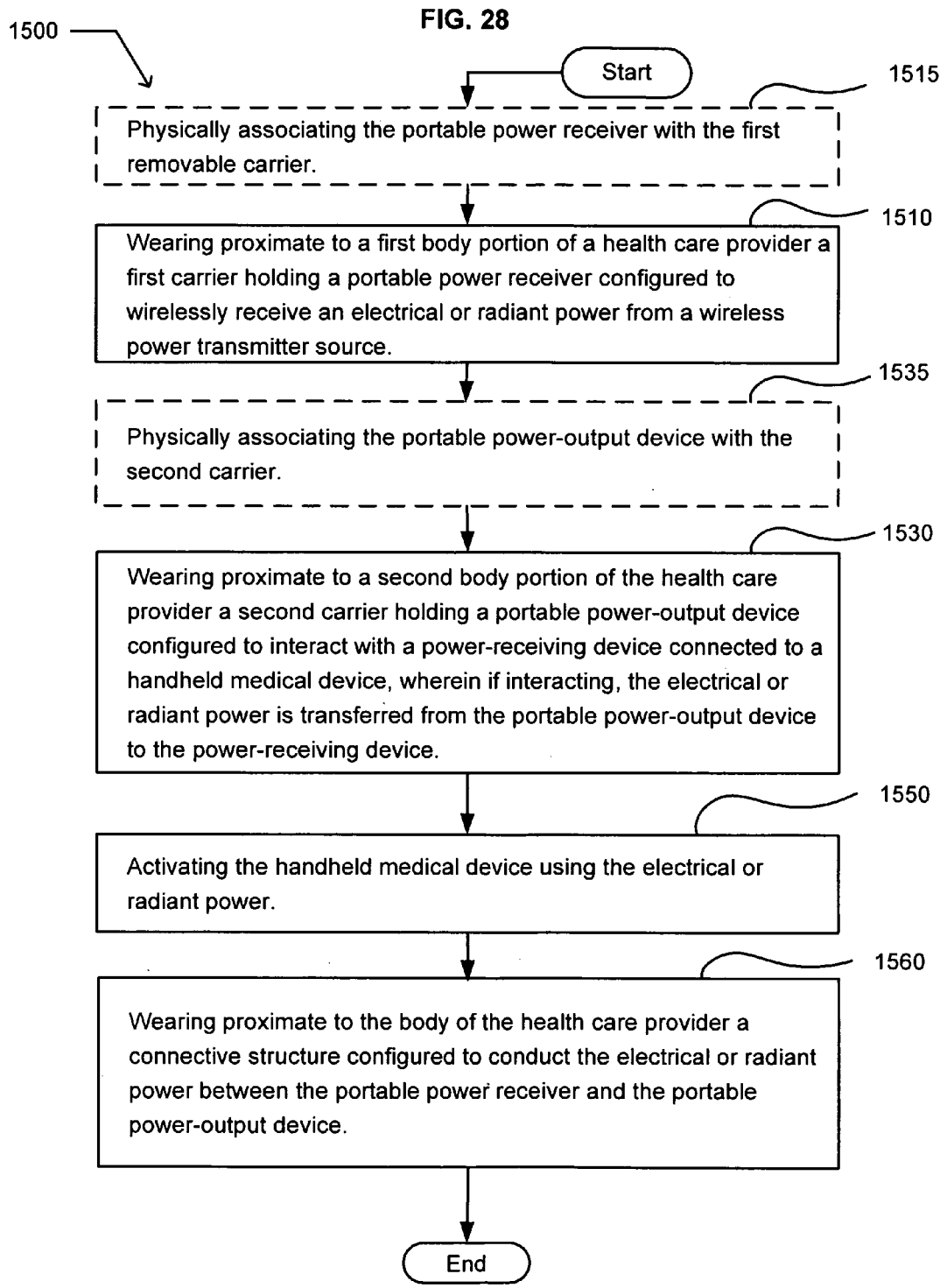

FIG. 29

A system:

1610 Portable means for wirelessly receiving electrical or radiant power from a wireless power transmitter source.

1620 Means for wearing proximate to a first body portion of a health care provider the portable means for wirelessly receiving electrical or radiant power.

1630 Portable means for interacting with a power-receiving device connected to a handheld medical device, wherein if interacting, the electrical or radiant power is transferred from the portable means for interacting to the power-receiving device.

1632 Portable means for releasably coupling the supplied electrical or radiant power with a power-receiving connector connected to a handheld medical device.

1634 Means for wirelessly transferring electrical or radiant power received by the portable power receiver to a wireless power receiver connected to a handheld medical device, the transferred electrical or radiant power derived from the electrical or radiant power from a wireless power transmitter source.

1640 Means for wearing proximate to a second body portion of the health care provider the portable means for interacting with a power-receiving device.

1670 Means for transferring the electrical or radiant power from the portable means for wirelessly receiving the first electrical or radiant power to the portable means for interacting with a power-receiving device connected to a handheld medical device.

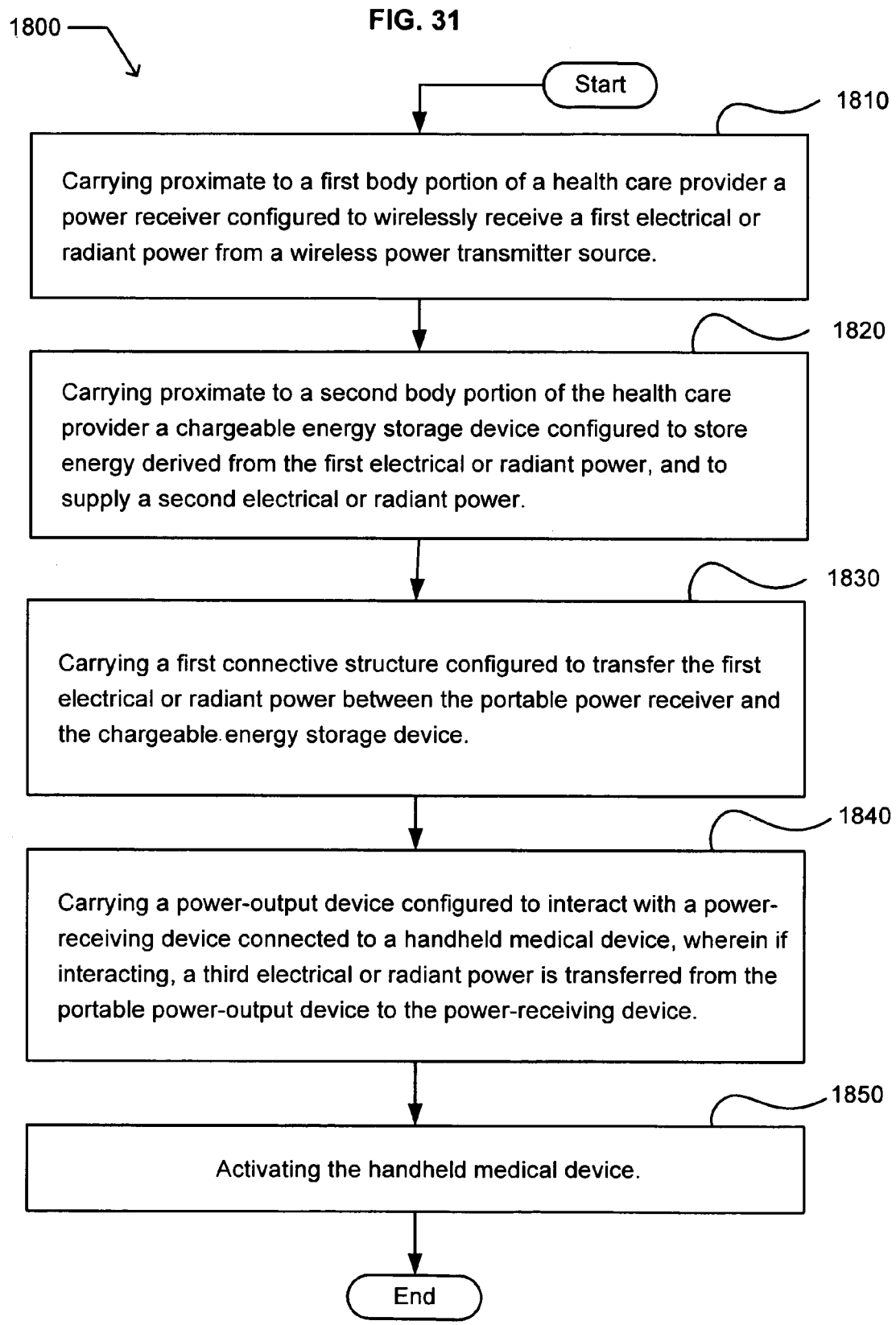

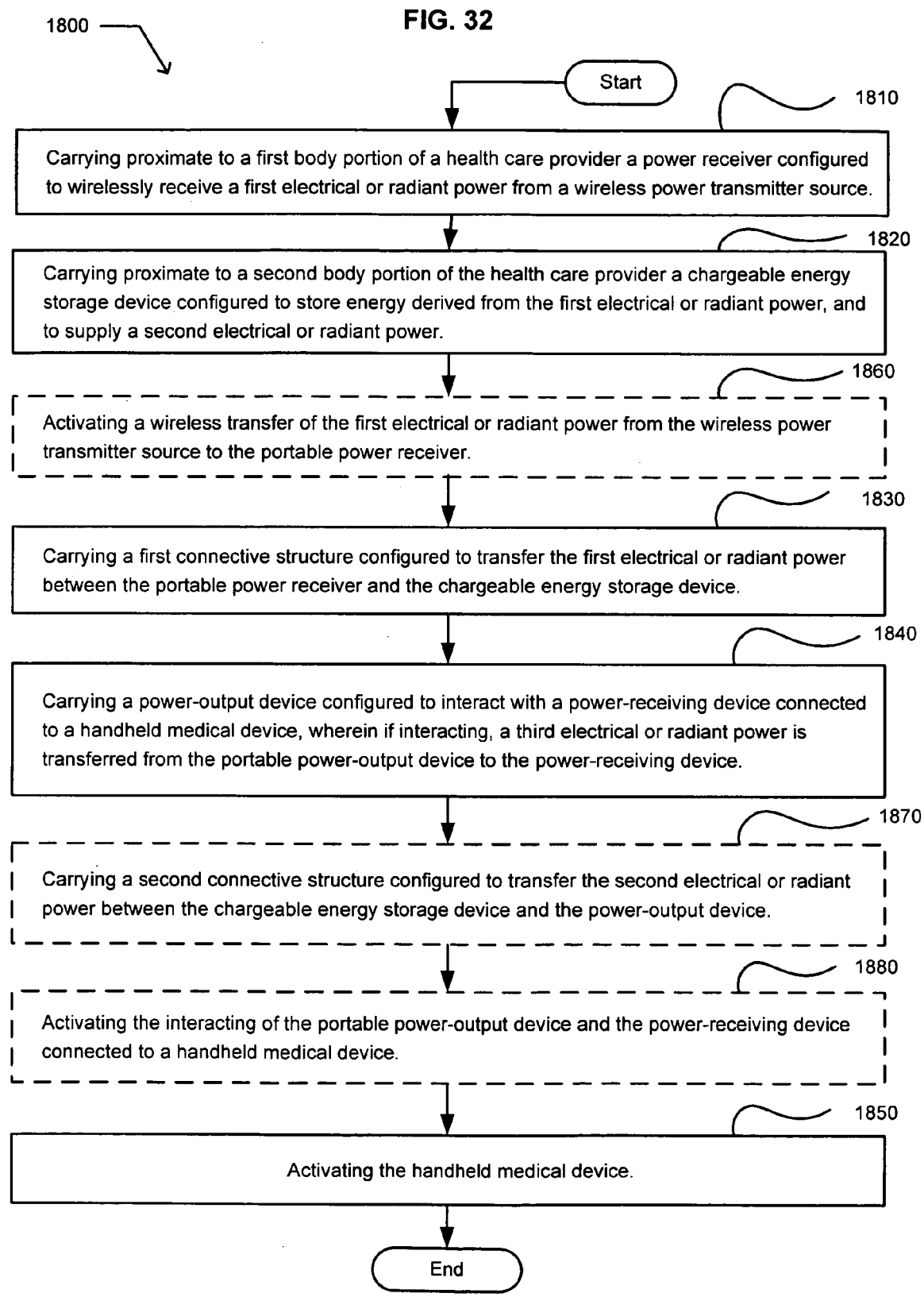

FIG. 33

A system:

1910 Means for wirelessly receiving a first electrical or radiant power from a wireless power transmitter source, the means for wirelessly receiving a first electrical or radiant power configured to be wearable proximate to a first body portion of a health care provider.

1920 Means for storing energy derived from the first electrical or radiant power, and for supplying a second electrical or radiant power, the means for storing energy configured to be wearable by the health care provider proximate to a second body portion of the health care provider.

1930 Means for interacting with a power-receiving device connected to a handheld medical device, wherein if interacting, a third electrical or radiant power is transferred from the portable means for interacting to the power-receiving device, the means for interacting with a power-receiving device configured to be wearable proximate to a third body portion of the health care provider.

1932 Means for releasably coupling the second electrical or radiant power with a power-receiving connector connected to a handheld medical device, wherein if coupled, a third electrical or radiant power is transferred from the means for interacting with a power-receiving device to the power-receiving device.

1934 Means for wirelessly transferring the third electrical or radiant power to a wireless power receiver connected to a handheld medical device.

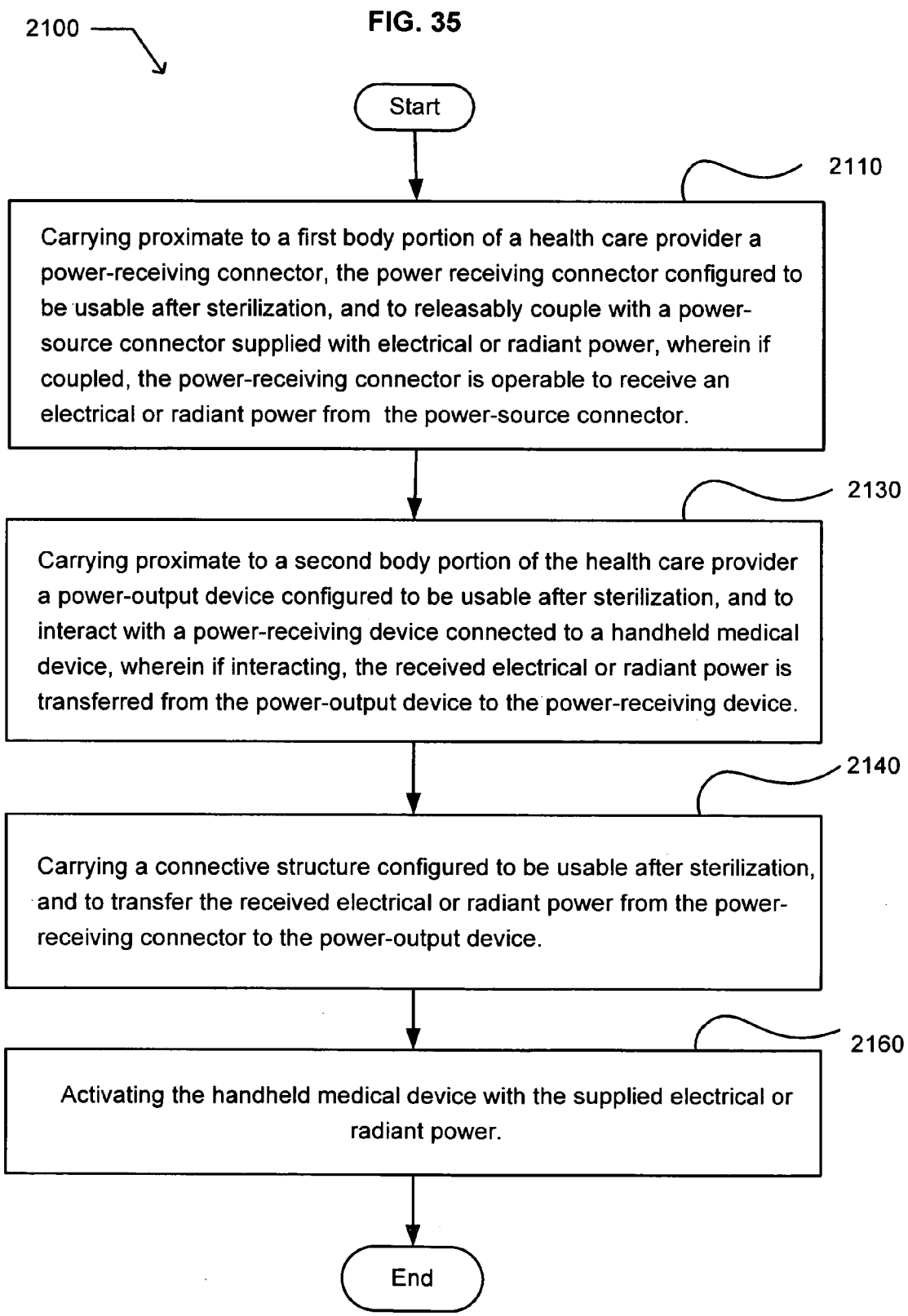

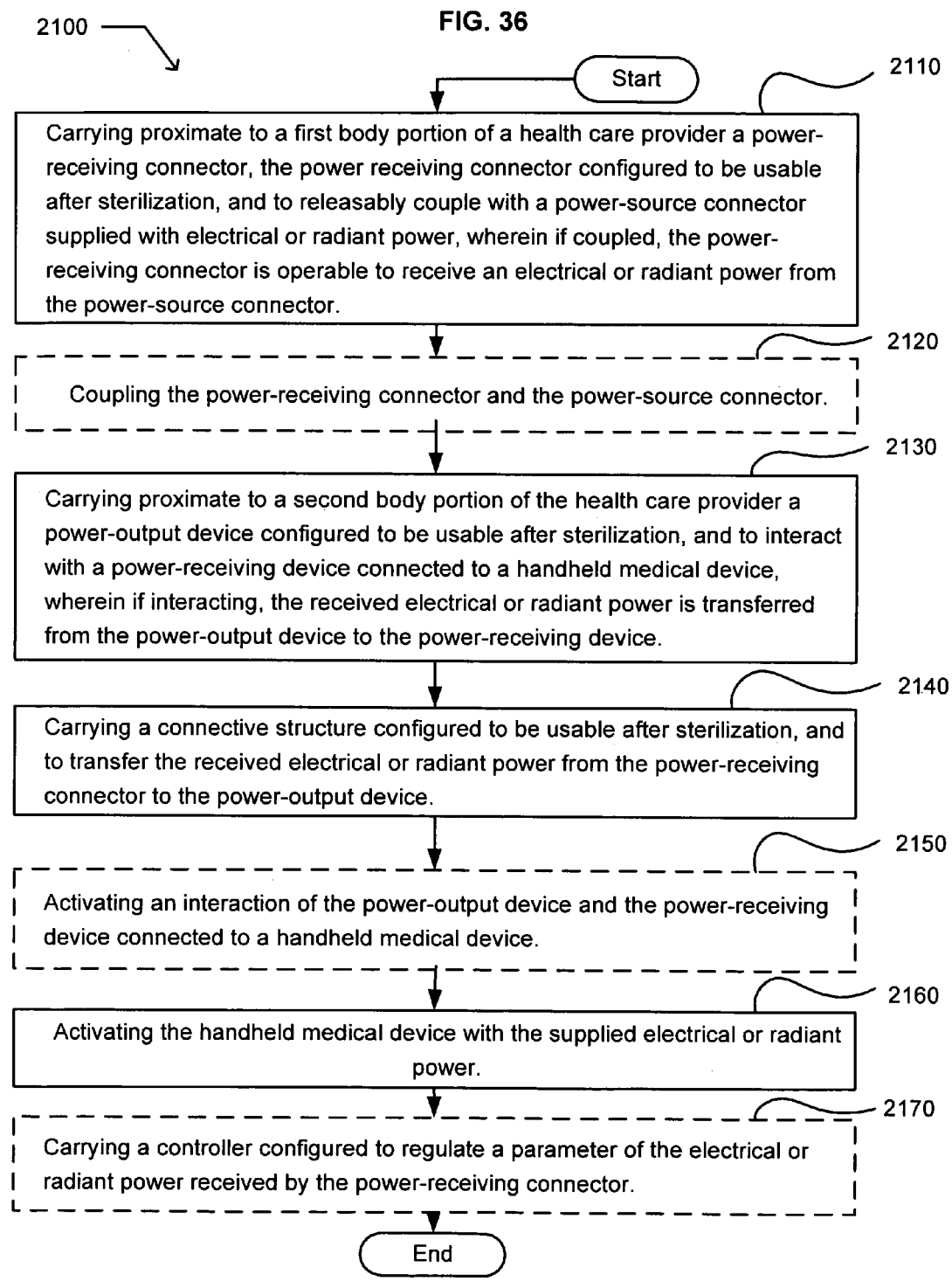

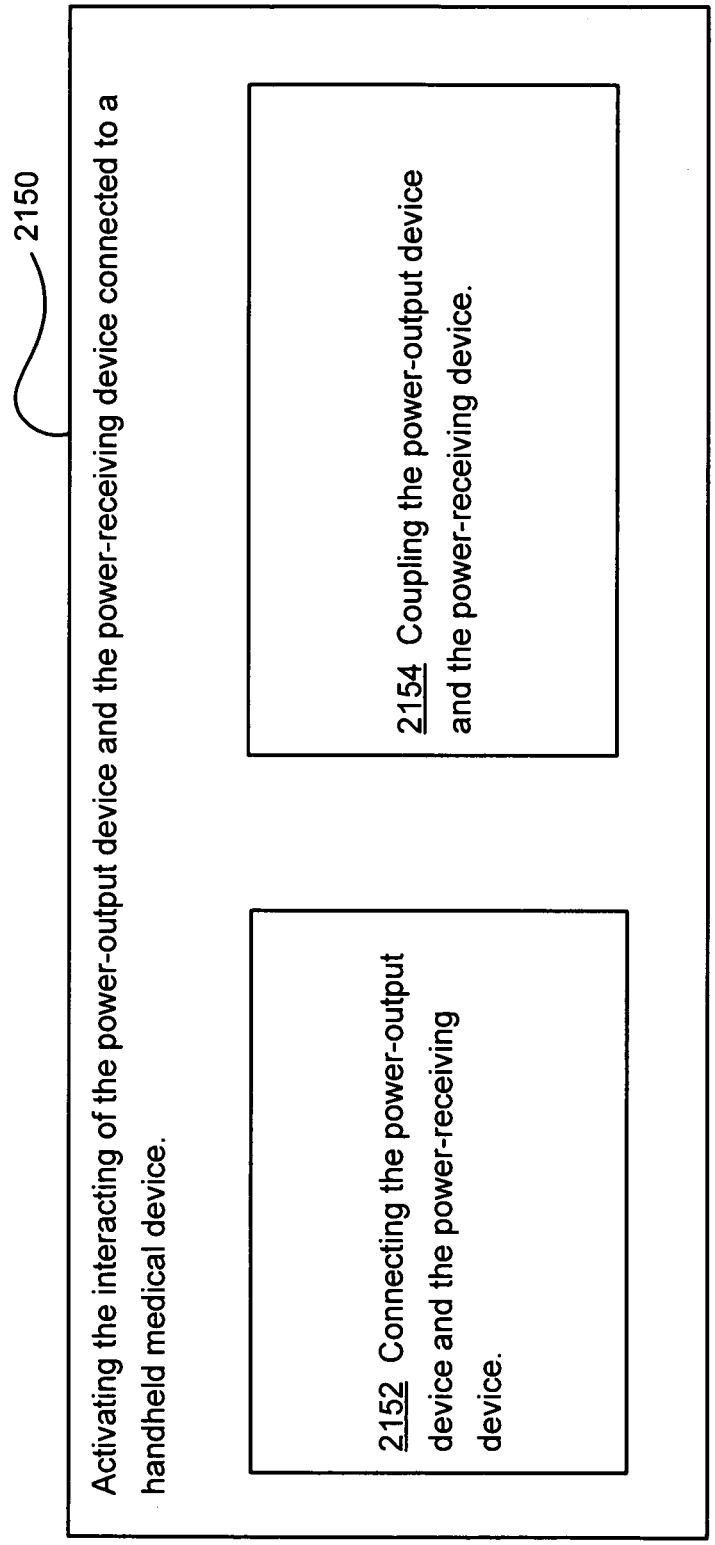

A system configured to be usable after sterilization:

2210 Means for releasably coupling with a power-source connector supplied with electrical or radiant power, and wherein if coupled, the means for releasably coupling is operable to receive an electrical or radiant power from the power-source connector.

2220 Means for wearing proximate to a first body portion of a health care provider the means for releasably coupling with a power-source connector.

2230 Means for interacting with a power-receiving device connected to a handheld medical device, wherein if interacting, the received electrical or radiant power is transferred from the means for interacting to the power-receiving device.

2240 Means for wearing proximate to a second body portion of the health care provider the means for interacting with a power-receiving device.

2250 Means for transferring the received electrical or radiant power between the means for releasably coupling with a power-source connector and the means for interacting with a power-receiving device.

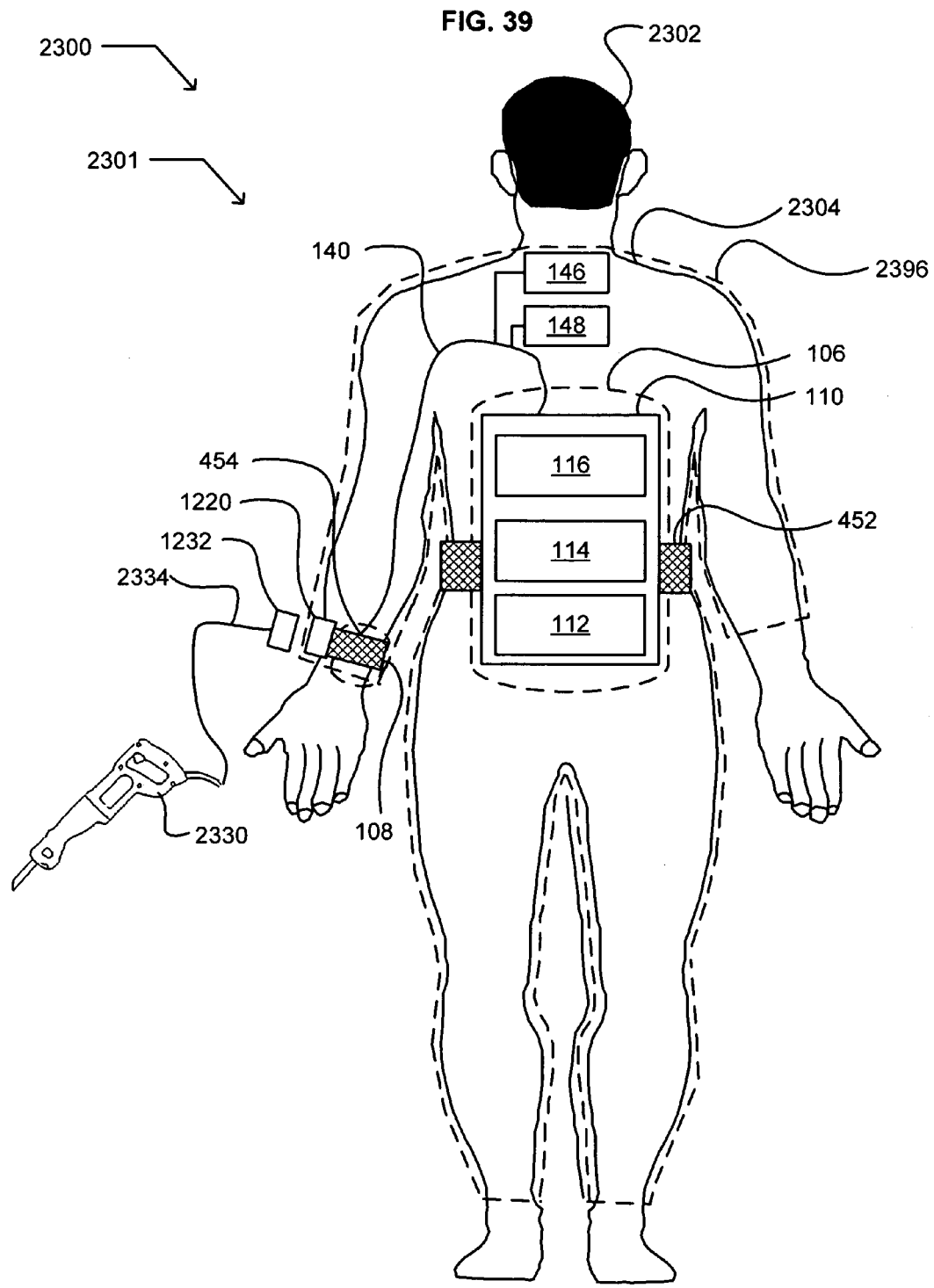

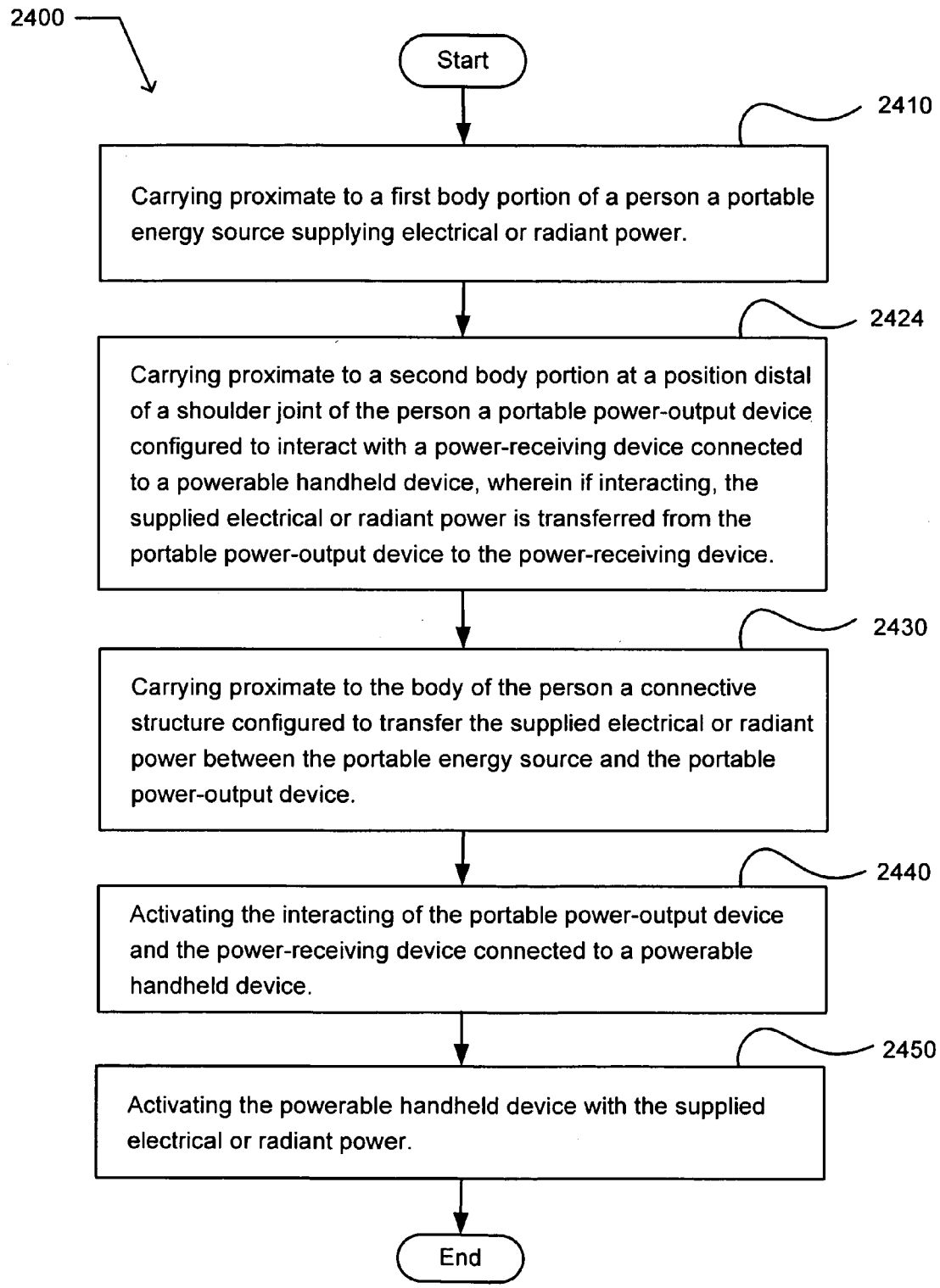

FIG. 41

A system:

2510 Portable means for supplying electrical or radiant power.

2520 Means for wearing proximate to a first body portion of a person the portable means for supplying electrical or radiant power.

2530 Portable means for interacting with a power-receiving device connected to a powerable handheld device, wherein if interacting, the supplied electrical or radiant power is transferred from the portable means for interacting to the power-receiving device.

2540 Means for wearing proximate to a second body portion of the person the portable means for interacting.

2550 Means for transferring the supplied electrical or radiant power from the portable means for supplying electrical or radiant power to the portable means for interacting.

2560 Means for wearing proximate to the body of the person the means for transferring the electrical or radiant power.

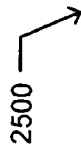

SYSTEM INCLUDING WEARABLE POWER RECEIVER AND WEARABLE POWER-OUTPUT DEVICE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/800,250, entitled WEARABLE POWER SOURCE, naming Philip Andrew Eckhoff, William Gates, Peter L. Hagelstein, Roderick A. Hyde, Jordin T. Kare, Robert Langer, Eric C. Leuthardt, Erez Lieberman, Nathan P. Myhrvold, Michael Schnall-Levin, Clarence T. Tegreene, and Lowell L. Wood, Jr., as inventors, filed May 11, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/800,231, entitled WEARABLE POWER SOURCE CARRYABLE BY A HEALTH CARE PROVIDER, naming Philip Andrew Eckhoff, William Gates, Peter L. Hagelstein, Roderick A. Hyde, Jordin T. Kare, Robert Langer, Eric C. Leuthardt, Erez Lieberman, Nathan P. Myhrvold, Michael Schnall-Levin, Clarence T. Tegreene, and Lowell L. Wood, Jr., as inventors, filed May 11, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/800,243, entitled WEARABLE WIRELESS POWER TRANSMITTER, naming Philip Andrew Eckhoff, William Gates, Peter L. Hagelstein, Roderick A. Hyde, Jordin T. Kare, Robert Langer, Eric C. Leuthardt, Erez Lieberman, Nathan P. Myhrvold, Michael Schnall-Levin, Clarence T. Tegreene, and Lowell L. Wood, Jr., as inventors, filed May 11, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/800,249, entitled WEARABLE POWER-OUTPUT DEVICE OPERABLE TO DELIVER WIRELESS SLY RECEIVED POWER, naming Philip Andrew Eckhoff, William Gates, Peter L. Hagelstein, Roderick A. Hyde, Jordin T. Kare, Robert Langer, Eric C. Leuthardt, Erez Lieberman, Nathan P. Myhrvold, Michael Schnall-Levin, Clarence T. Tegreene, and Lowell L. Wood, Jr., as inventors, filed May 11, 2010, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/800,242, entitled SYSTEM INCLUDING WEARABLE POWER RECEIVER AND WEARABLE POWER-OUTPUT DEVICE, naming Philip Andrew Eckhoff, William Gates, Peter L. Hagelstein, Roderick A. Hyde, Jordin T. Kare, Robert Langer, Eric C. Leuthardt, Erez Lieberman, Nathan P. Myhrvold, Michael Schnall-Levin, Clarence T. Tegreene, and Lowell L. Wood, Jr., as inventors, filed May 11, 2010, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

An embodiment of the subject matter described herein includes a system. The system includes a power-receiving connector configured to be usable after sterilization, to releasably couple with a power-source connector, and configured to be carried by a health care provider proximate to a first body portion of the health care provider. If coupled, the power-receiving connector is operable to receive an electrical or radiant power from the power-source connector. The system also includes a power-output device configured to be usable after sterilization, to interact with a power-receiving device connected to a handheld medical device, and configured to be carried by the health care provider proximate to a second body portion of the health care provider. If interacting, the received electrical or radiant power is transferred from the power-output device to the power-receiving device. The system further includes a wearable connective structure configured to be usable after sterilization, and to transfer the received electrical or radiant power from the power-receiving connector to the power-output device. In an embodiment, the power-output device includes a power-output connector configured to be usable after sterilization, to releasably couple with a power-receiving device connected to a handheld medical device, and configured to be carried by the health care provider proximate to a second body portion of the health care provider. If coupled, the electrical or radiant power is transferred from the power-output device to the power-receiving device. In an embodiment, the power-output device includes a power transmitter configured to be usable sterilization, to wirelessly transfer the electrical or radiant power to a wireless power receiver connected to a handheld medical device, and configured to be carried by the health care provider proximate to a second body portion of the health care provider.

In an embodiment, the system includes a first carrier configured to hold the power-receiving connector, and to be physically associatable with the first body portion of the health care provider. In an embodiment, the system includes a second carrier configured to hold the power-output device, and to be physically associatable with the second body portion of the health care provider. In an embodiment, the system includes a third carrier configured to hold the another power-output device, and to be physically associatable with a third body portion of the health care provider. In an embodiment, the system includes a fourth carrier configured to hold the wearable connective structure, and to be physically associatable with a fourth body portion of the health care provider. In an embodiment, the system includes a controller configured to manage a parameter of electrical or radiant power received by the power-receiving connector, and to be wearable by the health care provider. In an embodiment, the system includes a power converter operable to convert a form of the electrical or radiant power received by the power-receiving connector to another form of electrical or radiant power available to the power-output device. In an embodiment, the system includes a portable and chargeable energy storage device configured to store energy derived from electrical or radiant power received by the power-receiving connector, to supply another electrical or radiant power, and configured to be carried by the health care provider proximate to a fifth body portion of the health care provider.

An embodiment of the subject matter described herein includes a method. The method includes carrying proximate to a first body portion of a health care provider a power-receiving connector. The power receiving connector configured to be usable after sterilization, and to releasably couple with a power-source connector supplied with electrical or radiant power. If coupled, the power-receiving connector is operable to receive an electrical or radiant power from the power-source connector. The method also includes carrying proximate to a second body portion of the health care provider a power-output device configured to be usable after sterilization, and to interact with a power-receiving device connected to a handheld medical device. If interacting, the received electrical or radiant power is transferred from the power-output device to the power-receiving device. The method further includes carrying a connective structure configured to be usable after sterilization, and to transfer the received electrical or radiant power from the power-receiving connector to the power-output device. The method also includes activating the handheld medical device with the supplied electrical or radiant power.

In an embodiment, the method includes coupling the power-receiving connector and the power-source connector. In an embodiment, the method includes activating an interaction of the power-output device and the power-receiving device connected to a handheld medical device. In an embodiment, the method includes carrying a controller configured to regulate a parameter of the electrical or radiant power received by the power-receiving connector.

An embodiment of the subject matter described herein includes a system configured to be usable after sterilization. The system includes means for releasably coupling with a power-source connector supplied with electrical or radiant power. If coupled, the means for releasably coupling is operable to receive an electrical or radiant power from the power-source connector. The system also includes means for wearing proximate to a first body portion of a health care provider the means for releasably coupling with a power-source connector. The system further includes means for interacting with a power-receiving device connected to a handheld medical device. If interacting, the received electrical or radiant power is transferred from the means for interacting to the power-receiving device. The system also includes means for wearing proximate to a second body portion of the health care provider the means for interacting with a power-receiving device. The system further includes means for transferring the received electrical or radiant power between the means for releasably coupling with a power-source connector and the means for interacting with a power-receiving device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 illustrates an example operational flow in which an embodiment may be implemented;

FIG. 5 illustrates an alternative embodiment of the operational flow described in conjunction with FIG. 4;

FIG. 7 illustrates an example system in which an embodiment may be implemented;

FIG. 10 illustrates an example operational flow in which an embodiment may be implemented;

FIG. 11 illustrates an alternative embodiment of the operational flow described in conjunction with FIG. 10;

FIG. 12 illustrates another alternative embodiment of the operational flow described in conjunction with FIG. 10;

FIG. 13 illustrates an alternative embodiment of the operational flow described in conjunction with FIG. 10;

FIG. 14 illustrates an example operational flow in which an embodiment may be implemented;

FIG. 17 illustrates an example environment in which an embodiment may be implemented;

FIG. 18 illustrates an example operational flow in which an embodiment may be implemented;

FIG. 19 illustrates an alternative embodiment of the operational flow described in conjunction with FIG. 18;

FIG. 20 illustrates another alternative embodiment of the operational flow described in conjunction with FIG. 18;

FIG. 28 illustrates an alternative embodiment of the operational flow of FIG. 26;

FIG. 29 illustrates a system in which an embodiment may be implemented;

FIG. 31 illustrates an example operational flow in which an embodiment may be implemented;

FIG. 32 illustrates an alternative embodiment of the operation flow described in conjunction with FIG. 31;

FIG. 33 illustrates an example system in which an embodiment may be implemented;

FIG. 35 illustrates an example operational flow in which an embodiment may be implemented;

FIG. 36 illustrates an alternative embodiment of the operational flow of FIG. 35;

FIG. 37 illustrates another alternative embodiment of the operational flow of FIG. 36;

FIG. 38 illustrates an example system configured to be usable after sterilization in which an embodiment may be implemented;

FIG. 39 illustrates an example environment in which an embodiment may be implemented;

FIG. 40 illustrates an example operational flow in which an embodiment may be implemented; and FIG. 41 illustrates an example system in which an embodiment may be implemented;

DETAILED DESCRIPTION

Figure 1:
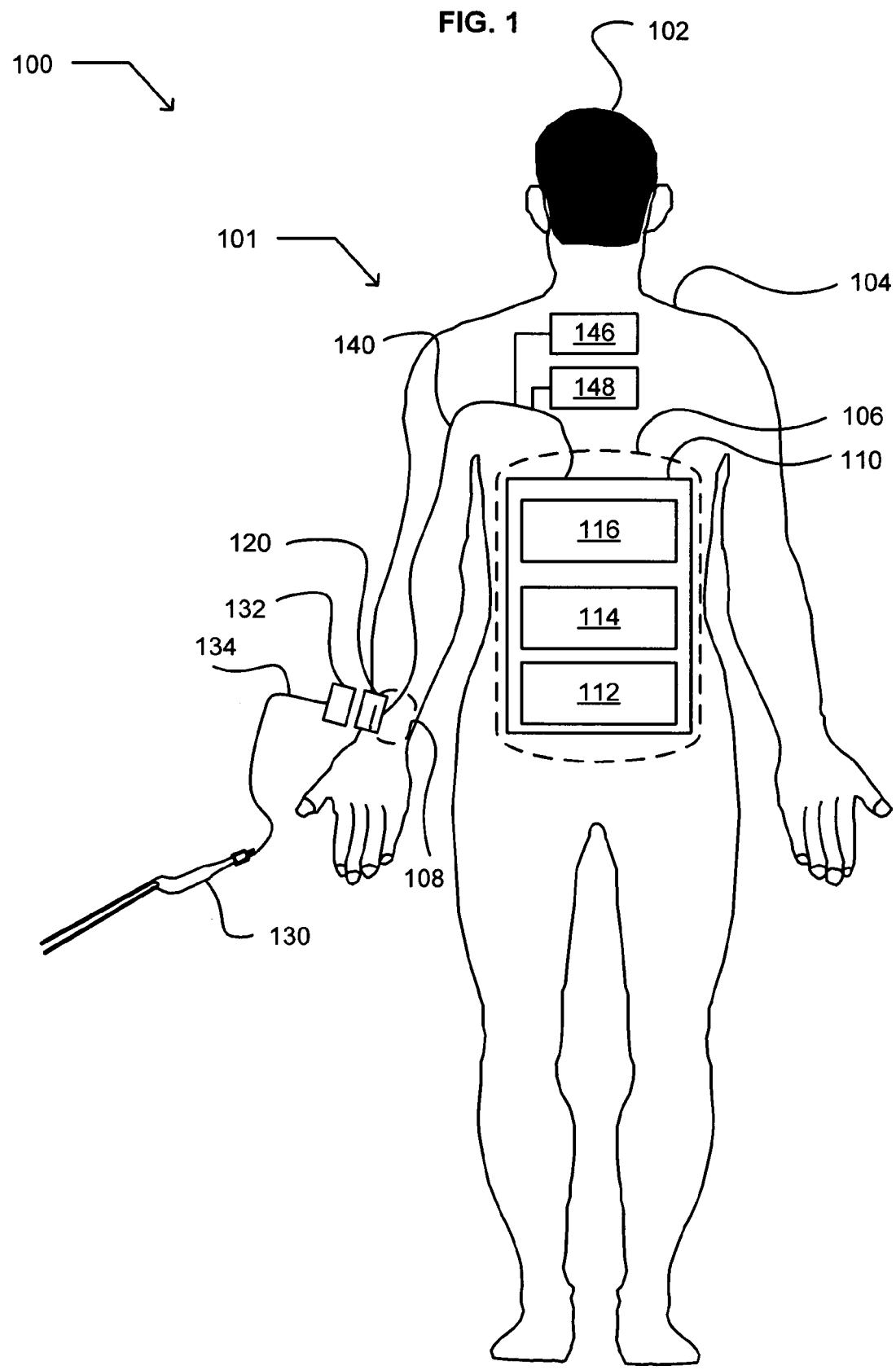
FIG. 1 illustrates an example environment in which an embodiment may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an example environment 100. The environment includes a health care provider 102 having body. The health care provider's body is illustrated by a posterior outline view of a heath care provider's body 104. Embodiments may be implemented using any suitable portion of the heath care provider's body, and are not limited to the posterior view in FIG. 1 and subsequent figures. Embodiments may be implemented with respect to a skin surface of the health care provider's body. Embodiments may be implemented with respect to a body surface of the health care provider covered by clothes, such as underwear, street clothes, outer garments, or the like. Embodiments may be implemented with respect to a body surface of the health care provider covered by specialized clothing, such as scrubs, surgical barrier, or the like. The environment includes a wearable power supply system 101. The environment also includes handheld medical device, illustrated as a handheld medical device 130.

The wearable power supply system 101 includes a portable energy source 110. The portable energy source includes a portable energy source configured to supply electrical or radiant power, and configured to be carried proximate to a first body portion 106 of the health care provider 102. In an embodiment, the portable energy source includes a portable energy source configured to provide, output, or deliver electrical or radiant power. FIG. 1 illustrates the first body portion as a portion of the health care provider's back. In embodiment, the first body portion includes a chest, stomach, or limb portion of the health care provider's body. An example of a portable energy source is described in W. Mathews, *Fuel cells dominate DoD wearable power contest*, Army Times, posted Nov. 3, 2008 (available at http://www.armytimes.com/news/2008/11/army_wearablepower_110208w/(accessed Jul. 13, 2009))

The power supply system 101 includes a power-output connector 120 configured to releasably couple with a power-receiving connector 132 connected to the handheld medical device 130. The power-output connector is further configured to be carried proximate to a second body portion at a position distal of a shoulder joint 108 of the health care provider 102. If coupled, the power-output connector and the power-receiving connector are operable to transfer the electrical or radiant power supplied by the portable energy source 110. FIG. 1 illustrates the second body portion as a portion of the health care provider's wrist or forearm. In an embodiment, the first body portion 106 of the heath care provider is different from the second body portion 108 of the heath care provider. For example, the first body portion may include the torso of the health care provider and the second body portion may include a wrist of the health care provider as illustrated in FIG. 1. For example, the first body portion may include the right leg of the health care provider and the second body portion may include the lei leg of the health care provider.

In an embodiment, a position "distal of" includes a position situated in a direction away the center or midline of the body. In another embodiment, a position "distal of" includes a position situated away the center of the body and away from a location or landmark or point of reference. For example, a position "distal of" a shoulder joint may include a position situated on an upper arm, an elbow, a forearm, a wrist, or a finger. For example, a position "distal of" a hip joint may include a position situated on a thigh, knee, calf, ankle, foot, or toe.

The power supply system 101 includes a connective structure 140 configured to transfer the electrical or radiant power supplied by the portable energy source between the portable energy source 110 and the power-output connector 120.

In an embodiment, the portable energy source 110 includes a portable energy generator or a portable energy storage device. In an embodiment, the portable energy generator includes at least one of a fuel cell technology, fuel cartridge, or heat engine. In an embodiment, the portable energy generator includes a portable electromagnetic radiation generator. In an embodiment, the generated electromagnetic radiation includes radio wave, microwave, infrared, visible, ultraviolet, or x-ray radiation. In an embodiment, the generated electromagnetic radiation includes electromagnetic radiation transmitted via air or space, or transmitted via a connective structure. In an embodiment, the portable energy generator includes a portable ultrasound energy generator. In an embodiment, the portable energy generator includes a portable laser energy generator. In an embodiment, the portable energy generator includes a portable microwave generator. In an embodiment, the portable energy generator includes a portable electricity generator.

In an embodiment, the portable energy storage device 110 includes a portable battery or a portable rechargeable battery. In an embodiment, the portable energy storage device includes at least one of a portable mechanical energy storage device, a kinetic energy storage device, a compressed gas storage device, a spring energy storage device, a flywheel energy storage device, an inductive energy storage device, or a capacitive energy storage device. In an embodiment, the portable energy storage device includes a portable energy device that is rechargeable, rechargeable in place, refillable, or refillable in place. In an embodiment, the portable energy source includes a portable energy source configured to supply electrical power having a predetermined voltage, current, waveform, frequency, or reactive component. In an embodiment, the electrical power includes an alternating current or a direct current form of electrical power. In an embodiment, the portable energy source includes a portable energy source configured to supply electrical power having a user-selectable voltage, current, waveform, frequency, or reactive component. The user may include the health care provider, a surgeon, nurse, or other medical person. In an embodiment, the portable energy source includes a portable energy source configured to supply electromagnetic energy having a predetermined wavelength, angular divergence, spatial extent, waveform, mode structure, or polarity component. In an embodiment, the portable energy source includes a portable energy source configured to supply acoustic or ultrasound power having a predetermined wavelength, angular divergence, spatial extent, waveform, mode structure, or polarity component. In an embodiment, the portable energy source includes a portable energy source configured to supply optical power in an infrared, ultraviolet, or visible light spectrum.

In an embodiment, the portable energy source 110 includes a portable energy source having first energy source portion 112 configured to supply electrical or radiant power and a second energy source portion 114 configured to supply electrical or radiant power. The portable energy source is configured to maintain a parameter of a supplied electrical or radiant power during a replacement or recharging of one of the first portable energy source portion or the second portable energy source portion. For example, if the portable energy source is supplying electrical power, and the first and second portable energy source portions respectively each include a first and a second battery, the first battery is replaceable without a change or fluctuation in a voltage or other parameter of the electrical power supplied by the portable energy source.

In an embodiment, the portable energy source 110 further includes a continuity controller 116 configured to maintain a parameter of the electrical or radiant power supplied by the portable energy source during a replacement or recharging of one of the first energy source portion 112 of the portable energy source or the second energy source portion 114 of the portable energy source. In an embodiment, the continuity controller includes a controller configured to facilitate replacement or recharging of a first energy source portion of the portable energy source without substantially effecting electrical or radiant power supplied by the portable energy source, wherein the portable energy source includes the first energy source portion and the second energy source portion. In an embodiment, the controller includes a controller coupled to a first energy source portion of the portable energy source and to a second energy source portion of the portable energy source. The controller is configured to maintain energy transfer to the handheld medical device 130 if energy transfer from the first energy source portion or the second energy source portion is interrupted. The first energy source portion and the second energy source portion are coupled in parallel. In an embodiment, the controller includes a sensor (not shown) configured to sense an interruption of power transfer from a first energy source portion of the portable energy source or from a second energy source portion of the portable energy source (hereafter "interrupted energy source portion"). The controller also includes a switch (not shown) configured to isolate the interrupted energy source portion, and to maintain energy transfer to the handheld medical device. The first portable energy source portion and the second portable energy source portion are coupled in parallel. In an embodiment, the controller includes a sensor (not shown) configured to sense a power output interruption occurring in a first energy source portion of the portable energy source. The controller also includes a switch (not shown) configured to maintain the supplied electrical or radiant power by the portable energy source from a second energy source portion of the portable energy source in response to the sensed power output interruption. In an embodiment, the controller includes a controller configured to maintain a continuity of electrical or radiant power supplied by the portable energy source during an electrical or radiant power availability interruption of a first energy source portion of the portable energy source. The portable energy source includes the first energy source portion and a second energy source portion.

In an embodiment, the portable energy source 110 includes the first portable energy source portion 112, and the second portable energy source portion 114. The second energy portion is removable, interchangeable, rechargeable, refillable, or replaceable without interfering with the electrical or radiant power output by the portable energy source. In an embodiment, "interchangeable" includes "changeable." In an embodiment, the portable energy source includes the first portable energy source portion and the second portable energy source portion, each of which is removable, interchangeable, rechargeable, refillable, or replaceable without substantially effecting electrical or radiant power supplied by the portable energy source. In an embodiment, the portable energy source includes a portable energy source configured to supply electrical or radiant power and having a body-mounting portion configured to be carried by a first body portion of a health care provider. In an embodiment, the portable energy source includes a portable energy source configured to supply electrical or radiant power and having a clothing-engagement portion configured to be carried by an article of clothing proximate to a first body portion of a health care provider.

Figure 2:
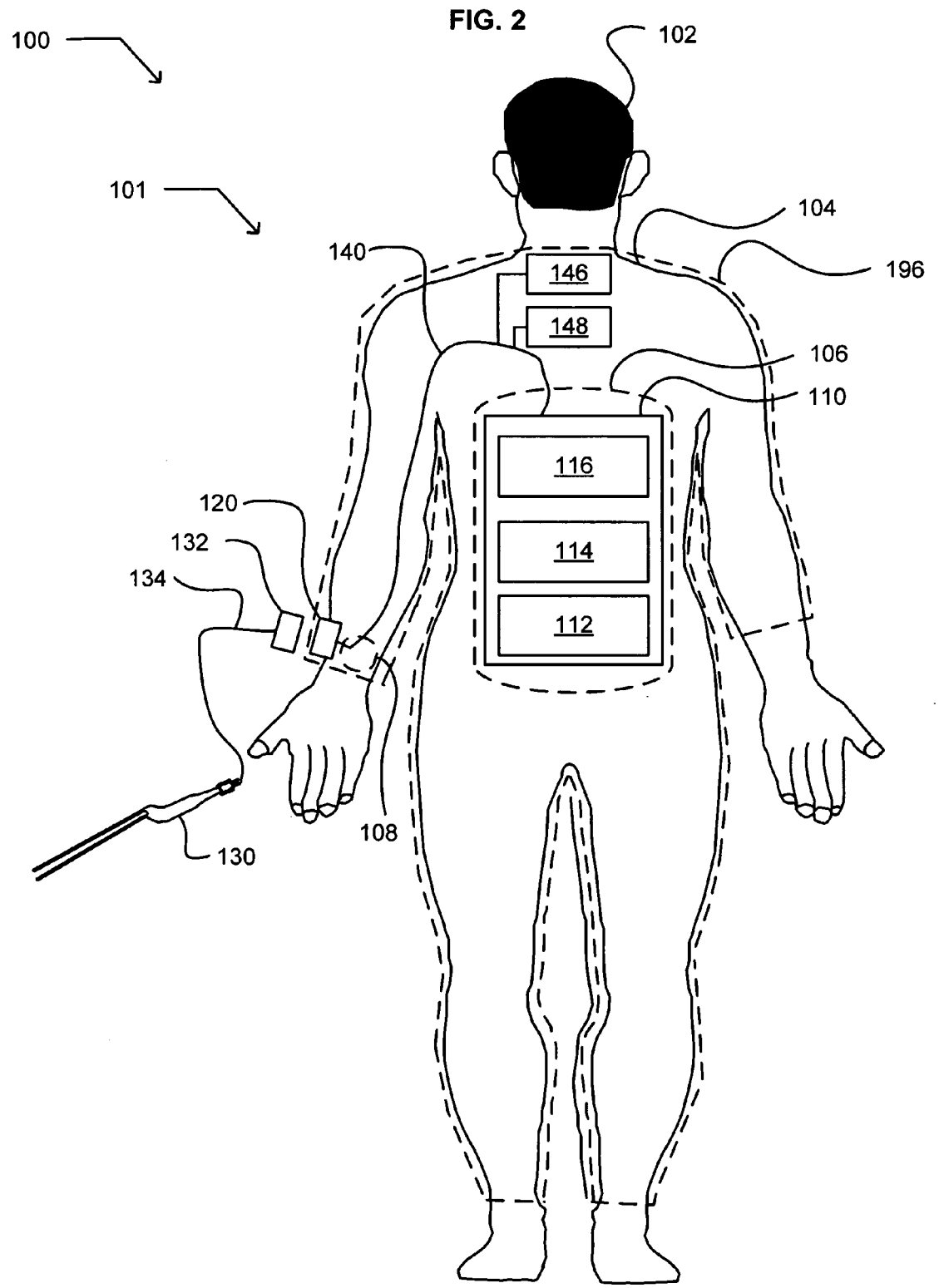
FIG. 2 illustrates an alternative embodiment of the example environment of FIG. 1.

FIG. 2 illustrates an alternative embodiment of the example environment 100 of FIG. 1. The health care provider's body 102 is illustrated as wearing or covered by an article of attire 196. In an embodiment, the article of attire includes an article of hospital attire. In an embodiment, the article of attire includes an article of surgical attire. In an embodiment, the article of attire includes an article of clinic attire. In an embodiment, the portable energy source 110 is configured to supply electrical or radiant power and configured to be carried by the article of attire 196 proximate to a first body portion of a health care provider. See text corresponding to FIG. 9 below for additional description of embodiments related to the article of attire.

Figure 3:
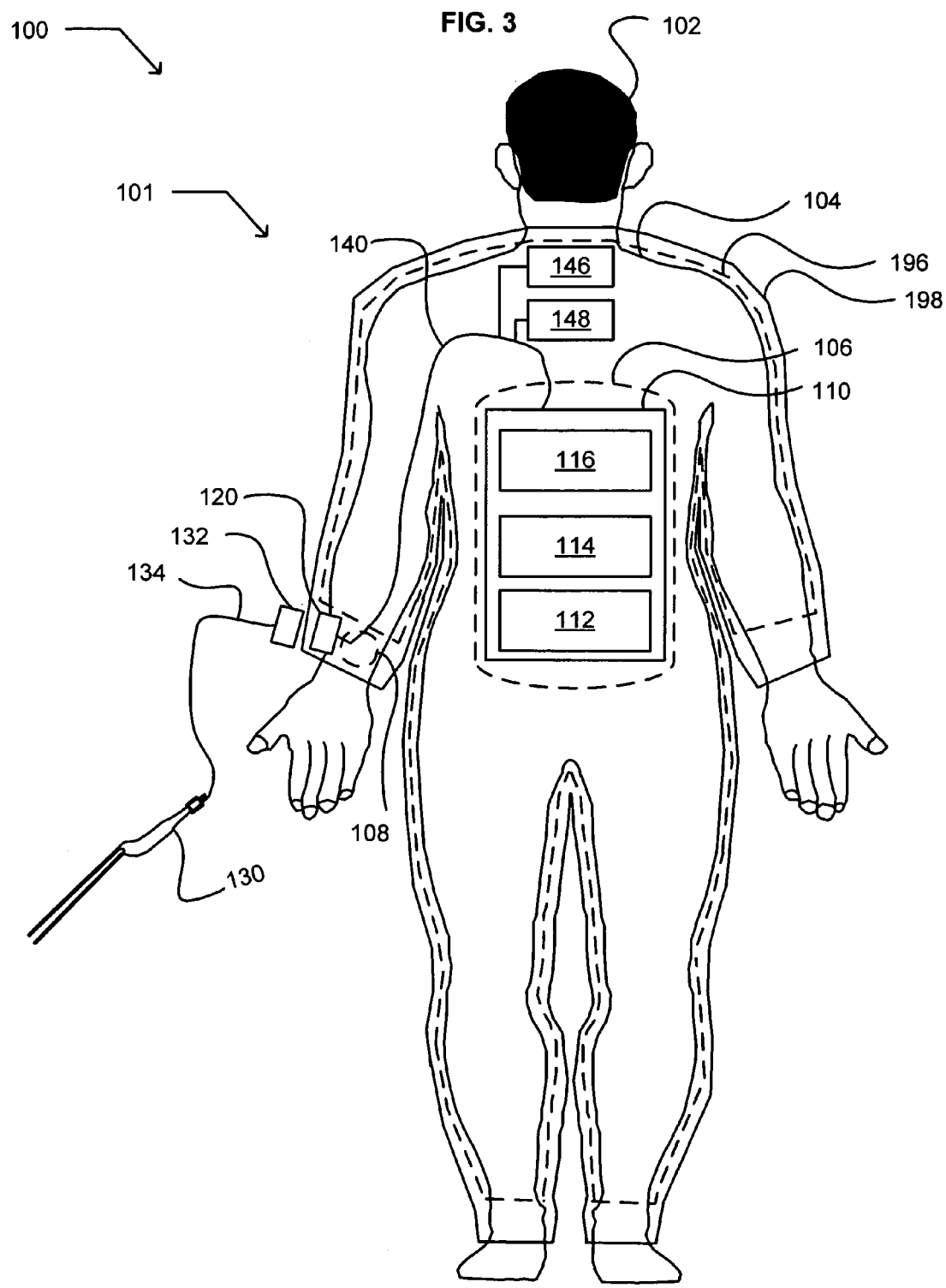
FIG. 3 illustrates another alternative embodiment of the example environment of FIG. 1.

FIG. 3 illustrates another alternative embodiment of the example environment 100 of FIG. 1. The health care provider's body 104 is illustrated as wearing or covered by a surgical barrier 198. In an embodiment, the surgical barrier may include a sterile disposable surgical gown, or a reusable surgical gown. In an embodiment, the portable energy source 110 includes a portable energy source configured to supply electrical or radiant power, to be carried proximate to a first body portion 106 of the health care provider 102, and configured to be carried between the body 104 of the health care provider and the surgical barrier 198. In an embodiment, the portable energy source includes a portable energy source configured to supply electrical or radiant power, to be carried proximate to a first body portion of a health care provider, and configured to be carried by the health care provider inside the surgical barrier having an interior surface (not shown) enclosing at least a portion of the body of the health care provider.

Returning to FIG. 1, the power-output connector 120 includes a power-output connector configured to be usable after sterilization. In an embodiment, the power-output connector includes a sterilizable power-output connector configured to releasably couple with a standardized or a proprietary power-receiving connector connected to a surgical apparatus. In an embodiment, the sterilizable power-output connector may be configured to mate with a two-pin round power-receiving connector, such as for example, as the two-pin round power-receiving connector used by the Silverglide® bipolar forceps. In an embodiment, the sterilizable power-output connector includes a sterilized power-output connector. In an embodiment, the power-output connector includes a single-use sterilized power-output connector. In an embodiment, the power-output connector includes a power-output connector configured to be usable after an exposure to a surgical sterilization. In an embodiment, the power-output connector includes a power-output connector configured to withstand an exposure to a surgical sterilization condition and to be usable after the exposure to the surgical sterilization condition. In an embodiment, the power-output connector includes a power-output connector configured to be usable after an exposure to autoclave or chemiclave sterilization. In an embodiment, the power-output connector includes a power-output connector configured to be usable after an exposure to autoclave or chemiclave sterilization, and includes a medical grade plastic, stainless steel, or titanium, or an alloy thereof. In an embodiment, a medical grade plastic may include a plastic selected for a medical application and having an appropriate biocompatibility, sterilizability, physical property, and manufacturability for its intended use. Materials and selection criteria are described for example in Hai B. Lee, et al., *Polymeric Biomaterials* in *The Biomedical Engineering Handbook* vol. 1, 39-1 to 39-2 (Joseph D. Bronzino, ed, 2d ed. CRC Press 2000). In an embodiment, the power-output connector includes a power-output connector configured to be usable after an exposure to ultraviolet light sterilization. In an embodiment, the power-output connector includes a medical grade power-output connector. For example, an embodiment of a medical grade power-output connector may include a medical grade wire and cable, or medical interconnect of a type marketed by W.L. Gore & Associates. In an embodiment, a medical grade power-output connector may include a power output connector suitably adapted or composed for use in a medical environment, including an inpatient environment, outpatient environment or surgical environment.

In an embodiment, a sterilizable object includes an object configured to be usable for its intended purpose after sterilization. In an embodiment, a sterilizable object includes a sterilized object. In an embodiment, a sterilizable object includes a single-use sterilized object. In an embodiment, a sterilizable object includes an object configured to be usable for its intended purpose after an exposure to a surgical sterilization. In an embodiment, a sterilizable object includes an object configured to withstand an exposure to a surgical sterilization condition and to be usable for its intended purpose after the exposure to the surgical sterilization condition. In an embodiment, a sterilizable object includes an object configured to be usable for its intended purpose after an exposure to autoclave or chemiclave sterilization. In an embodiment, a sterilizable object includes an object configured to be usable for its intended purpose after an exposure to ultraviolet light sterilization.

In an embodiment, the power-output connector 120 includes a power-output connector configured to releasably couple with the power-receiving connector 132 connected to a handheld medical device 130, and further configured to be carried proximate to an arm, forearm, wrist, hand, or finger of the second body portion 108 of the health care provider 102. In an embodiment, the power-output connector includes a power-output connector configured to releasably couple with a power-receiving connector connected to a handheld medical device, to be carried proximate to a second body portion at a position distal of a shoulder joint of the health care provider. In an embodiment, the power-output connector includes a power-output connector configured to releasably couple with a power-receiving connector connected to a handheld medical device, and having a body-mounting portion configured to be carried proximate to a second body portion at a position distal of a shoulder joint of the health care provider. In an embodiment, the power-output connector includes a power-output connector configured to releasably couple with a power-receiving connector connected to a handheld medical device, to be carried proximate to a second body portion 108 at a position distal of a shoulder joint of the health care provider, and to be on an exterior side surface of a sterile surgical barrier 198 (illustrated in FIG. 3) having an interior side surface enclosing at least a portion of the body 104 of the health care provider 102.

Figure 8:
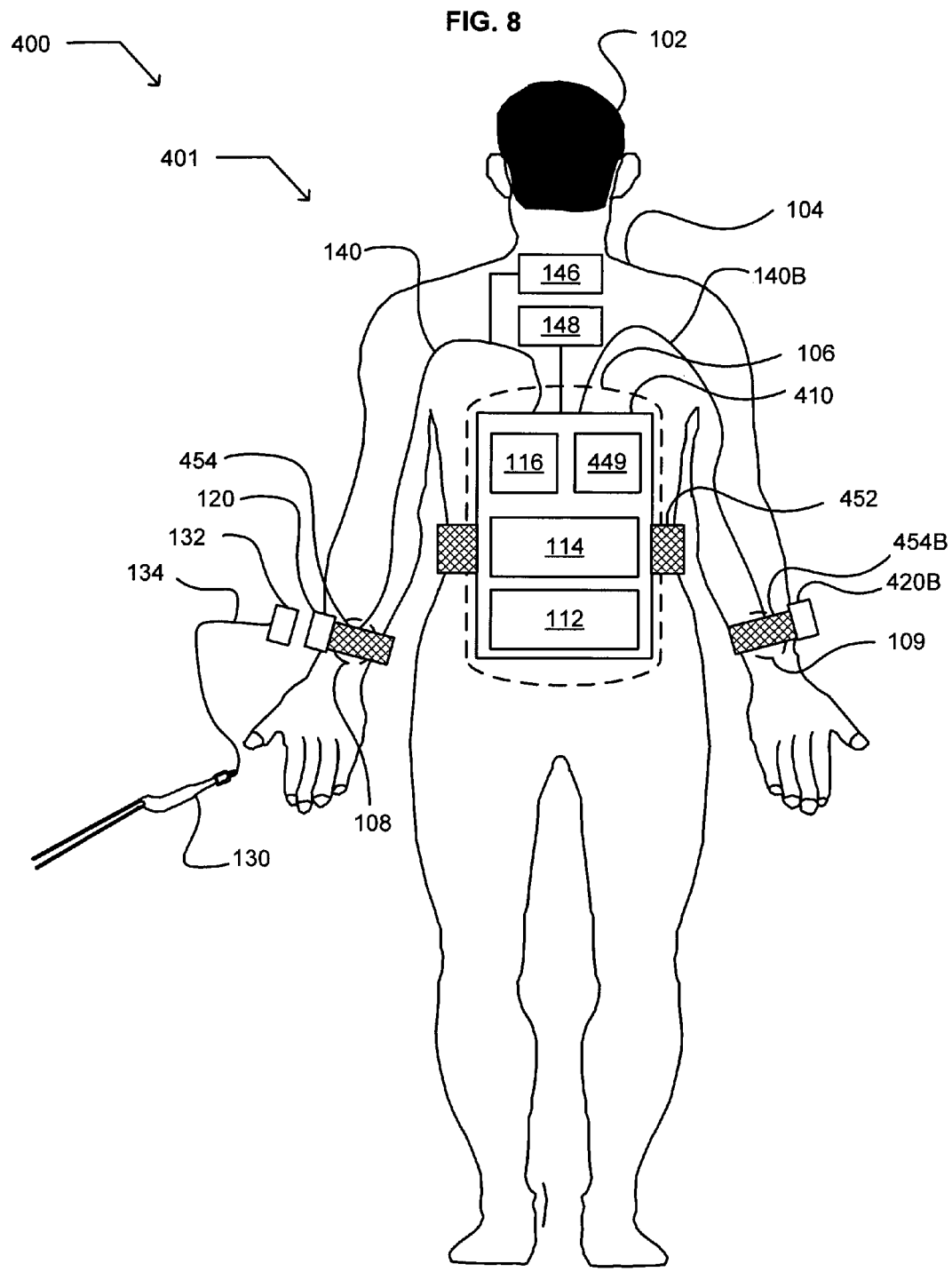
FIG. 8 illustrates an environment in which an embodiment may be implemented.

In an embodiment, the power-output connector includes a first power-output connector 120 configured to releasably couple with a first power-receiving connector 132 connected to a first handheld medical device 130. The power-output connector also includes a second power-output connector (not shown) configured to releasably couple with a second power-receiving connector (not shown) connected to second handheld medical device (not shown). Both the first power-output connector and the second power-output connector are configured to be carried proximate to a second body 108 portion at a position distal of a shoulder joint of the health care provider 102. In an embodiment, the first power-output connector and the second power-output connector may be configured to transfer a substantially similar type of electrical or radiant power. For example, both may be configured to transfer electrical power. In an embodiment, the first power-output connector and the second power-output connector may be configured to transfer a substantially different type of electrical or radiant power. For example, the first power-output connector may be configured to transfer electrical power, and the second power-output connector may be configured to transfer laser radiant power. In an embodiment, the power-output connector includes a first power-output connector configured to releasably couple with a power-receiving connector connected to a handheld medical device and configured to be carried proximate to a second body portion at a position distal of a shoulder joint of the health care provider, and a second power-output connector configured to releasably couple with an second power-receiving connector connected to second handheld medical device and configured to be carried proximate to a third body portion of the health care provider. FIG. 8 below illustrates an example alternative embodiment of the above power-output connector. The first power-output connector is illustrated as the first power-output connector 120, and the second power-output connector is illustrated as second power-output connector 420B. The second body portion is illustrated as the second body portion 108 and the third body portion is illustrated as a third body portion 109.

Continuing with FIG. 1, in an embodiment, the power-output connector 120 includes a power-output connector configured to releasably couple with a power-receiving connector 132 connected to a handheld medical device 130 and configured to be carried proximate to a second body portion 108 at a position distal of a shoulder joint of the health care provider 102. If releasably coupled, the power-output connector and the power-receiving connector transfer sufficient electrical or radiant power to directly power the handheld medical device. In an embodiment, the power-output connector includes a power-output connector configured to releasably couple with a power-receiving connector connected to a handheld medical device and configured to be carried proximate to a second body portion at a position distal of a shoulder joint of the health care provider. If releasably coupled, the power-output connector and the power-receiving connector transfer sufficient electrical or radiant power to charge or recharge an energy storage device associated with the handheld medical device. In an embodiment, the power-output connector includes a power-output connector substantially compliant with "ANSI/AAMI ES-60601-1:2006, Medical electrical equipment—Part 1: General requirements for basic safety and essential performance," issued in March 2006 by the American National Standards Institute (ANSI) in partnership with the Association for the Advancement of Medical Instrumentation (AAMI). In an embodiment, if coupled, the power-output connector and power-receiving connector 132 are operable to transfer information and the electrical or radiant power between the portable energy source and the handheld medical device. For example, information may include information indicative of temperature, speed, or a fault in the handheld medical device.

In an embodiment, the handheld medical device 130 includes a portable surgical apparatus having a portion shaped to be hand-held by the health care provider 120. In an embodiment, the handheld medical device includes a portable surgical apparatus having a portion shaped and sized to be hand-held by the health care provider. In an embodiment, the power-receiving connector 132 includes a power-receiving connector reusable after sterilization by autoclave, chemiclave, or ultraviolet light.

In an embodiment, the connective structure 140 includes an electrical conductor configured to electrically couple electrical power supplied by the portable energy source 110 between the portable energy source and the power-output connector 120. For example, the electrical conductor may include a wire, coax cable, or a trace configured to electrically couple the electrical power between the portable energy source and the power-output connector. In an embodiment, the connective structure includes an electromagnetic wave guide, or an optical connective structure configured to optically couple laser power supplied by the portable energy source between the portable energy source and the power-output connector. In an embodiment, the connective structure includes a flexible connective structure configured to transfer electrical or radiant power supplied by the portable energy source between the portable energy source and the power-output connector. In an embodiment, the connective structure includes an acoustic wave-guide connective structure configured to transfer radiant power supplied by the portable energy source between the portable energy source and the power-output connector. In an embodiment, the connective structure includes a connective structure configured to transfer the electrical or radiant power supplied by the portable energy source between the portable energy source and the power-output connector, and configured for an association with an article of attire wearable by the health care provider 102. In an embodiment, the connective structure includes a connective structure configured to transfer the electrical or radiant power supplied by the portable energy source between the portable energy source and the power-output connector, and configured to be worn at least partially inside a surgical barrier. In an embodiment, the connective structure includes a connective structure configured to transfer the electrical or radiant power supplied by the portable energy source between the portable energy source and the power-output connector, and to be worn at least partially inside an article of clothing or a sterile barrier. In an embodiment, the connective structure includes a connective structure configured to the transfer electrical or radiant power supplied by the portable energy source between the portable energy source and the power-output connector, and having two or more interconnectable portions (not shown). In an embodiment, the connective structure includes a connective structure configured to transfer the electrical or radiant power supplied by the portable energy source between the portable energy source and the power-output connector, and structurally integrated with an article of clothing. In an embodiment, the connective structure includes a wireless transmitter (not shown) coupled with the portable energy source and a wireless receiver (not shown) coupled with the power-output connector. The wireless transmitter and the wireless receiver are configured in combination to transfer electrical or radiant power between the portable energy source and the power-output connector, the transferred electrical or radiant power derived from the electrical or radiant power supplied by the portable energy source.

In an embodiment, the wearable power supply system 101 includes a controller 146 configured to regulate a parameter of the electrical or radiant power supplied by the portable energy source 110, and configured to be carried proximate to a body portion of a health care provider 102. In an embodiment, the controller may be physically incorporated into the portable energy source (not shown). In another embodiment, the controller may be physically separate from the portable energy source. In an embodiment, the controller includes a controller configured to regulate a parameter of the electrical or radiant power supplied by the portable energy source in response to an input received from the health care provider or from another human (not shown). For example, a regulated parameter may include a voltage, current, frequency, or ac/dc parameter of the electrical or radiant power supplied by the portable energy source. For example, a regulated parameter may include an intensity or time variable parameter of the electrical or radiant power supplied by the portable energy source. In an embodiment, the controller includes a controller configured to regulate a parameter of the electrical or radiant power supplied by the portable energy source in response to a user-input received from the health care provider or another human, and to be wearable by the health care provider. In an embodiment, the controller includes a controller configured to regulate a parameter of the electrical or radiant power supplied by the portable energy source in response to information initiated by the handheld medical device 130. For example, the handheld medical device may be configured to generate information relating to its operation, such as operating conditions, or relating to a patient. In an embodiment, the controller includes a controller configured to regulate a parameter of the electrical or radiant power supplied by the portable energy source in response to a signal initiated by a device external to the system (not shown). For example, the external apparatus may include an external computing device or a remote controller. In an embodiment, the controller includes a controller configured to select an operating mode of the portable energy source, and to be wearable by the health care provider.

Continuing with FIG. 1, in an embodiment, the handheld medical device 130 may include a handheld medical device powered by electrical or radiant energy. An embodiment of the handheld medical device is illustrated in FIG. 1 as a bipolar forceps, but may include any handheld medical device. In an embodiment, the handheld medical device may include a handheld tool or instrument. In an embodiment, the handheld medical device includes a handheld stapler device, suture device, drill, saw, handheld electrocautery device (bipolar, unipolar), laser cautery, ultrasound, tissue ablation (CUSA), laser-beaming device, such as a laser light or a laser cauterizing device, lighting device, portable x-ray source, or traction device. An example of a handheld electrocautery device includes Bovie® brand bipolar forceps sold by Bovie Medical Corporation of Clearwater, Fla. In an embodiment, the handheld medical device includes a handheld electrocautery, laser cautery, ultrasound, tissue ablation, laser-beaming device, portable x-ray source, or traction device. In an embodiment, a tissue ablation device may include an ultrasonic tissue ablation handpiece, for example, such as an ultrasonic tissue ablation handpiece used in and sold under a CUSA® brand ultrasonic tissue ablation system. In an embodiment, the power-receiving connector 132 may be physically incorporated into the handheld medical device 130. In an embodiment, the power-receiving connector may be connected to the handheld medical device by a conductor 134.

In an embodiment, the wearable power supply system 101 includes a power converter 148 operable to convert a first form of electrical or radiant power supplied by the portable energy source to a second form of electrical or radiant power. For example, the power converter may be operable to convert optical energy to electrical energy, or electrical energy to optical energy. For example, the power converter may be operable to convert a first AC electrical energy to a second AC electrical energy. For example, the power converter may be operable to convert a first DC electrical energy to a second DC electrical energy. For example, the power converter may be operable to convert AC electrical energy to DC electrical energy, or DC energy to AC electrical energy. For example, the power converter may be operable to convert an electrical energy to an acoustic energy, or an acoustic energy to an electrical energy. For example, the power converter may be operable to convert a first optical energy to a second optical energy. In an embodiment, the power converter may be physically associated with the power source 110. In an embodiment, the power converter is physically connected to the power-output connector.

FIG. 4 illustrates an example operational flow 200. After a start operation, the operational flow moves to a first carrying operation 210. The first carrying operation includes carrying proximate to a first body portion of a health care provider a portable energy source supplying electrical or radiant power. In an embodiment, the first carrying operation may include carrying proximate to a first body portion of a health care provider a portable energy source supplying electrical or radiant power. In an embodiment, the first carrying operation may include putting on or donning proximate to a first body portion of a health care provider a portable energy source supplying electrical or radiant power. In an embodiment, the portable energy source may be carried by straps or garment. In an embodiment, the first carrying operation may be implemented using the portable energy source 110 described in conjunction with FIG. 1.

A second carrying operation 220 includes carrying proximate to a second body portion of the health care provider a power-output connector configured to releasably couple with a power-receiving connector connected to a handheld medical device. If coupled, the power-output connector and power-receiving connector are operable to transfer the electrical or radiant power supplied by the portable energy source. In an embodiment, the second carrying operation may include carrying proximate to a second body portion of the health care provider a power-output connector configured to releasably couple with a power-receiving connector connected to a handheld medical device. In an embodiment, the second carrying operation may include putting on or donning proximate to a, second body portion of the health care provider a power-output connector. In an embodiment, the second carrying operation may be implemented using the power-output connector 120 described in conjunction with FIG. 1.

A conveyance operation 250 includes carrying proximate to the body of the health care provider a connective structure configured to transfer the electrical or radiant power supplied by the portable energy source between the portable energy source and the power-output connector. For example, an embodiment may include a flexible connective structure configured to transfer the electrical or radiant power supplied by the portable energy source between the portable energy source and the power-output connector. The conveyance operation 250 may be implemented using the connective structure 140 described in conjunction with FIG. 1.

A coupling operation 230 includes coupling the power-output connector and the power-receiving connector of the handheld medical device. The coupling operation may be implemented by the health care provider 102 described in conjunction with FIG. 1, or another person, such as a surgical nurse. An activation operation 240 includes activating the handheld medical device with electrical or radiant power supplied by the portable energy source. In an embodiment, the activation operation may be implemented by the health care provider. The operational flow includes a stop operation.

In an embodiment, the operational flow 200 may include decoupling the power-output connector and the power-receiving connector connected to the handheld medical device; and coupling the power-output connector with another power-receiving connector connected to another handheld medical device. If coupled, the power-output connector and the another power-receiving connector are operable to transfer the electrical or radiant power supplied by the portable energy source.

In an embodiment, the operational flow 200 may include wearing proximate to a third body portion of the health care provider a third carrier holding another power-output connector configured to releasably couple with another power-receiving connector connected to another handheld medical device. If coupled, the another power-output connector and the another power-receiving connector are operable to transfer the electrical or radiant power supplied by the portable energy source. This operation also includes coupling the another power-output connector and the another power-receiving connector of the another handheld medical device. This operation further includes activating the another handheld medical device with electrical or radiant power supplied by the portable energy source.

FIG. 5 illustrates an alternative embodiment of the operational flow 200 described in conjunction with FIG. 4. The second carrying operation 220 may include at least one alternative embodiment. The at least one alternative embodiment may include an operation 222, an operation 224, an operation 226, an operation 228, and an operation 229. At the operation 222, the first body portion of the heath care provider is not the same as the second body portion. At the operation 224, the first body portion of the heath care provider is substantially similar to the second body portion. At the operation 226, the second body portion of the health care provider includes a limb portion of the health care provider. For example, an arm, or a leg. At the operation 228, the second body portion of the health care provider is at a position distal of a shoulder joint of the health care provider. For example, an arm, upper arm, forearm, hand, or finger. At the operation 229, the second body portion of the health care provider is at a position distal of a shoulder joint of the health care provider. For example, a forearm, hand, wrist, or finger.

Figure 6:
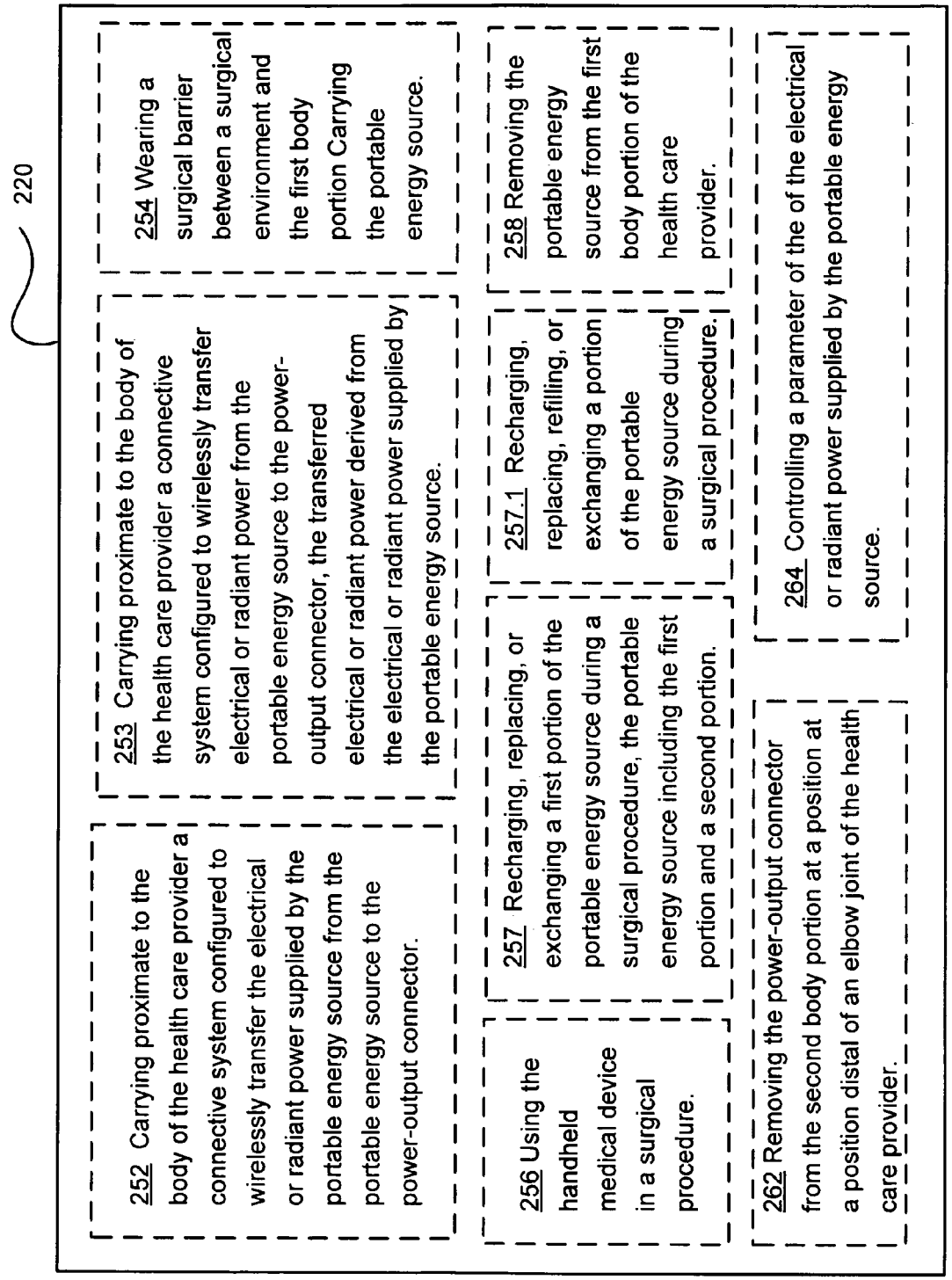
FIG. 6 illustrates another alternative embodiment of the operational flow described in conjunction with FIG. 4.

FIG. 6 illustrates another alternative embodiment of the operational flow 200 described in conjunction with FIG. 4. The operational flow 200 may include at least one additional operation. The at least one additional operation may include an operation 252, an operation 253, an operation 254, an operation 256, an operation 257, an operation 258, an operation 262, or an operation 264. The operation 252 includes carrying proximate to the body of the health care provider a connective system configured to wirelessly transfer the electrical or radiant power supplied by the portable energy source from the portable energy source to the power-output connector. The operation 253 includes carrying proximate to the body of the health care provider a connective system configured to wirelessly transfer electrical or radiant power from the portable energy source to the power-output connector, the transferred electrical or radiant power derived from the electrical or radiant power supplied by the portable energy source. The operation 254 includes wearing a surgical barrier between a surgical environment and the first body portion carrying the portable energy source. The operation 254 may be implemented by the health care provider wearing the surgical barrier 198 in a surgical environment as described in conjunction with FIG. 3. The operation 256 includes using the handheld medical device in a surgical procedure. The operation 257 includes recharging, replacing, refilling, or exchanging a first portion of the portable energy source during a surgical procedure, the portable energy source including the first portion and a second portion. The operation 257.1 includes recharging, replacing, refilling, or exchanging a portion of the portable energy source during a surgical procedure. The operation 258 includes removing the portable energy source from the first body portion of the health care provider. The operation 262 includes removing the power-output connector from the second body portion of the health care provider. The operation 264 includes controlling a parameter of the electrical or radiant power supplied by the portable energy source.

FIG. 7 illustrates an example system 300. The system includes means 310 for carrying proximate to a first body portion of a health care provider a portable energy source supplying electrical or radiant power. The system includes means 320 for carrying proximate to a second body portion of the health care provider a power-output connector configured to releasably couple with a power-receiving connector connected to a handheld medical device. If coupled, the power-output connector and power-receiving connector are operable to transfer the electrical or radiant power supplied by the portable energy source. The system also includes means 330 for carrying proximate to the body of the health care provider a connective structure configured to transfer the electrical or radiant power supplied by the portable energy source between the portable energy source and the power-output connector. The system further includes means 340 for coupling the power-output connector and the power-receiving connector of the handheld medical device. The system includes means 350 for activating the handheld medical device with the electrical or radiant power supplied by the portable energy source.

FIG. 8 illustrates an environment 400. The environment includes the health care provider 102 having a body, which is illustrated by the posterior outline view of the heath care provider's body 104. The environment also includes a wearable power supply system 401. The system includes the portable energy source 110 configured to supply electrical or radiant power, and configured to be carried by the health care provider.

The system 401 also includes the power-output connector 120 configured to releasably couple with a power-receiving connector 132 connected to the handheld medical device 130, and configured to be carried by the health care provider. If coupled, the power-output connector and power-receiving connector are operable to transfer the electrical or radiant power supplied by the portable energy source. In an embodiment, if coupled, the power-output connector and power-receiving connector are operable to transfer the electrical or radiant power supplied by the portable energy source, and to transmit information between the power-output connector and the handheld medical device. In an embodiment, if coupled, the power-output connector and power-receiving connector are operable to electrically, radiantly, optically transfer the electrical or radiant power supplied by the portable energy source. In an embodiment, if coupled, the power-output connector and power-receiving connector are operable to transfer the electrical or radiant power supplied by the portable energy source between the power-output connector and the handheld medical device.

The system 401 further includes the connective structure 140 configured to transfer the electrical or radiant power supplied by the portable energy source between the portable energy source 110 and the power-output connector 120.

Figure 9:
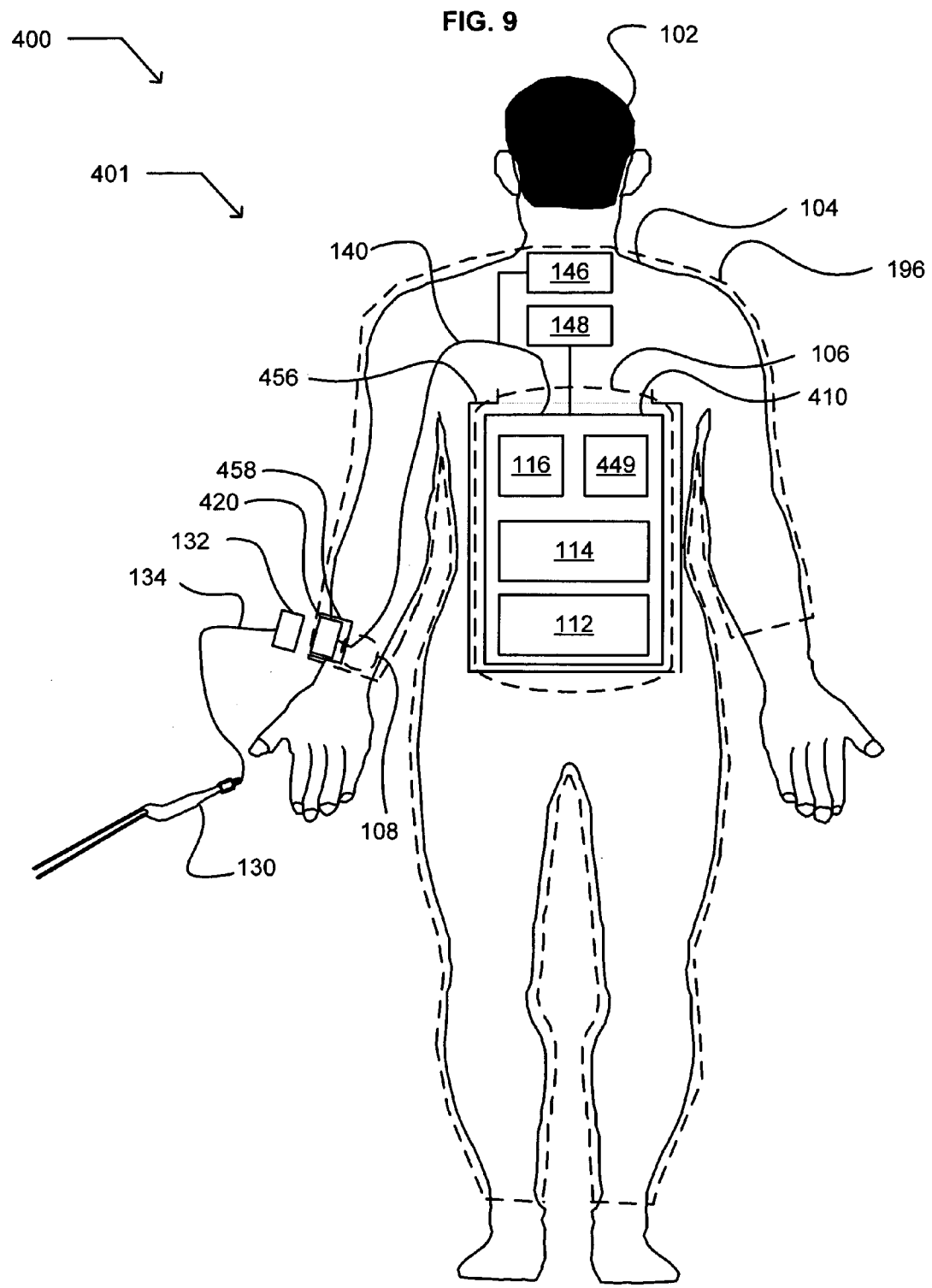
FIG. 9 illustrates an embodiment of the system described in conjunction with FIG. 8 wherein a pocket on the article of attire defines the second carrier.

In an embodiment, the system 401 includes a first carrier 452 configured to hold the portable energy source, the first carrier configured for physical association with a first body portion 106 of the health care provider. In an embodiment, the first carrier is illustrated as a waist strap or a belt. In an embodiment, the first carrier is configured to supportively carry the portable energy source. In an embodiment, the first carrier is configured for a supported engagement with an article of clothing or an attire. In an embodiment, the first carrier includes a first carrier structurally integrated with the portable energy source and having a body-mounting portion configured to be carried by a first body portion of a health care provider. In an embodiment, the first carrier 452 includes a first carrier configured to hold the portable energy source 110, and configured to be wearable by the health care provider 102 on a first body portion 106 of the health care provider. In an embodiment, the first carrier may include shoulder straps, for example, such as used by a backpack. In an embodiment, the first carrier may include waist strap, such as a belt or a holster. In an embodiment, the first carrier may include a harness. In an embodiment, the first carrier may be configured to be worn directly adjacent to the skin of the health care provider. In an embodiment, the first carrier may be configured to be worn over underwear, a garment, or an outer garment worn by the health care provider. For example, the first carrier may be configured to be worn over the article of attire, such as the article of attire 196 described below in conjunction with FIG. 9. In an embodiment, the first body portion may include the chest, torso, waist, limb, foot, or ankle portion of the health care provider. In an embodiment, the first carrier includes first carrier physically associated with an article of attire wearable by the health care provider, and configured in its physical association with the article of attire to hold the portable energy source proximate to the first body portion of the health care provider. For example, in an embodiment, an attire wearable by the health care provider may include a vest, shirt, pants, surgical garment, pack, or holster. For example, FIG. 9 illustrates an embodiment of the system 401 wherein a pocket 456 of the article of attire 196 defines the first carrier. The pocket is configured to hold the portable energy source 110. Returning to FIG. 8, in an embodiment, the first carrier includes a first carrier configured to carry the portable energy source proximate to the first body portion of the health care provider, the first carrier having at least one of a positioning strap, belt, holder, harness, or material configured for removable physical association with the health care provider. In an embodiment, the first carrier includes a first carrier configured to be usable after a sterilization, to hold the portable energy source, and to be physically associatable with the first body portion of the health care provider.

In an embodiment, the power-output connector includes a first power-output connector 120 configured to releasably couple with the first power-receiving connector 132 connected to the first handheld medical device 130, and a second power-output connector 420B configured to releasably couple with a second power-receiving connector (not shown) connected to a second handheld medical device (not shown). In an embodiment, the second power-output connector includes an electrical power-output connector configured to releasably couple with the second electrical power-receiving connector connected to the second handheld medical device. In an embodiment, the first power-output connector includes an electrical power-output connector configured to releasably couple with an electrical power-receiving connector connected to the handheld medical device. In this embodiment, the second power-output connection includes an optical power-output connector configured to releasably couple with an optical power-receiving connector connected to the another handheld medical device. For example, in this embodiment, the electrical power-output connector may be illustrated by the power-output connector 120 and the optical power-output connector may be illustrated by the second power-output connector 420B. In an embodiment, the first power-output connector and the second power-output connector may be spaced apart structures, such as illustrated in FIG. 8. In an embodiment, the first power-output connector and the second power-output connector may be carried by a single chassis (not shown). In an embodiment, the power-output connector 420B includes a power-output connector configured to be usable after sterilization. In an embodiment, the sterilizable power-output connector may include a sterilizable or sterilized power-output connector configured for a single medical use, or to be medically reusable.

In an embodiment, the system 401 includes a second carrier configured to hold the power-output connector 120, and to be physically associatable with the second body portion 108 at a position distal of a shoulder joint of the health care provider 102. An embodiment of the second carrier is illustrated in FIG. 8 as a second carrier 454. In an embodiment, the second carrier includes a second carrier structurally integrated with the power-output connector, and having a body mounting portion configured to be removably carried by a second body portion at a position distal of a shoulder joint of the health care provider. In an embodiment, the second carrier includes a second carrier configured to hold the power-output connector and to be wearable by the health care provider on a second body portion at a position distal of a shoulder joint of the health care provider. In an embodiment, the second carrier includes a second carrier having at least one of a positioning strap, belt, holder, harness, or material configured to carry the power-output connector proximate to a second body portion 108 at a position distal of a shoulder joint of the health care provider 102. In an embodiment, the second carrier includes a second carrier configured to be usable after sterilization, and to hold the power-output connector proximate to the second body portion at a position distal of a shoulder joint of the health care provider. In an embodiment, the second carrier includes a second carrier having a substantially different structure than the first carrier. In an embodiment, the second carrier includes a second carrier having a substantially similar structure as the first carrier 452. FIG. 8 also illustrates a third carrier 454B configured to hold the power-output connector 420B, to be physically associatable with a third body portion 109 at a position distal of a shoulder joint of the health care provider.

FIG. 9 illustrates an embodiment of the system 401 wherein a pocket 458 on the article of attire 196 defines the second carrier. The pocket is configured to hold the power-output connector 120. The pocket is located on the article of attire such that, if the article of attire is worn by the health care provider 120, the pocket is positioned proximate to the second body portion 108 at a position distal of a shoulder joint of the health care provider.

Returning to FIG. 8, in an embodiment, the system includes the controller 146 configured to regulate a parameter of the electrical or radiant power supplied by the portable energy source, and to be wearable by the health care provider 102. In an embodiment, the controller includes a controller configured to regulate a parameter of the electrical or radiant power supplied by the portable energy source to a first power-output connector or to a second power-output connector, for example, such as the first power-output connector 120 and the second power-output connection 420B. In an alternative embodiment, the system includes another connective structure 140B configured to transfer the electrical or radiant power supplied by the portable energy source between the portable energy source 110 and the second power-output connector 420B.

In an embodiment, the system 401 includes a resource indicator 449 configured to describe a power-output capacity of the portable energy source 110. In an embodiment, the resource indicator may include an analog or digitally implemented display. In an embodiment, the resource indicator may include a gauge or indicator light. In an embodiment, the resource indicator may be physically incorporated into the portable energy source. In another embodiment, the resource indicator may be physically separate from the portable energy source (not shown). In an embodiment, the resource indicator is configured to describe a current or future power-output capacity of the portable energy source, such as amps outputted or amps remaining. In an embodiment, the resource indicator includes a resource indicator configured to describe a load on the portable energy source.

FIG. 10 illustrates an example operational flow 500. After a start operation, the operational flow includes a first carrying operation 510. The first carrying operation includes wearing proximate to a first body portion of a health care provider a first carrier holding a portable energy source configured to supply electrical or radiant power. In an embodiment, the first carrying operation may be implemented using the portable energy source 110 and the carrier 452 described in conjunction with FIG. 8. A second carrying operation 520 includes wearing proximate to a second body portion of the health care provider a second carrier holding a power-output connector configured to releasably couple with a power-receiving connector connected to a handheld medical device. If coupled, the power-output connector and power-receiving connector are operable to transfer the electrical or radiant power supplied by the portable energy source. In an embodiment, the second body portion of the health care provider includes a limb portion of the health care provider. In an embodiment, the second body portion of the health care provider includes a portion at a position distal of a shoulder joint of the health care provider. In an embodiment, the second body portion of the health care provider includes a portion at a position distal of an elbow joint of the health care provider. In an embodiment, the second carrying operation may be implemented using the power-output connector 120 and the carrier 454 described in conjunction with FIG. 8.

A transmission operation 560 includes wearing a connective structure configured to transfer the electrical or radiant power supplied by the portable energy source between the portable energy source and the power-output connector. In an embodiment, the operation 560 may be implemented using the connective structure 140 described in conjunction with FIG. 1. A linking operation 530 includes coupling the power-output connector and the power-receiving connector of the handheld medical device. In an embodiment, the linking operation may be implemented by the health care provider or an assistant coupling the power-output connector 120 and the power-receiving connector 132 of the handheld medical device 130. A commence operation 540 includes activating the handheld medical device with electrical or radiant power supplied by the portable energy source. The commence operation may be implemented by the health care provider 102 switching on the handheld medical device 130 of FIG. 8. The operational flow includes an end operation.

FIG. 11 illustrates an alternative embodiment of the operational flow 500 described in conjunction with FIG. 10. In an embodiment, the operational flow may include at least one additional operation, such as an operation 515, an operation 525, or an operation 550. The operation 515 includes physically associating the portable energy source with the first carrier. The operation 525 includes physically associating the power-output connector with the second carrier. The operation 550 includes wearing a surgical barrier between a surgical environment and the first body portion of the health care provider. The operation 550 may be implemented by the health care provider 102 wearing the surgical barrier 198 between a surgical environment (not shown) and the first body portion 106 of the health care provider described in conjunction with FIG. 3.

FIG. 12 illustrates another alternative embodiment of the operational flow 500 described in conjunction with FIG. 10. The operational flow may include at least one additional operation. The at least one additional operation may include an operation 570. The operation 570 includes decoupling the power-output connector and the power-receiving connector connected to the handheld medical device. The operation 570 also includes coupling the power-output connector and another power-receiving connector connected to another handheld medical device. If coupled, the power-output connector and the another power-receiving connector are operable to transfer the electrical or radiant power supplied by the portable energy source.

FIG. 13 illustrates an alternative embodiment of the operational flow 500 described in conjunction with FIG. 10. The operational flow may include at least one additional operation illustrated as an operation 580. The at least one additional operation 580 may include an operation 582, an operation 584, or an operation 586. The operation 582 includes wearing proximate to a third body portion of the health care provider a third carrier holding another power-output connector configured to releasably couple with another power-receiving connector connected to another handheld medical device. In an embodiment, the third body portion is substantially the same as the second body portion. In an embodiment, the third body portion is not the same as the second body portion. For example, see the first body portion 108 and the second body portion 109 described in conjunction with FIG. 8. If coupled, the another power-output connector and the another power-receiving connector are operable to transfer the electrical or radiant power supplied by the portable energy source. In an embodiment, the another power-output connector may be implemented using the power-output connector 420B. The operation 584 includes coupling the another power-output connector and the another power-receiving connector of the another handheld medical device. The operation 586 includes activating the another handheld medical device with electrical or radiant power supplied by the portable energy source.

FIG. 14 illustrates an example operational flow 600. After a start operation, the operational flow includes a first mounting operation 610. The first mounting operation includes physically associating a portable energy source configured to supply electrical or radiant power with a first carrier. In an embodiment, the first mounting operation may be implemented using the portable energy source 110 and the first carrier 452 described in conjunction with FIG. 8. In an embodiment, physically associating may include at least one of the first carrier demountably securing, releasably securing, attaching, mounting, affixing, or releasably retaining the portable energy source. In an embodiment, the physically associating a portable energy source configured to supply electrical or radiant power with a first carrier includes physically associating a portable energy source configured to supply electrical or radiant power with a first carrier. A first wearing operation 620 includes donning proximate to a first body portion of a health care provider the first carrier and the physically-associated portable energy source. For example, in an embodiment, the first assistance operation may include an operating room nurse or assistant helping the health care provider put on or don the first carrier and the physically associated portable energy source.

A second wearing operation 660 includes donning a connective structure configured to transfer the electrical or radiant power between the portable energy source and the power-output connector. The connective structure having a first portion coupled with the portable energy source and a second portion coupled with the power-output connector. In an embodiment, the connective structure may be implemented using the connective structure 140 described in conjunction with FIG. 1.

A second mounting operation 630 includes physically associating a power-output connector with a second carrier, the power-output connector configured to releasably couple with a power-receiving connector connected to a handheld medical device. If coupled, the power-output connector and power-receiving connector are operable to transfer the electrical or radiant power supplied by the portable energy source. In an embodiment, physically associating a power-output connector with a second carrier includes physically associating a power-output connector with a second carrier. In an embodiment, the physically associating a power-output connector with a second carrier may be implemented using the power-output connector 120 and the second carrier 454 described in conjunction with FIG. 8. A third wearing 640 includes donning proximate to a second body portion at a position distal of a shoulder joint of the health care provider the second carrier and the physically associated power-output connector. For example, in an embodiment, the operating room nurse or assistant may help the health care provider put on the second carrier and the physically associated power-output connector. The operational flow includes an end operation.

In an embodiment, the operational flow may include at least one additional operation. The at least one additional operation may include an operation 650, an operation 670, or an operation 680. The operation 650 includes activating a coupling of the power-output connector and the power-receiving connector connected to the handheld medical device. The operation 670 includes wearing a surgical barrier between a surgical environment and the first body portion of the health care provider. The operation 680 includes activating the handheld medical device with the electrical or radiant power supplied by the portable energy source.

An embodiment provides an alternative operational flow. After a start operation, the operational flow includes carrying proximate to a first body portion of a health care provider a portable energy source configured to supply electrical or radiant power. In an embodiment, the operation may be implemented using the portable energy source 110 and the first carrier 452 described in conjunction with FIG. 8. The operational flow also includes carrying proximate to a second body portion of the health care provider a portable power transmitter configured to transfer the electrical or radiant power supplied by the portable energy source to a wireless power receiver connected to a handheld medical device. In an embodiment, the operation may be implemented using the power-output connector 120. The operational flow also includes activating the handheld medical device with electrical or radiant power supplied by the portable energy source. The operational flow includes an end operation. In an embodiment, the alternative operational flow includes initiating a wireless transfer of the electrical or radiant power supplied by the portable energy source from the portable power transmitter to the wireless power receiver connected to the handheld medical device.

Figure 15:
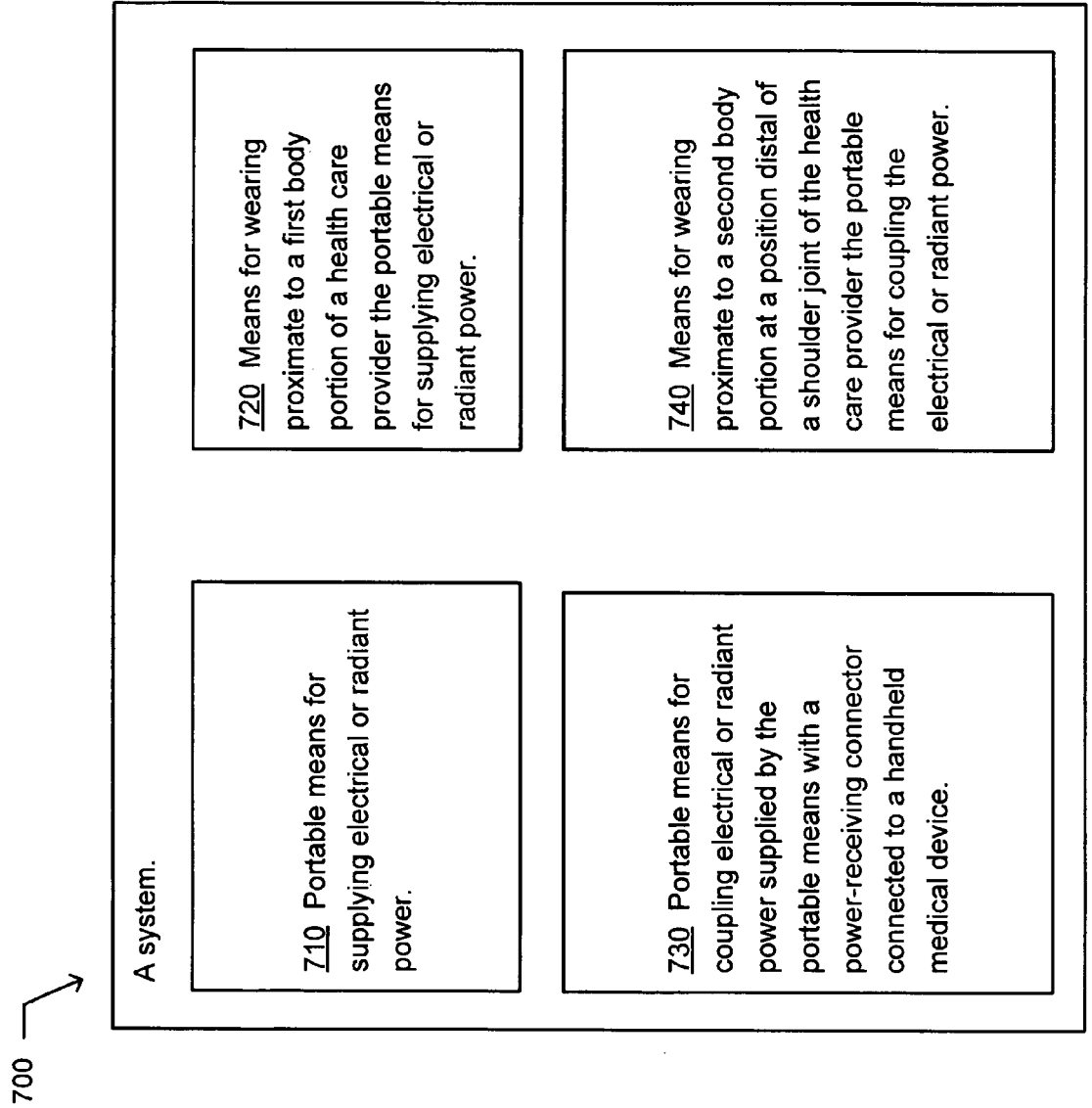
FIG. 15 illustrates an example system in which an embodiment may be implemented.

FIG. 15 illustrates an example system 700. The system includes portable means 710 for supplying electrical or radiant power. The system also includes means 720 for wearing proximate to a first body portion of a health care provider the portable means for supplying electrical or radiant power. The system includes portable means 730 for coupling electrical or radiant power supplied by the portable means with a power-receiving connector connected to a handheld medical device. The system also includes means 740 for wearing proximate to a second body portion at a position distal of a shoulder joint of the health care provider the portable means for coupling the electrical or radiant power.

Figure 16:
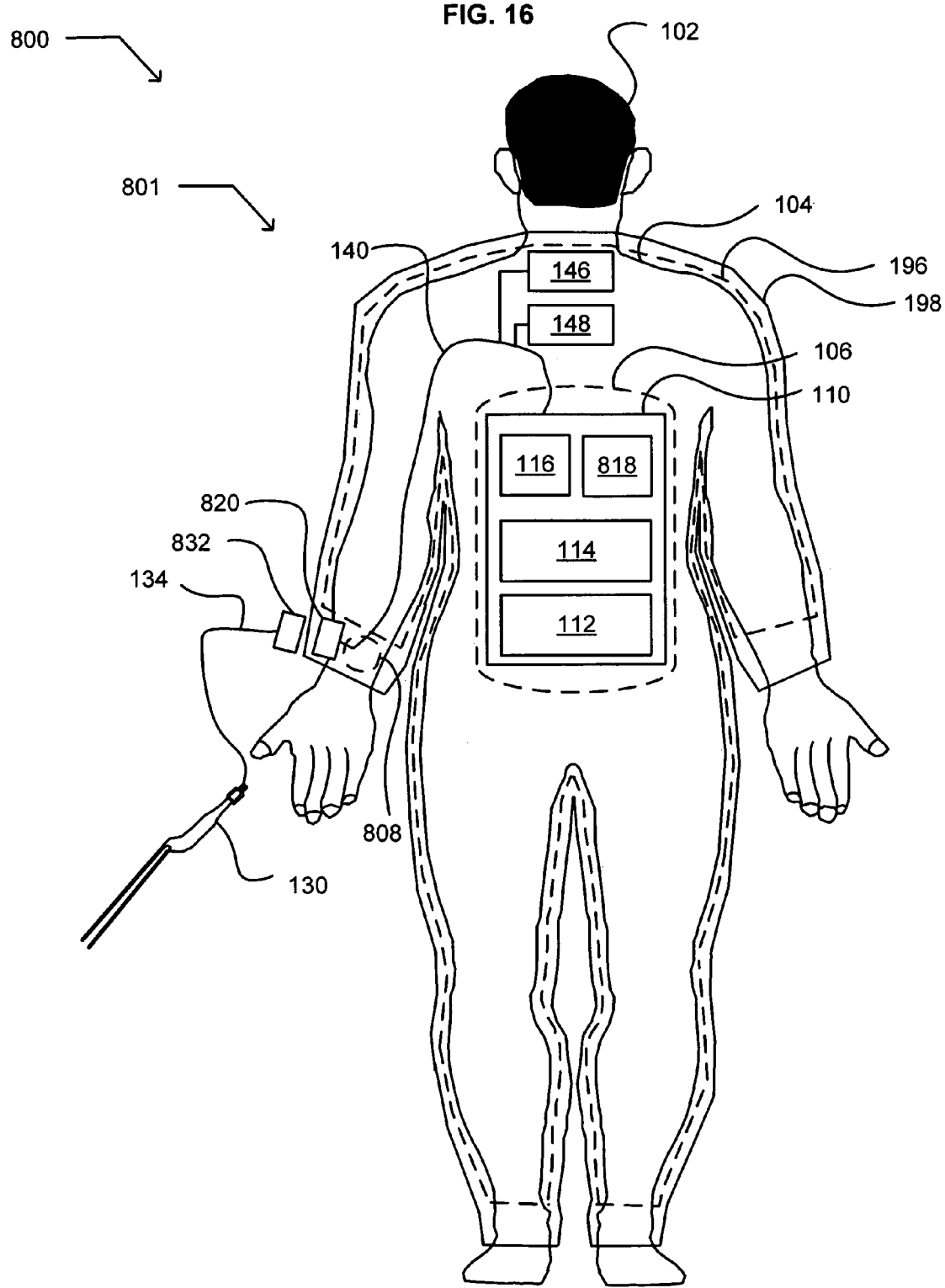
FIG. 16 illustrates an example environment in which an embodiment may be implemented.

FIG. 16 illustrates an example environment 800. The environment includes the health care provider 102 and a wearable wireless surgical power supply system 801. The system includes a portable energy source configured to supply electrical or radiant power, and configured to be carried proximate to a first body portion 106 of the health care provider 102. An embodiment of the portable energy source is illustrated as the portable energy source 110 described in conjunction with FIG. 1.

The system 801 also includes a portable power transmitter 820 configured to wirelessly transfer the electrical or radiant power supplied by the portable energy source 110 from the portable energy source to a wireless power receiver 832 connected to a handheld medical device 130. In an embodiment, the portable power transmitter is configured to be carried proximate to a second body portion 808 of the health care provider. In an embodiment, the portable power transmitter is configured to electromagnetically couple with the wireless power receiver, and wirelessly transfer the electrical or radiant power supplied by the portable energy source. In an embodiment, the portable power transmitter is configured to wirelessly transfer the electrical or radiant power supplied by the portable energy source to a wireless power receiver using at least one of inductive, resonant inductive coupling, resonant inductive energy transfer, strongly-coupled resonators, or radio waves. In an embodiment, the wireless power receiver is configured to convert the power received using the at least one of inductive, resonant inductive coupling, resonant inductive energy transfer, strongly-coupled resonators, or radio waves into a form of power usable by the handheld medical device.

An example of wireless non-radiative energy transfer is described by A. Karalis et al, *Efficient Wireless Non-Radiative Mid-Range Energy Transfer*, Annals of Physics 323 (2008) 34-38 (DOI: 10.1016/J.AOP.207.04.017, (April 2007)); and A. Karalis et al, *Efficient Wireless Non-Radiative Mid-Range Energy Transfer*, (available at http://arxiv.org/pdf/physics/0611063 (accessed Jul. 13, 2009)). An example of an apparatus providing wireless energy transfer is described by U.S. Patent Application Pub. No. 20080278264, *Wireless energy transfer*, by A. Karalis et al. An example of an apparatus providing wireless energy transfer is described in U.S. Patent Application Pub. No. 20090108997, *System, devices, and method for energizing passive wireless data communication devices*, by M. Petterson et al. An example of an apparatus providing wireless energy transfer is described in U.S. Patent Application Pub. No. 20030214255, *Inductively powered apparatus*, by D. W. Baarman et al.; in U.S. Patent Application Pub. No. 20040130915, *Adaptive inductive power supply with communication*, by D. W. Baarman; and by the Ecoupled™ system and the Splashpower® system both of Fulton Innovation, LLC, of Ada, Mich. (available at http://www.ecoupled.com/index.html (accessed Jul. 13, 2009)). An example of apparatus providing wireless energy transfer is described by the Powermat System by HoMedics Powermat North America, of Commerce Township, Mich. (available at http://www.powermatusa.com (accessed Jul. 15, 2009)).

The system 801 further includes the connective structure 140 configured to transfer the electrical or radiant power supplied by the portable energy source between the portable energy source 110 and the portable power transmitter 820, and configured to be carried proximate to the body 104 of the health care provider 102. In an embodiment, the connective structure includes a flexible connective structure. In an embodiment, the connective structure includes a connective structure configured to transfer electrical or radiant power between the portable energy source and the portable power transmitter. The transferred electrical or radiant power derived from the electrical or radiant power supplied by the portable energy source. In an embodiment, the connective structure includes a wireless transmitter coupled with the portable energy source and a wireless receiver coupled with the power-output connector. The wireless transmitter and the wireless receiver are configured in combination to transfer power between the portable energy source and the power-output connector.

In an embodiment, the portable power transmitter 820 is configured to wirelessly transfer the electrical or radiant power supplied by the portable energy source 110 across the health care provider's article of attire 196, such as a surgical gown, or across the surgical barrier 198 to the power receiver 832. In an embodiment, the article of attire or the surgical barrier may have a portion that is substantially transparent to wirelessly transferred electrical or radiant power. FIG. 16 illustrates an example where a sleeve portion of the surgical barrier is interposed between the portable power transmitter and the power receiver.

In an embodiment, the portable energy source 110 includes a portable energy source configured to supply electrical or radiant power, and having a body-mounting portion (not shown) configured to be carried by a first body portion 106 of the health care provider 102. In an embodiment, the portable energy source includes a portable energy source configured to supply electrical or radiant power and having a clothing-engagement portion (not shown) configured to be carried by an article of clothing proximate to a first body portion of a health care provider. For example, FIG. 9 illustrates the article of clothing as the article of attire 196.

Continuing with FIG. 16, in an embodiment, the portable power transmitter 820 includes a portable power transmitter configured to contactlessly transfer electrical or radiant power supplied by the portable energy source 110 from the portable energy source to the wireless power receiver 832 connected to the handheld medical device 130. In an embodiment, the portable power transmitter includes a portable power transmitter configured to wirelessly transfer electrical or radiant power from the portable energy source to a wireless power receiver connected to a handheld medical device, the transferred electrical or radiant power derived from the electrical or radiant power supplied by the portable energy source. In an embodiment, the portable power transmitter includes a portable power transmitter configured to direct electrical or radiant power supplied by the portable energy source at a region of space (not shown) occupiable by a wireless power receiver connected to a handheld medical device. In an embodiment, the portable power transmitter includes a portable power transmitter configured to wirelessly transfer the electrical or radiant power supplied by the portable energy source from the portable energy source to a wireless power receiver connected to a handheld medical device via induction, electromagnetic energy, ultrasound, or power beaming. In an embodiment, the system 801 includes a sensor (not shown) configured to determine a position or orientation of the portable power transmitter with respect to the region of space. In an embodiment, the portable power transmitter includes a portable power transmitter configured to wirelessly transfer the electrical or radiant power supplied by the portable energy source across a surgical barrier or a sterile shield and to a wireless power receiver connected to a handheld medical device. In an embodiment, the portable power transmitter includes a portable power transmitter configured to non-radiatively transfer the electrical or radiant power supplied by the portable energy source from the portable energy source to a wireless power receiver connected to a handheld medical device. In an embodiment, the portable power transmitter includes a portable power transmitter configured to inductively transfer the electrical or radiant power supplied by the portable energy source from the portable energy source to a wireless power receiver connected to a handheld medical device. In an embodiment, the portable power transmitter includes a portable power transmitter configured to radiatively transfer the electrical or radiant power supplied by the portable energy source to a wireless power receiver connected to a handheld medical device.

In an embodiment, the portable power transmitter 820 includes a portable power transmitter configured to electromagnetically transfer electrical or radiant power supplied by the portable energy source 110 from the portable energy source to the wireless power receiver 832 connected to the handheld medical device 130. In an embodiment, the portable power transmitter includes a portable power transmitter configured to acoustically transfer power from the portable energy source to a wireless power receiver connected to a handheld medical device, the acoustically transferred power derived from the electrical or radiant power supplied by the portable energy source. In an embodiment, the portable power transmitter includes a portable power transmitter configured to optically transfer power from the portable energy source to a wireless power receiver connected to a handheld medical device, the optically transferred power derived from the electrical or radiant power supplied by the portable energy source. In an embodiment, the portable power transmitter includes a portable power transmitter configured to wirelessly transfer the electrical or radiant power supplied by the portable energy source to a wireless power receiver connected to the handheld medical device, wherein the wirelessly transferred electrical or radiant power is sufficient to directly power the handheld medical device.

In an embodiment, the portable power transmitter 820 includes a portable power transmitter configured to substantially power the handheld medical device 130 by wirelessly transferring electrical or radiant power supplied by the portable energy source 110 to the wireless power receiver 832 connected to the handheld medical device 130. In an embodiment, the portable power transmitter includes a portable power transmitter configured to wirelessly transfer the electrical or radiant power supplied by the portable energy source to a wireless power receiver connected to the handheld medical device. The wirelessly transferred electrical or radiant power being sufficient to charge an energy storage device (not shown) associated with the handheld medical device.

In an embodiment, the portable power transmitter 820 includes a power transmitter configured to be usable after sterilization. In an embodiment, the portable power transmitter includes a sterilized portable power transmitter. In an embodiment, the portable power transmitter includes a single-use sterilized portable power transmitter. In an embodiment, the portable power transmitter includes a portable power transmitter configured to withstand surgical sterilization conditions. In an embodiment, the portable power transmitter includes a portable power transmitter configured to withstand exposure to surgical sterilization conditions and to be reusable after exposure to the surgical sterilization conditions. In an embodiment, the portable power transmitter includes a portable power transmitter reusable after sterilization by an autoclave or a chemiclave. In an embodiment, the portable power transmitter includes a portable power transmitter configured to be usable after an exposure to ultraviolet light sterilization. In an embodiment, the portable power transmitter includes a portable power transmitter substantially compliant with ANSI/AAMI ES-60601-1:2006, Medical electrical equipment—Part 1: General requirements for basic safety and essential performance.

In an embodiment, the health care provider 102 includes a medical practitioner as described in 35 U.S.C.§§287(c)(1) & (c)((2). In an embodiment, the health care provider includes a veterinary medicine practitioner. In an embodiment, the handheld medical device 130 includes a cordless handheld medical device.

In an embodiment, the system includes the power converter 148 operable to convert a form of power supplied by the portable energy source to another form of power. In an embodiment, the power converter is physically associated with the portable energy source. In an embodiment, the power converter is physically associated with the portable power transmitter. In an embodiment, the system includes a controller 146 configured to regulate a parameter of electrical or radiant power supplied by the energy source, and to be wearable by the health care provider.

In an embodiment, the portable energy source 110 includes a wireless power transmitter 818 coupled with the portable energy source and configured to wirelessly transfer power to a wireless power receiver coupled with the portable power transmitter 820. In an embodiment, the portable power transmitter 820 includes a wireless power receiver (not shown) configured to wirelessly receive power transferred by the wireless power transmitter coupled with the portable energy source.

FIG. 16 also illustrates an alternative embodiment of the system 801. In this alternative embodiment, the system includes a wearable wireless surgical power supply system. The wearable wireless surgical power supply system includes the portable energy source 110 configured to supply electrical or radiant power, and configured to be carried proximate to the first body portion 106 of the health care provider 102. The system also includes the portable power transmitter 820 configured to wirelessly transfer the electrical or radiant power supplied by the portable energy source to the wireless power receiver 832 connected to the handheld medical device 130. In an embodiment, the portable power transmitter 820 includes a portable power transmitter physically associated with the portable energy source and configured to wirelessly transfer the electrical or radiant power supplied by the portable energy source to a wireless power receiver connected to a handheld medical device. In an embodiment, the portable power transmitter includes a portable power transmitter configured to wirelessly transfer the electrical or radiant power supplied by the portable energy source to a wireless power receiver connected to a handheld medical device, and configured to be carried proximate to a second body portion of the health care provider.

FIG. 17 illustrates an example environment 900. The example environment includes the health care provider 102 and a portable wireless power supply system 901. The system includes a portable energy source 110 configured to supply electrical or radiant power, and configured to be carried by the health care provider 102. The system also includes a portable power transmitter 820 configured to wirelessly transfer the electrical or radiant power supplied by the portable energy source to the wireless power receiver 832 connected to the handheld medical device 130.

In an embodiment, the system 901 includes a first carrier 952 configured to hold the portable energy source, and to be physically associatable with a first body portion of the health care provider. In an embodiment, the first carrier may be substantially similar to the waist carrier 452 described in conjunction with FIG. 8. In an embodiment, the first carrier may be substantially similar to the first carrier 456 described in conjunction with FIG. 9. In an embodiment, the first carrier includes a first carrier structurally integrated with the portable energy source 910, and having a body-mounting portion (not shown) configured to be carried by a first body portion 106 of a health care provider 102. In an embodiment, the first carrier includes a first carrier configured to hold the portable energy source, and having a body-mounting portion configured to be carried by a first body portion of a health care provider. In an embodiment, the first carrier includes a first carrier configured to hold the portable energy source, and having a clothing-engagement portion (not shown) configured to be carried by an article of clothing 196 proximate to a first body portion of a health care provider. In an embodiment, the first carrier includes a first carrier configured to hold the portable energy source substantially inside a sterile barrier, and to be physically associatable with a first body portion of the health care provider.

In an embodiment, the system 901 includes a second carrier 954 configured to hold the portable power transmitter 820, and to be physically associatable with the second body portion 808 of the health care provider 102. In an embodiment, the second carrier may be substantially similar to the second carrier 454 described in conjunction with FIG. 8. In an embodiment, the second carrier may be substantially similar to the second carrier 458 described in conjunction with FIG. 9. In an embodiment, the second carrier includes a second carrier structurally integrated with the portable power transmitter, and having a body-mounting portion configured to be carried by a second body portion of a health care provider. In an embodiment, the second carrier includes a second carrier configured to hold the portable power transmitter, and having a body-mounting portion configured to be carried by a second body portion of a health care provider. In an embodiment, the second carrier includes a second carrier configured to hold the portable power transmitter, and having a clothing-engagement portion configured to be carried by an article of clothing proximate to a second body portion of a health care provider. In an embodiment, the second carrier includes a second carrier configured to hold the portable power transmitter, and to be physically associatable with a portion of limb 808 of the health care provider. In an embodiment, the second carrier includes a second carrier configured to hold the portable power transmitter, and to be physically associatable with a second body portion at a position distal of a shoulder joint of the health care provider. In an embodiment, the second carrier includes a second carrier configured to hold the portable power transmitter, and to be physically associatable with a second body portion at a position distal of a shoulder joint of the health care provider. In an embodiment, the second carrier includes a second carrier configured to hold the portable power transmitter, and configured to be carried by an attire wearable by a health care provider proximate to a second body portion at a position distal of a shoulder joint of the health care provider. In an embodiment, the second carrier includes a second carrier having at least one of a positioning strap, belt, holder, harness, or material configured to hold the portable power transmitter, and to be physically associatable with a second body portion of the health care provider. In an embodiment, the second carrier includes a second carrier configured to be physically associatable with a second body portion of the health care provider, and to hold the portable power transmitter proximate to the second body portion of the health care provider and substantially within a surgical barrier 198 enclosing at least a portion of the second body portion of the health care provider.

In an embodiment, the portable power transmitter 820 includes a portable power transmitter configured to wirelessly transfer the electrical or radiant power supplied by the portable energy source 110 to a wireless power receiver 832 connected to the handheld medical device 130, and across the surgical barrier 198 enclosing at least a portion of the second body portion 808 of the health care provider 102.

In an embodiment, the system 901 includes the connective structure 140 configured to transfer the electrical or radiant power supplied by the portable energy source 110 between the portable energy source and the portable power transmitter 820. In an embodiment, the connective structure includes a connective structure configured to transfer the electrical or radiant power supplied by the portable energy source between the portable energy source and the portable power transmitter, and to be worn by the health care provider 102 at least partially underneath the surgical barrier 198. In an embodiment, the system includes the controller 146 configured to regulate a parameter of electrical or radiant power supplied by the portable energy source, and to be wearable by the health care provider 102.

FIG. 18 illustrates an example operational flow 1000. After a start operation, the operational flow includes a first carrying operation 1010. The first carrying operation includes wearing proximate to a first body portion of a health care provider a first carrier holding a portable energy source configured to supply electrical or radiant power. In an embodiment, the first carrying operation may be implemented using the portable energy source 110 and the first carrier 452 described in conjunction with FIG. 17. A second carrying operation 1020 includes wearing proximate to a second body portion of the health care provider a second carrier holding a portable power transmitter configured to wirelessly transfer the electrical or radiant power supplied by the portable energy source to a wireless power receiver connected to a handheld medical device. In an embodiment, the second carrying operation may be implemented using the portable power transmitter 820 and the second carrier 454 described in conjunction with FIG. 17. A conveyance operation 1080 includes carrying a connective structure configured to transfer the electrical or radiant power supplied by the portable energy source between the portable energy source and the portable power transmitter. The conveyance operation may be implemented using the connective structure 140 described in conjunction with FIG. 1.

A powering up operation 1030 includes activating a wireless transfer of the electrical or radiant power from the portable power transmitter to the wireless power receiver connected to the handheld medical device. The transferred electrical or radiant power derived from the electrical or radiant power supplied by the portable energy source. For example, in an embodiment, the powering up operation may include the health care provider bringing proximate the portable power transmitter and the wireless power receiver, or by the health care provider gripping the handheld medical device. A commence operation 1050 includes activating the handheld medical device with electrical or radiant power supplied by the portable energy source. The commence operation may be implemented by the health care provider 102 or another health care provider (not shown) switching on the handheld medical device 130 of FIG. 17. The operational flow includes an end operation.

In an embodiment, the second carrying operation 1020 may include at least one alternative embodiment, such as an operation 1022. The operation 1022 includes wearing on one side of a surgical barrier and proximate to a second body portion of the health care provider a second carrier holding a portable power transmitter. The portable power transmitter is configured to wirelessly transfer the electrical or radiant power supplied by the portable energy source to a wireless power receiver situated on another side of the surgical barrier and connected to a handheld medical device. In an embodiment, the operation 1022 may be implemented as illustrated in FIG. 16, wherein the portable power transmitter 820 is located on the body 104 side of the surgical barrier 198, and the wireless power receiver 832 is located on another side of the surgical barrier.

FIG. 19 illustrates an alternative embodiment of the operational flow 900 described in conjunction with FIG. 18. In an embodiment, the powering up operation may include at least one alternative embodiment. The at least one alternative embodiment may include an operation 1032, an operation 1034, an operation 1036, an operation 1038, an operation 1042, or an operation 1044. The operation 1032 includes moving the portable power transmitter and the wireless power receiver into an alignment providing a wireless transfer of the electrical or radiant power supplied by the portable energy source from the portable power transmitter to the wireless power receiver. In an embodiment, the wireless transfer may include at least one of an inductive, optical, radiant, or power beaming wireless transfer. The operation 1034 includes moving the portable power transmitter and the wireless power receiver into an orientation providing an efficient wireless transfer of the electrical or radiant power supplied by the portable energy source from the portable power transmitter to the wireless power receiver. The operation 1036 includes moving the wireless power receiver connected to the handheld medical device and the portable power transmitter into a physical proximity providing a strong coupling of the electrical or radiant power supplied by the portable energy source. The operation 1038 includes moving the wireless power receiver connected to the handheld medical device and the portable power transmitter into a physical proximity providing a sufficient inductive, optical, radiant, or power beam coupling of the electrical or radiant power supplied by the portable energy source. In an embodiment, the movement of the wireless power receiver connected to the handheld medical device and the portable power transmitter into a physical proximity may be facilitated by the health care provider, or by another health care provider proximate to the health care provider. In an embodiment, the operation 1042 includes the health care provider grasping the handheld medical device. In an operation, the operation 1044 includes initiating a wireless transfer of the electrical or radiant power supplied by the portable energy source from the portable power transmitter to the wireless power receiver connected to the handheld medical device. For example, a wireless transfer of the electrical or radiant power may include establishing a link-up or handshake between the portable power transmitter to the wireless power receiver.

FIG. 20 illustrates an alternative embodiment of the operational flow 1000 described in conjunction with FIG. 18. The operational flow may include at least one additional operation 1060. The at least one additional operation 1060 may include an operation 1062, or an operation 1064. The operation 1062 includes physically associating the portable energy source with the first carrier. The operation 1064 includes physically associating the portable power transmitter with the second carrier.

An alternative embodiment of the operational flow 1000 described in conjunction with FIG. 18 includes a first carrying operation. The first carrying operation (not shown) includes carrying proximate to a first body portion of a health care provider a portable energy source configured to supply electrical or radiant power. A second carrying operation (not shown) includes carrying proximate to a second body portion of the health care provider a portable power transmitter configured to wirelessly transfer the electrical or radiant power supplied by the portable energy source to a wireless power receiver connected to a handheld medical device. A third carrying operation (not shown) includes carrying a connective structure configured to transfer the electrical or radiant power supplied by the portable energy source between the portable energy source and the portable power transmitter. A first commence operation (not shown) includes activating a wireless transfer of electrical or radiant power from the portable power transmitter to the wireless power receiver connected to the handheld medical device, the transferred electrical or radiant power derived from the electrical or radiant power supplied by the portable energy source. A second commence operation (not shown) includes activating the handheld medical device with the transferred electrical or radiant power.

Figure 21:
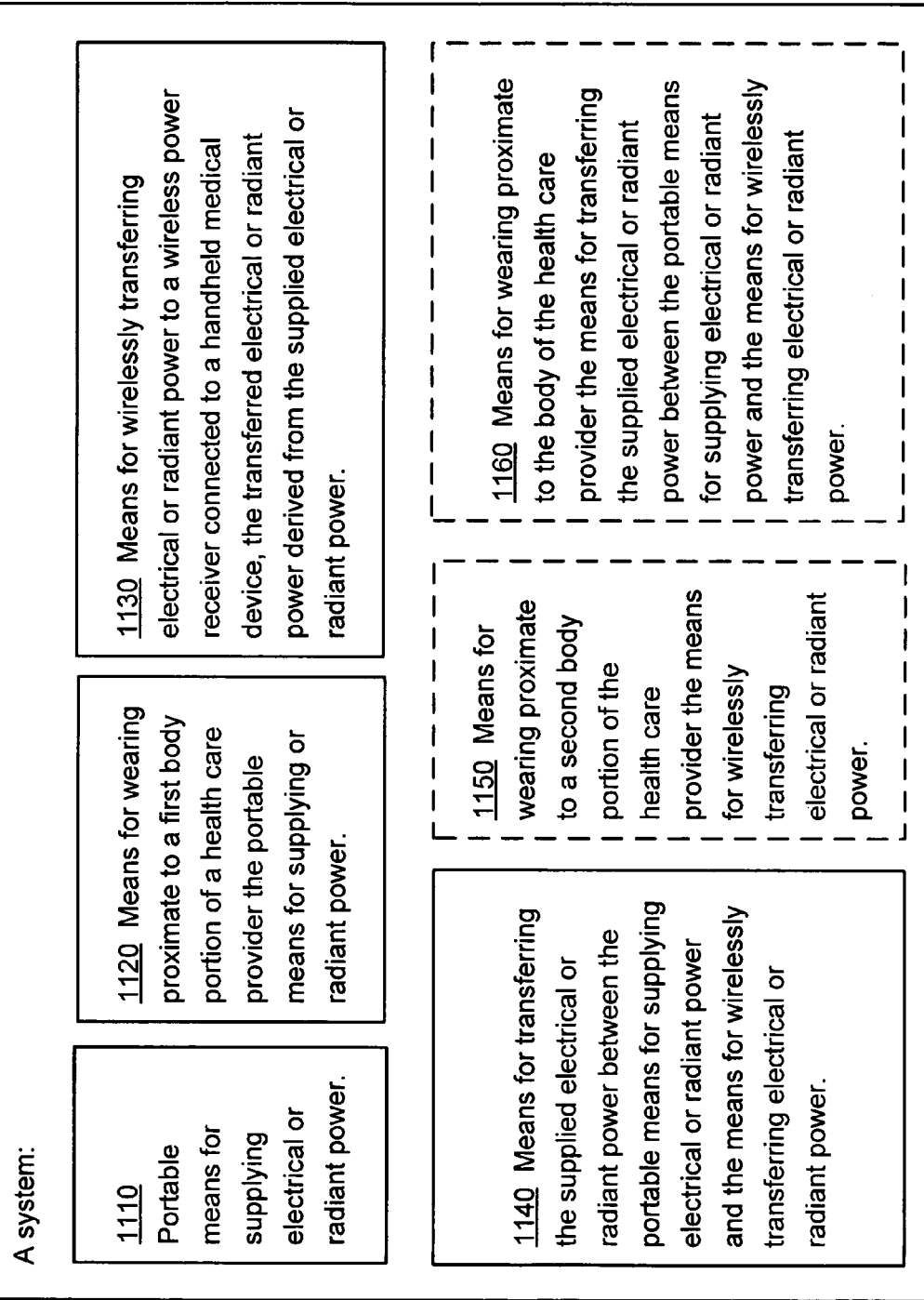
FIG. 21 illustrates an example system in which an embodiment may be implemented.

FIG. 21 illustrates an example system 1100. The system includes portable means 1110 for supplying electrical or radiant power. The system also includes means 1120 for wearing proximate to a first body portion of a health care provider the portable means for supplying electrical or radiant power. The system includes means 1130 for wirelessly transferring electrical or radiant power to a wireless power receiver connected to a handheld medical device, the transferred electrical or radiant power derived from the supplied electrical or radiant power. The system includes means 1140 for transferring the supplied electrical or radiant power between the portable means for supplying electrical or radiant power and the means for wirelessly transferring electrical or radiant power.

In an embodiment, the system includes means 1150 for wearing proximate to a second body portion of the health care provider the means for wirelessly transferring power. In an embodiment, the system includes means 1160 for wearing proximate to the body of the health care provider the means for transferring the supplied electrical or radiant power between the portable means for supplying electrical or radiant power and the means for wirelessly transferring electrical or radiant power.

Figure 22:
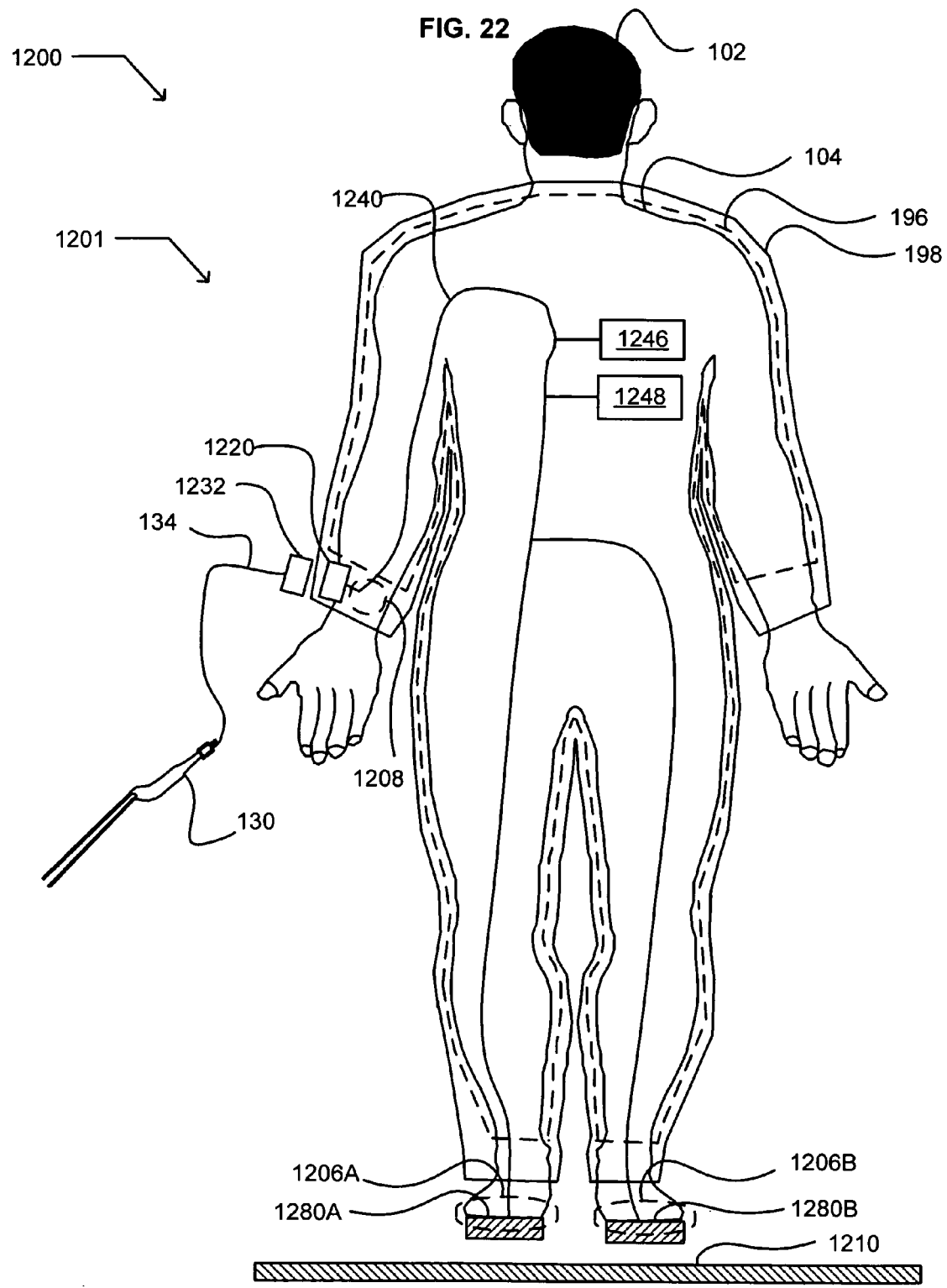
FIG. 22 illustrates an example environment in which an embodiment may be implemented.

FIG. 22 illustrates an example environment 1200. The example environment includes the health care provider 102 and a system 1201. In an embodiment, the system includes a mobile surgical power supply system. The system includes a portable power receiver configured to wirelessly receive electrical or radiant power from a wireless power transmitter source 1210, and configured to be carried proximate to a first body portion 1206A of the health care provider. An instance of the portable power receiver is illustrated as portable power receiver 1280A. In an embodiment, the system also includes another portable power receiver 1280B configured to wirelessly receive electrical or radiant power from the wireless power transmitter source 1210, and configured to be carried proximate to another first body portion 1206B of the health care provider. In an embodiment, the first body portion 1206A may be substantially similar to the first body portion 106 described in conjunction with FIG. 1. In an embodiment, the first body portion may include at least one of a sole of a foot, a foot wearing a shoe having or incorporating the portable power receiver, an ankle, a waist, a back, or a chest of the health care provider. In an embodiment, the wireless power transmitter source includes at least one of a substantially stationary, relocateable, or moveable wireless power transmitter source.

The system 1201 includes a portable power-output device 1220 configured to interact with a power-receiving device 1232 connected to the handheld medical device 130. The portable power-output device is configured to be carried by the health care provider 102 proximate to a second body portion 1208 of the health care provider. If interacting, the electrical or radiant power is transferred from the portable power-output device to the power-receiving device. In an embodiment, interacting includes the portable power-output device and the power-receiving device having an effect on one another.

Embodiments of devices providing wireless transfer of electrical or radiant power are described in conjunction with FIG. 16 above. In an embodiment, an example of a wireless power transmitter source and a portable power receiver are described by the Ecoupled™ system, or by the Splashpower® system cited in conjunction with FIG. 16 above, both of Fulton Innovation, LLC, of Ada, Mich. In an embodiment, an example of a wireless power transmitter source is described by the mat of the Powermat system, and an example of a portable power receiver is described by the receiver of the Powermat system, cited in conjunction with FIG. 16 above. For example, the mat of the Powermat system may be placed on or incorporated with a floor or wall of an operating room. In another example, the mat of the Powermat system may be placed on or incorporated with an object in an operating room.

The system 1201 also includes a connective structure 1240 configured to transfer the electrical or radiant power between the portable power receiver 1280A and the portable power-output device 1220. In an embodiment, the connective structure may be substantially similar to the connective structure 140 described in conjunction with FIG. 1. In an embodiment, the connective structure includes a wireless connector configured to wirelessly transfer the electrical or radiant power from the portable power receiver to the portable power-output device.

In an embodiment, the portable power receiver 1280A includes a portable power receiver configured to wirelessly receive electrical or radiant power from a substantially stationary wireless power transmitter source 1210, and configured to be carried by a health care provider 102 proximate to the first body portion 1206A of the health care provider. In an embodiment, the portable power receiver includes a portable power receiver configured to wirelessly receive electrical or radiant power from a wireless power transmitter source while the portable power receiver is in motion, and configured to be carried by a health care provider proximate to a first body portion of the health care provider. In an embodiment, the portable power receiver includes a portable power receiver configured to wirelessly receive electrical or radiant power from wireless power transmitter source, and configured to be carried proximate to a first body portion of a health care provider. The wireless power transmitter source configured to simultaneously supply at least two instances of the portable power receiver. For example, the at least two instances of the portable power receiver may include the portable power receiver 1280A and the other portable power receiver 1280B. In an embodiment, the portable power receiver includes a portable power receiver configured to wirelessly receive electrical or radiant power from a wireless power transmitter source disposed in an operating room, and configured to be carried proximate to a first body portion of a health care provider. In an embodiment an operating room includes a room especially equipped for the performance of surgical operations.

In an embodiment, the portable power receiver 1280A includes a portable power receiver configured to wirelessly receive electrical or radiant power from a wireless power transmitter source 1210 disposed in an operating room and defining an area of wireless power transmission (not shown). The portable power receiver is also configured to be carried proximate to the first body portion 1206A of the health care provider 102. In an embodiment, the portable power receiver includes a portable power receiver configured to wirelessly receive electrical or radiant power from a wireless power transmitter source, to be carried proximate to a first body portion of a health care provider, and to be usable after sterilization. In an embodiment, the portable power receiver includes a sterilized portable power receiver. In an embodiment, the portable power receiver includes a portable power receiver configured to wirelessly receive electrical or radiant power from a wireless power transmitter source across a surgical barrier or a sterile shield, and configured to be carried proximate to a first body portion of a health care provider. An example of the sterile barrier or sterile shield is illustrated as the surgical barrier 198.

In an embodiment, the portable power-output device 1220 includes a portable power-output device configured to interact with a power-receiving device 1232 connected to a handheld medical device 130, and configured to be carried by the health care provider 102 proximate to a second body portion 1208 of the health care provider. If releasably coupled, the electrical or radiant power transferred from the portable power-output device to the power-receiving device is sufficient to directly power the handheld medical device. In an embodiment, the portable power-output device includes a portable power-output device configured to interact with a power-receiving device connected to a handheld medical device, and configured to be carried by the health care provider proximate to a second body portion of the health care provider. If releasably coupled, the electrical or radiant power transferred from the portable power-output device to the power-receiving device is sufficient to charge or recharge an energy storage device associated with the handheld medical device.

In an embodiment, the portable power-output device 1220 includes a power-output connector configured to releasably couple with a power-receiving connector 1232 connected to the handheld medical device 130, and configured to be carried proximate to a second body portion 1206A of the health care provider 102. If coupled, the power-output connector and the power-receiving connector are operable to transfer electrical or radiant power. In an embodiment, the power-output connector is substantially similar to the power-output connector 120 described in conjunction with FIG. 1. In an embodiment, the power-output connector includes a power-output connector configured to releasably couple with a power-receiving connector connected to the handheld medical device, and configured to be carried by the health care provider at a position distal of a should joint of the health care provider.

In an embodiment, the portable power-output device 1220 includes a portable power transmitter configured to wirelessly transfer the electrical or radiant power received by the portable power receiver 1280A to a wireless power receiver 1232 connected to the handheld medical device 130. The portable power transmitter is also configured to be carried proximate to a second body portion 1206A of the health care provider 102. The transferred electrical or radiant power derived from the electrical or radiant power wirelessly received from the wireless power transmitter source. In an embodiment, the portable power transmitter may be substantially similar to the portable power transmitter 820, and the wireless power receiver may be substantially similar to the wireless power receiver 832, both described in conjunction with FIG. 16. In an embodiment, the portable power transmitter includes a portable power transmitter configured to wirelessly transfer power to a wireless power receiver connected to a handheld medical device, and configured to be carried by the health care provider proximate to a second body portion of the health care provider. The transferred power derived from the electrical or radiant power received by the portable power receiver. In an embodiment, the portable power transmitter includes a portable power transmitter configured to be usable after sterilization. In an embodiment, power transmitter includes a single-use sterilized power transmitter. In an embodiment, the portable power transmitter includes a portable power transmitter configured to wirelessly transfer the electrical or radiant power received by the portable power receiver to a wireless power receiver connected to a handheld medical device, and configured to be carried proximate to a second body portion of the health care provider. The electrical or radiant power transferred from the portable power-output device to the power-receiving device is sufficient to directly power the handheld medical device. In an embodiment, the portable power transmitter includes a portable power transmitter configured to wirelessly transfer the electrical or radiant power received by the portable power receiver to a wireless power receiver connected to a handheld medical device, and configured to be carried proximate to a second body portion of the health care provider. The electrical or radiant power transferred from the portable power-output device to the power-receiving device is sufficient to charge or recharge an energy storage device associated with the handheld medical device.

In an embodiment, the portable power transmitter embodiment of the portable power-output device 1220 includes a portable power transmitter configured to wirelessly transfer the electrical or radiant power received by the portable power receiver 1280A to a wireless power receiver embodiment of the power-receiving connector 1232 connected to the handheld medical device 130. The portable power transmitter is also configured to wirelessly transfer another portion of the electrical or radiant power received by the portable power receiver to another wireless power receiver connected to another handheld medical device (not shown). The portable power transmitter is also configured to be carried proximate to the second body portion 808 of the health care provider 102. In an embodiment, the portable power transmitter includes a first portable power transmitter configured to wirelessly transfer the electrical or radiant power to a first wireless power receiver connected to a first handheld medical device, and configured to be carried proximate to a second body portion of the health care provider. The portable power transmitter also includes a second portable power transmitter (not illustrated) configured to wirelessly transfer the electrical or radiant power to a second wireless power receiver connected to a second handheld medical device (not illustrated), and configured to be carried proximate to a third body portion (not illustrated) of the health care provider. In an embodiment, the portable power transmitter includes a portable power transmitter configured to wirelessly transfer the electrical or radiant power received by the portable power receiver across the surgical barrier or sterile shield 198 to a wireless power receiver connected to a handheld medical device. The portable power transmitter is also configured to be carried proximate to a second body portion of the health care provider. In an embodiment, the portable power transmitter includes a portable power transmitter configured to withstand exposure to surgical sterilization conditions and be reusable after the exposure to the surgical sterilization conditions.

In an embodiment, the system 1201 includes a controller 1246 configured to manage a parameter of the electrical or radiant power wirelessly received from the wireless power transmitter source 1210, and configured to be carried by the health care provider 102. In an embodiment, a parameter includes a voltage, current, frequency, waveform, or mode. In an embodiment, a parameter includes a measurable factor that defines the electrical or radiant power. In an embodiment, the controller is configured to manage an aspect of the wirelessly received electrical or radiant power. In an embodiment, the controller is configured to change a parameter of the wirelessly received electrical or radiant power from the wireless power transmitter source that is in turn supplied by the portable power receiver to the portable power output-device. In an embodiment, the controller includes a controller configured to communicate information indicative of a spatial relationship between the wireless power transmitter and the portable power receiver useable in managing a transfer of electrical or radiant power from the wireless power transmitter source to the portable power receiver. In an embodiment, the controller includes a controller configured to communicate to the wireless power transmitter a requested parameter for electrical or radiant power outputted by the wireless power transmitter source. In an embodiment, the controller includes a controller configured to manage a voltage, current, waveform, or frequency of the received electrical or radiant power of the wirelessly received electrical or radiant power received from the wireless power transmitter source. For example, management of a voltage, current, waveform, or frequency of the received electrical or radiant power may include converting or changing the same.

In an embodiment, the system 1201 includes power converter 1248 configured to convert a first parameter of the power received by the portable power receiver 1280A or 1280B to a second parameter of power delivered to the portable power output device 1220. In an embodiment, the power converter may be substantially similar to the power converter 148 described in conjunction with FIG. 1.

Figure 23:
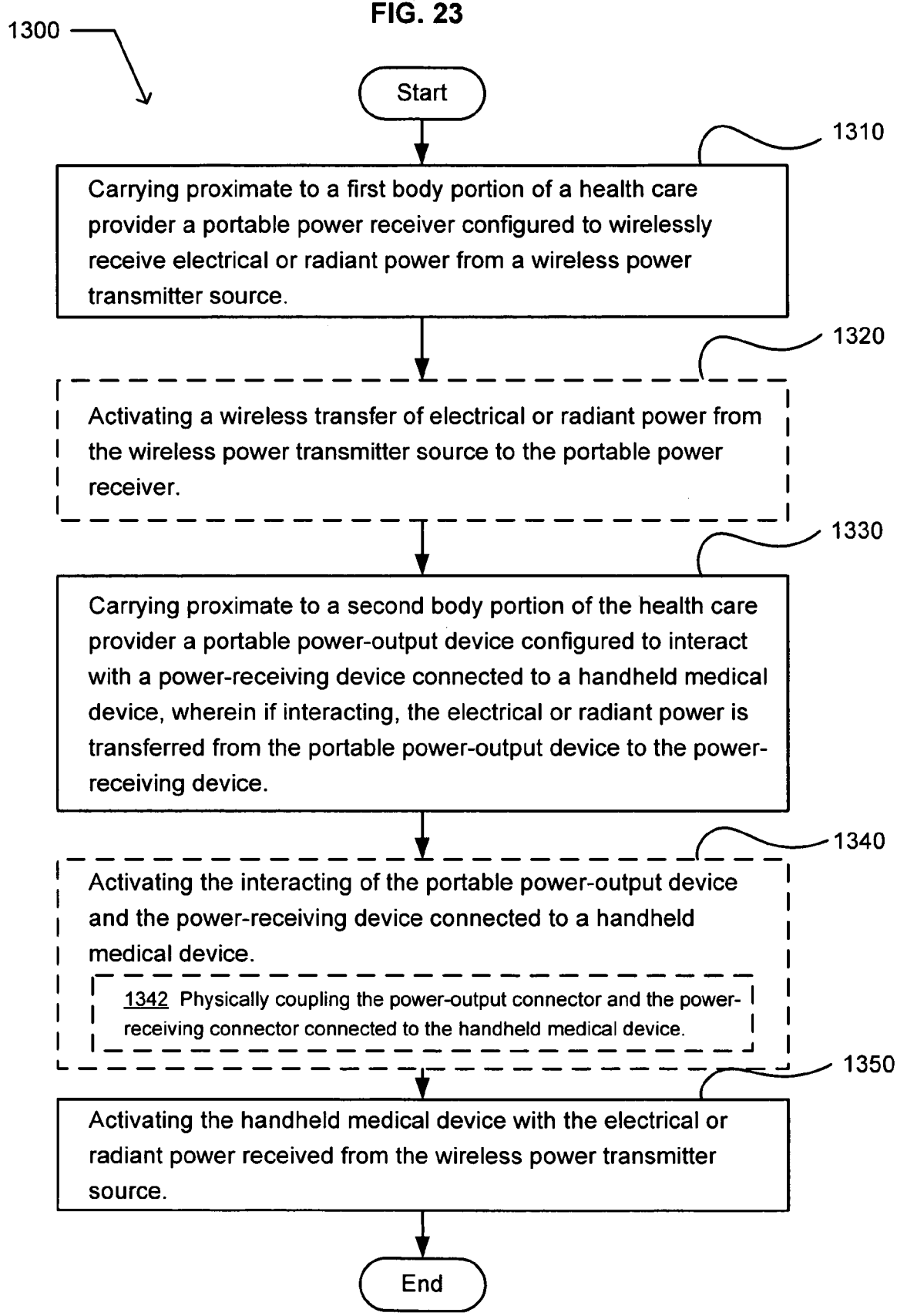
FIG. 23 illustrates an example operational flow in which an embodiment may be implemented.

FIG. 23 illustrates an example operational flow 1300. After a start operation, the operational flow includes a first carrying operation 1310. The first carrying operation includes carrying proximate to a first body portion of a health care provider a portable power receiver configured to wirelessly receive electrical or radiant power from a wireless power transmitter source. In an embodiment, the carrying proximate to a first body portion of a health care provider a portable power receiver includes carrying proximate to a first body portion of a health care provider a portable power receiver. In an embodiment, the first carrying operation may be implemented by carrying the portable power receiver 1280A proximate to the first body portion 1206A described in conjunction with FIG. 22.

A second carrying operation 1330 includes carrying proximate to a second body portion of the health care provider a portable power-output device configured to interact with a power-receiving device connected to a handheld medical device. If interacting, the electrical or radiant power is transferred from the portable power-output device to the power-receiving device. In an embodiment, the carrying proximate to a second body portion of the health care provider a portable power-output device includes carrying proximate to a second body portion of the health care provider a portable power-output device. The second carrying operation may be implemented in the embodiment illustrated by FIG. 22 by the health care provider carrying the portable power-output device 1220 proximate to the second body portion 808. A commence operation 1350 includes activating the handheld medical device with the electrical or radiant power received from the wireless power transmitter source. The commence operation may be implemented by the health care provider 102 switching on the handheld medical device 130 of FIG. 1. The operational flow includes an end operation.

Figure 24:
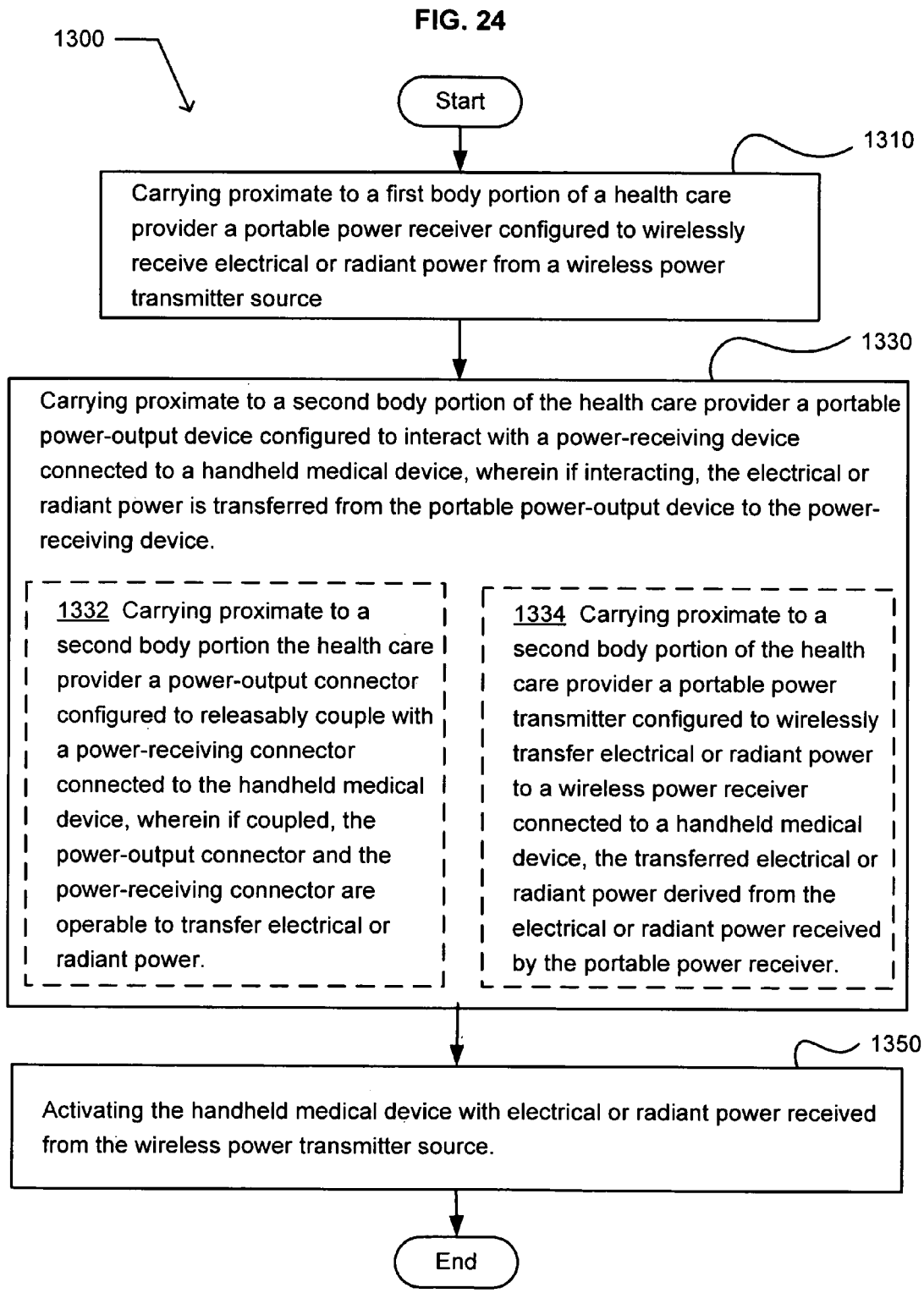
FIG. 24 illustrates an alternative embodiment of the operational flow of FIG. 23.

In an alternative embodiment, a first powering up operation 1320 includes activating a wireless transfer of electrical or radiant power from the wireless power transmitter source to the portable power receiver. The first powering-up operation may be implemented in the embodiment illustrated in FIG. 22 by the health care provider 102 moving their foot that includes the first body portion and that carries the portable power receiver within a substantially effective wireless power transfer range to the wireless power transmitter source 1210. In an alternative embodiment, a second powering-up operation 1340 includes activating the interacting of the portable power-output device and the power-receiving device connected to a handheld medical device. In an alternative embodiment, the commence operation 1340 may include an operation 1342. The operation 1342 includes physically coupling the power-output connector and the power-receiving connector connected to the handheld medical device FIG. 24 illustrates an alternative embodiment of the operational flow 1300 of FIG. 23. An alternative embodiment of the second carrying operation 1330 of FIG. 23 includes an operation 1332 or an operation 1334. The operation 1332 includes carrying proximate to a second body portion the health care provider a power-output connector configured to releasably couple with a power-receiving connector connected to the handheld medical device. If coupled, the power-output connector and the power-receiving connector are operable to transfer electrical or radiant power. In an embodiment, the operation 1332 may be implemented by the health care provider 102 or a third party releasably coupling the power-output connector 1220 and the power-receiving connector 1232 described in conjunction with FIG. 22. The operation 1334 includes carrying proximate to a second body portion of the health care provider a portable power transmitter configured to wirelessly transfer electrical or radiant power to a wireless power receiver connected to a handheld medical device, the transferred electrical or radiant power derived from the electrical or radiant power received by the portable power receiver.

Figure 25:
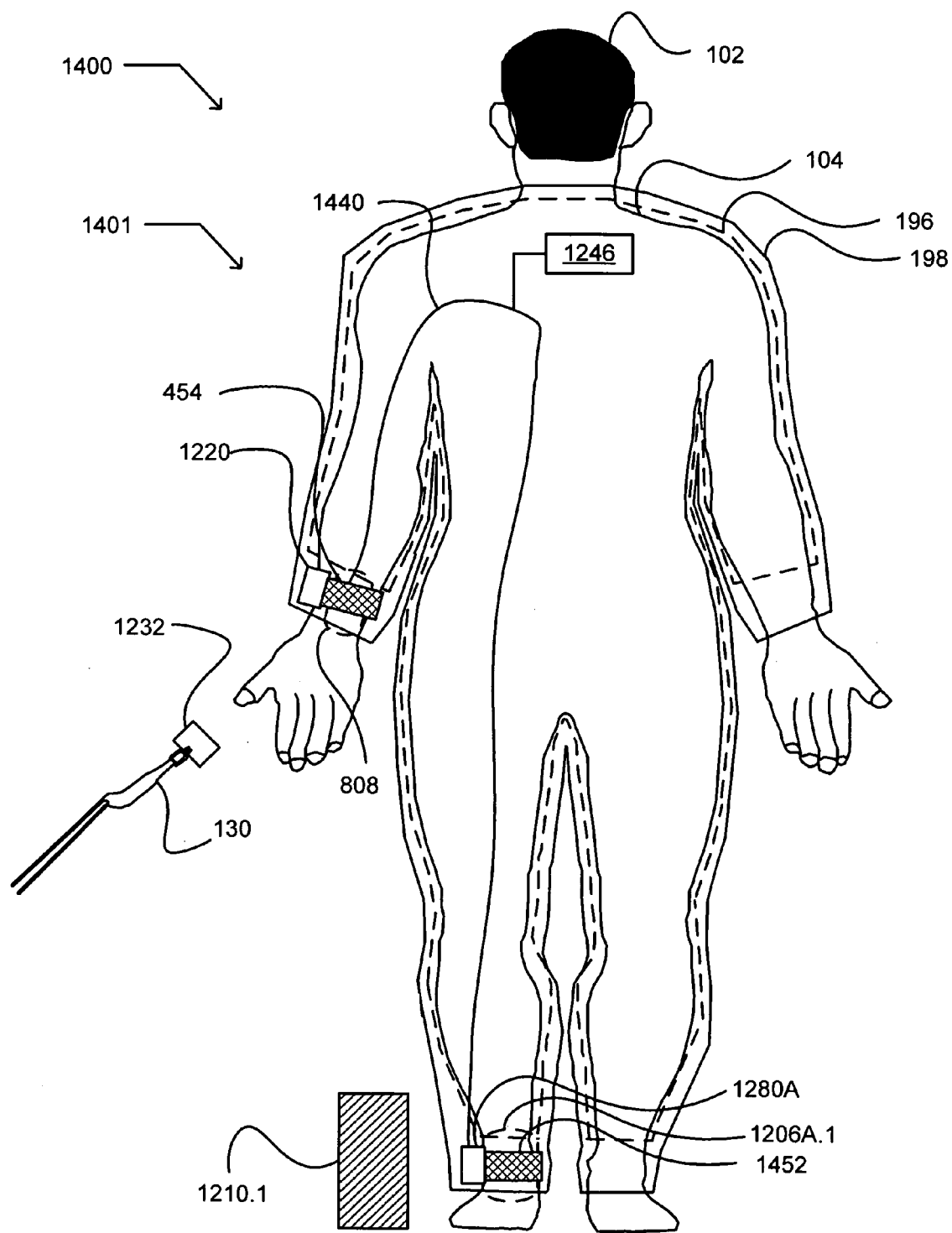
FIG. 25 illustrates an example environment in which an embodiment may be implemented.

FIG. 25 illustrates an example environment 1400. The environment includes the healthcare provider 102, the handheld medical device 130, and a system 1401. The system includes the portable power receiver 1280A configured to wirelessly receive a first electrical or radiant power from a wireless power transmitter source, which may include the wireless power transmitter source 1210.1, or the wireless power transmitter source 1210 described in conjunction with FIG. 22. In an embodiment the portable power receiver is configured to be carried proximate to the first body portion 1206A.1 of the health care provider 102. In an embodiment, the wireless power transmitter source 1210.1 may be substantially similar to the wireless power transmitter source 1210 described in conjunction with FIG. 22. The system includes a first carrier 1452 configured to hold the portable power receiver, and to be physically associatable with the first body portion 1206A.1 of the health care provider. In an embodiment, the first carrier 1452 may be substantially similar to the first carrier 452 or the second carrier 454 described in conjunction with FIG. 8. In an embodiment, the first carrier 1452 may be substantially similar to the pocket 456 or the pocket 458 of the article of attire 196 that define a carrier. In an embodiment, the first carrier 1452 is configured to be physically associatable with the first body portion 1206A.1 of the health care provider.

The system 1401 includes the portable power-output device 1220 configured to interact with the power-receiving device 1232 connected to the handheld medical device 130. If interacting, a second electrical or radiant power is transferred from the portable power-output device to the power-receiving device. The portable power-output device is configured to be carried by the health care provider 102 proximate to the second body portion 808. The system also includes the second carrier configured to hold the portable power-output device 1220, and to be physically associatable with the second body portion of the health care provider. In an embodiment, the second carrier may be substantially similar to the second carrier 454 described in conjunction with FIG. 8. In an embodiment, the second carrier may be substantially similar to the second carrier 458 described in conjunction with FIG.

9. In an embodiment, the second carrier is configured to be physically associatable with the second body portion of the health care provider.

The system 1401 further includes a connective structure 1440 configured to transfer the first electrical or radiant power between the portable power receiver 1280A and the portable power-output device 1220, and configured to be carried by the health care provider 102. In an embodiment, the connective structure may be substantially similar to the connective structure 140 described in conjunction with FIG. 1. In an embodiment, the system includes a third carrier (not shown) configured to hold the connective structure 1440, and to be physically associatable with a third body portion (not shown) of the health care provider. In an embodiment, the system includes the controller 1246 configured to manage an aspect of the wirelessly received electrical or radiant power received from the wireless power transmitter 1210.1, and configured to be carried by the health care provider.

In an embodiment, the first electrical or radiant power is substantially similar to the second electrical or radiant power. In an embodiment, the first electrical or radiant power is substantially different from the second electrical or radiant power. In an embodiment, the second electrical or radiant power is derived from the first electrical or radiant power.

In an embodiment, the portable power-output device 1220 includes a power-output connector configured to releasably couple with a power-receiving connector 1232 connected to the handheld medical device 130, and configured to be carried proximate to a second body portion 1206A of the health care provider 102. If coupled, the power-output connector and the power-receiving connector are operable to transfer a second electrical or radiant power. In an embodiment, the power-output connector is substantially similar to the power-output connector 120 described in conjunction with FIG. 1. In an embodiment, the portable power-output device 1220 includes a portable power transmitter configured to wirelessly transfer the second electrical or radiant power received by the portable power receiver 1280A to a wireless power receiver 1232 connected to the handheld medical device 130. In an embodiment, the portable power transmitter may be substantially similar to the portable power transmitter 820 described in conjunction with FIG. 16.

Figure 26:
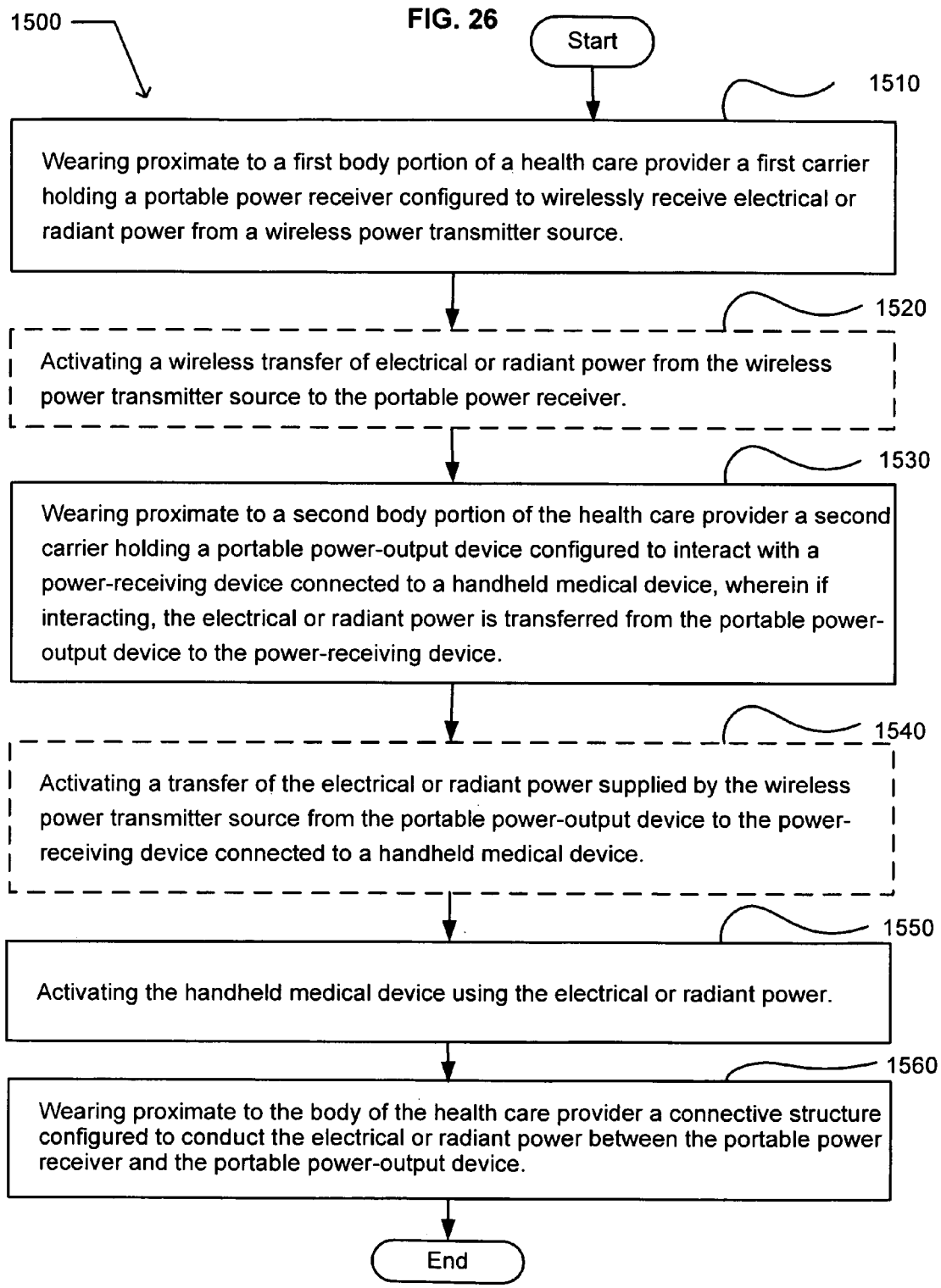
FIG. 26 illustrates an example operational flow in which an embodiment may be implemented.

FIG. 26 illustrates an example operational flow 1500. After a start operation, the operational flow includes a first carrying operation 1510. The first carrying operation includes wearing proximate to a first body portion of a health care provider a first carrier holding a portable power receiver configured to wirelessly receive an electrical or radiant power from a wireless power transmitter source. In an embodiment, the first carrying operation includes wearing proximate to a first body portion of a health care provider a removable first carrier holding a portable power receiver configured to wirelessly receive electrical or radiant power from a wireless power transmitter source. In an embodiment, the first carrying operation may be implemented by wearing the first carrier 1452 holding the portable power receiver 1280A proximate to the health care provider's first body portion 1206A as described in conjunction with FIG. 25.

A second carrying operation 1530 includes wearing proximate to a second body portion of the health care provider a second carrier holding a portable power-output device configured to interact with a power-receiving device 1232 connected to a handheld medical device. If interacting, the electrical or radiant power is transferred from the portable power-output device to the power-receiving device. In an embodiment, the second carrying operation includes wearing proximate to a second body portion of the health care provider a removable second carrier holding a portable power-output device configured to interact with a power-receiving device connected to a handheld medical device. In an embodiment, the second carrying operation may be implemented by the health care provider wearing the second carrier 454 holding the portable power-output device 1220 proximate to the health care provider's second body portion 808 described in conjunction with FIG. 25.

A conveyance operation 1560 includes wearing proximate to the body of the health care provider a connective structure configured to transfer the received electrical or radiant power between the portable power receiver and the portable power transmitter. The conveyance operation 1560 may be implemented using the connective structure 140 described in conjunction with FIG. 1. A commence operation 1500 includes activating the handheld medical device using the electrical or radiant power supplied by the wireless power transmitter source. The commence operation may be implanted by the health care provider switching on the handheld medical device 130. The operational flow includes an end operation.

In an embodiment, the operational flow 1500 includes a coupling operation 1520. The coupling operation includes activating a wireless transfer of electrical or radiant power from the wireless power transmitter source to the portable power receiver. In an embodiment, the coupling operation may be implement by the health care provider moving their first body portion 1206A carrying the portable power receiver 1280A within a substantially effective wireless power transfer range of the wireless power transmitter source 1210.1 described in conjunction with FIG. 26. In an embodiment, the operational flow 1500 includes a powering up operation 1540. The powering up operation includes activating a transfer of the electrical or radiant power supplied by the wireless power transmitter source from the portable power-output device to the power-receiving device connected to a handheld medical device. In an embodiment, the powering up operation may be implement by the health care provider moving their second body portion 808 carrying the portable power-output device 1220 within a substantially effective wireless power transfer range of the power-receiving device 1232 connected to the handheld medical device 130 described in conjunction with FIG. 26. For example, in an embodiment, the powering up operation may include the health care provider bringing proximate the portable power transmitter and the wireless power receiver, or by the health care provider gripping the handheld medical device.

Figure 27:
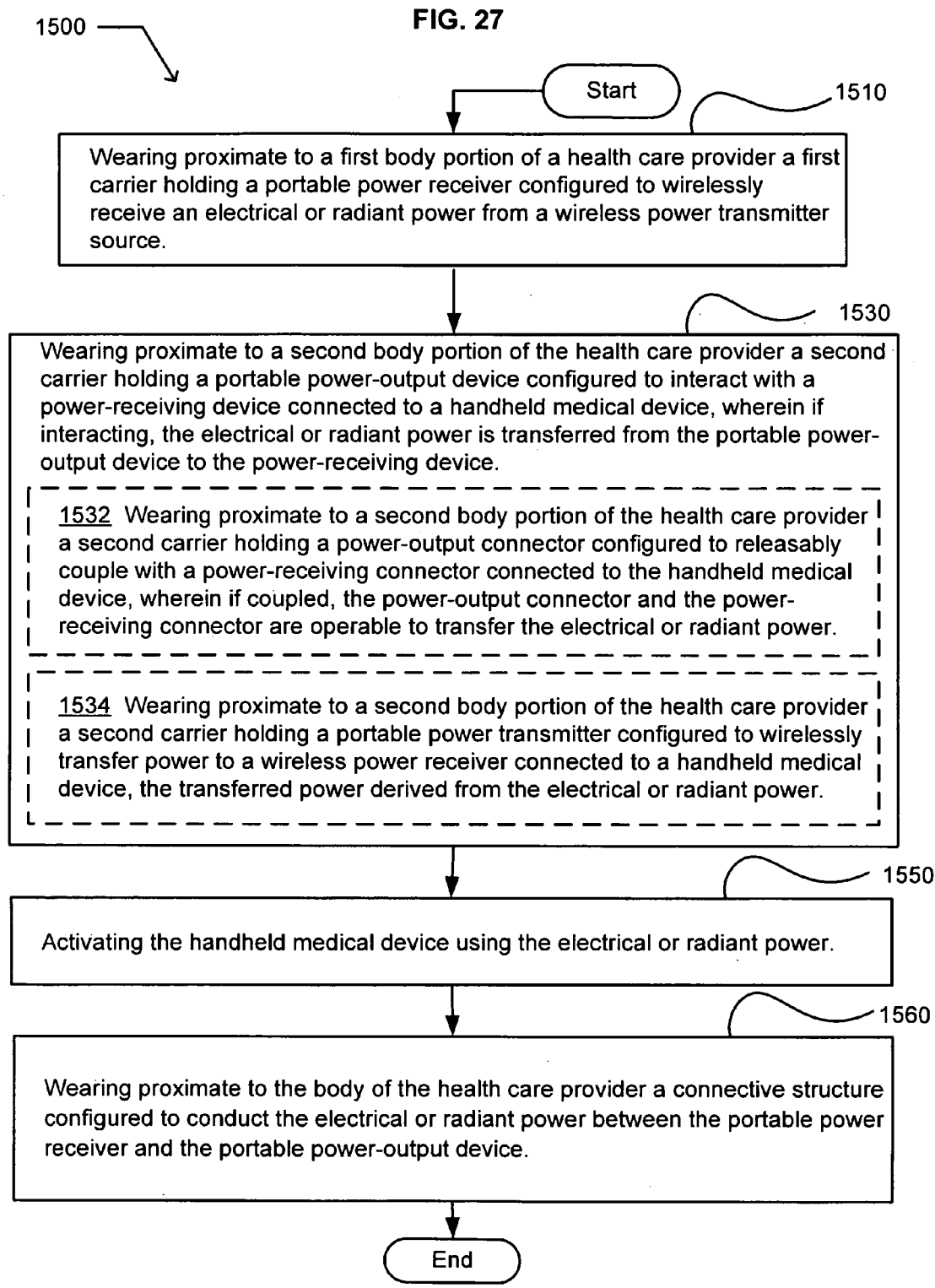
FIG. 27 illustrates an alternative embodiment of the operational flow of FIG. 26.

FIG. 27 illustrates an alternative embodiment of the operational flow 1500 of FIG. 26. The second carrying operation 1530 may include at least one alternative embodiment. The at least one alternative embodiment includes an operation 1532 or an operation 1534. The operation 1532 includes wearing proximate to a second body portion of the health care provider a second carrier holding a power-output connector configured to releasably couple with a power-receiving connector connected to the handheld medical device. If coupled, the power-output connector and the power-receiving connector are operable to transfer the electrical or radiant power. The operation 1534 includes wearing proximate to a second body portion of the health care provider a second carrier holding a portable power transmitter configured to wirelessly transfer electrical or radiant power received by the portable power receiver to a wireless power receiver connected to a handheld medical device. The transferred power derived from the electrical or radiant power.

FIG. 28 illustrates an alternative embodiment of the operational flow 1500 of FIG. 26. The operational flow may include at least one additional operation. The at least one additional operation may include an operation 1515, or an operation 1535. The operation 1515 includes physically associating the portable power receiver with the first carrier. The operation 1535 includes physically associating the portable power-output device with the second carrier.

FIG. 29 illustrates a system 1600. The system includes portable means 1610 for wirelessly receiving electrical or radiant power from a wireless power transmitter source. The system further includes portable means 1630 for interacting with a power-receiving device connected to a handheld medical device. If interacting, electrical or radiant power is transferred from the portable means for interacting to the power-receiving device. The system also includes means 1670 transferring the electrical or radiant power from the portable means for wirelessly receiving the first electrical or radiant power to the portable means for interacting with a power-receiving device connected to a handheld medical device.

In an embodiment, the system 1600 includes means 1620 for wearing proximate to a first body portion of a health care provider the portable means 1610 for wirelessly receiving electrical or radiant power. In an embodiment, the system includes means 1640 for wearing proximate to a second body portion of the health care provider the portable means 1630 for interacting with a power-receiving device.

In an embodiment, the portable means 1630 includes portable means 1632 for releasably coupling the supplied electrical or radiant power with a power-receiving connector connected to a handheld medical device. In an embodiment, the portable means 1630 includes portable means 1634 for wirelessly transferring electrical or radiant power received by the portable power receiver to a wireless power receiver connected to a handheld medical device, the transferred electrical or radiant power derived from the electrical or radiant power from a wireless power transmitter source.

Figure 30:
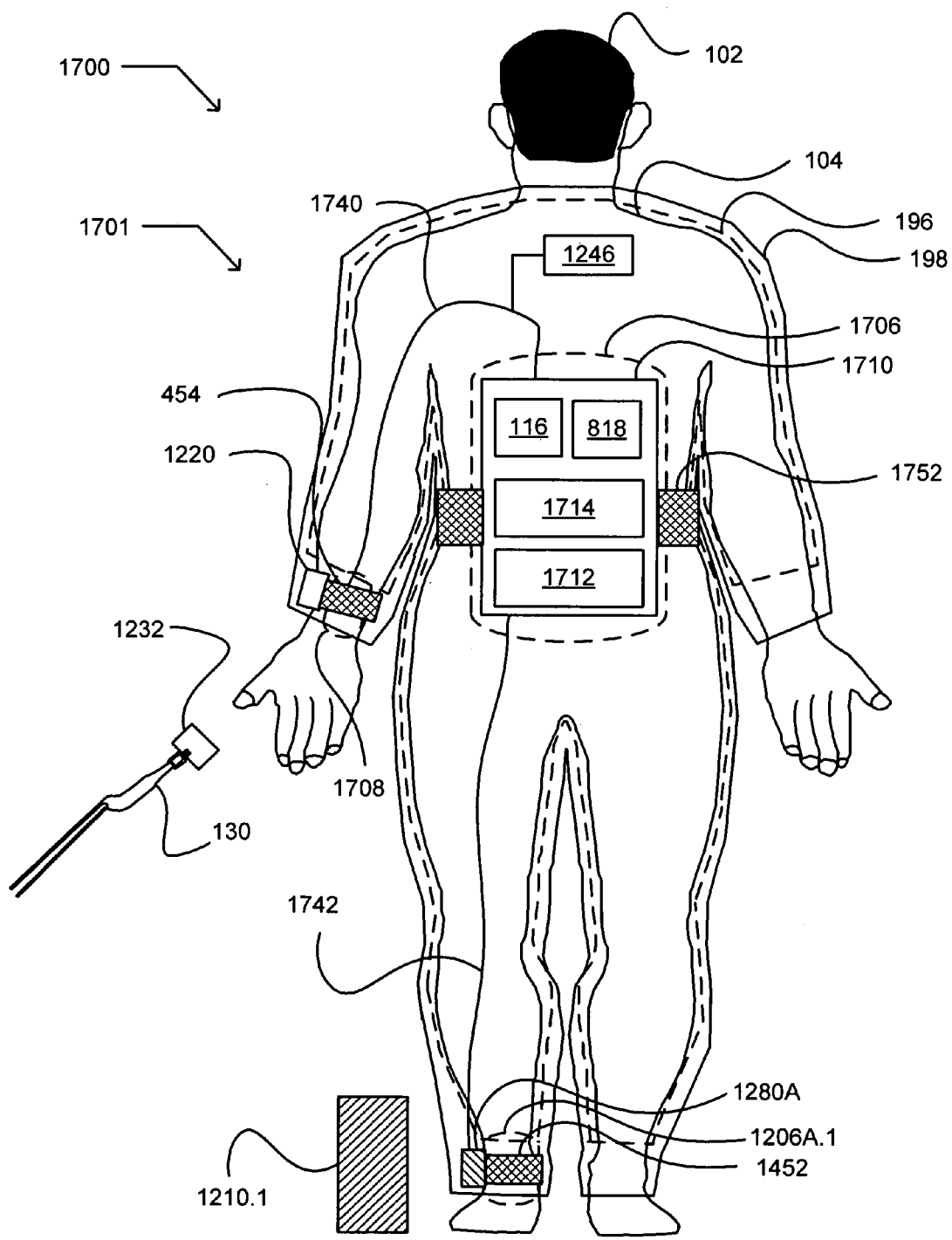
FIG. 30 illustrates an example environment in which an embodiment may be implemented.

FIG. 30 illustrates an example environment 1700. The environment includes the health care provider 102, the handheld medical device 130, and a system 1701. The system includes a portable power receiver, illustrated as the portable power receiver 1280A. The portable power receiver is configured to wirelessly receive a first electrical or radiant power from a wireless power transmitter source, illustrated as the wireless power transmitter source 1210.1. In an embodiment, the wireless power transmitter source 1210.1 may be substantially similar to the wireless power transmitter source 1210 described in conjunction with FIG. 22. The portable power receiver is configured to be carried proximate to a first body portion of the health care provider, illustrated as the first body portion 1206A.1. In an embodiment, the portable power receiver includes a portable power receiver configured to be usable after sterilization. In an embodiment, the portable power receiver includes a sterilized portable power receiver.

The system 1701 includes a portable and chargeable energy storage device 1710 configured to store energy derived from the first electrical or radiant power, to supply a second electrical or radiant power, and configured to be carried proximate to a second body portion of the health care provider 102, illustrated as the second body portion 1706. In an embodiment, the second body portion 1706 may be substantially similar to the first body portion 106 described in conjunction with FIG. 1. In an embodiment, the portable and chargeable energy storage device may include a battery, or a fuel cell. In an embodiment, the portable and chargeable energy storage device may include a rechargeable battery, or a rechargeable fuel cell. In an embodiment, the portable and chargeable energy storage device may be substantially similar to the portable energy storage aspect of the portable energy source 110 described in conjunction with FIG. 1. In an embodiment, a rechargeable and portable fuel cell embodiment of the portable and chargeable energy storage device is described by U.S. Patent Application Pub. No. 20080145737, *Rechargeable fuel cell system*, by J. Cai et al. In an embodiment, a rechargeable and portable fuel cell embodiment of the portable and chargeable energy storage device is described by the E-cell system of E-Village, Grand Rapids, Mich., (available at http://www.notabattery.com (last accessed Jul. 24, 2009)). In an embodiment, the portable and chargeable power-output device includes a portable and chargeable power-output device configured to be usable after sterilization. In an embodiment, the portable and chargeable power-output device includes a sterilized portable and chargeable power-output device.

The system 1701 includes a portable power-output device configured to interact with the power-receiving device 1232 connected to the handheld medical device 130. An embodiment of the portable power-output device is illustrated by the portable power-output device 1220 described in conjunction with FIG. 22. The portable power-output device is also configured to be carried by the health care provider 102 proximate to a third body portion 1708 of the health care provider. If interacting, a third electrical or radiant power is transferred from the portable power-output device to the power-receiving device. In an embodiment, the third body portion may be substantially similar to the second body portion 808 described in conjunction with FIG. 16.

The system includes 1701 a first connective structure 1742 configured to transfer the first electrical or radiant power between the portable power receiver 1280A and the portable and chargeable energy storage device 1710, and configured to be carried by the health care provider 102. In an embodiment, the first connective structure 1742 may be substantially similar to the connective structure 140 described in conjunction with FIG. 1.

In an embodiment of the system 1701, the second electrical or radiant power includes a parameter substantially similar to a parameter of the first electrical or radiant power. In an embodiment. In an embodiment, a voltage, current, waveform, frequency, or reactive component parameter of the second electrical or radiant power is substantially similar to a corresponding voltage, current, waveform, frequency, or reactive component parameter of the first electrical or radiant power. In an embodiment, the second electrical or radiant power includes a parameter substantially different from a parameter of the first electrical or radiant power. In an embodiment, a voltage, current, waveform, frequency, or reactive component parameter of the second electrical or radiant power is substantially different than a corresponding voltage, current, waveform, frequency, or reactive component parameter of the first electrical or radiant power. In an embodiment, the second electrical or radiant power is derived from the first electrical or radiant power. In an embodiment, the third electrical or radiant power includes a parameter substantially similar to a parameter of the second electrical or radiant power. In an embodiment, the third electrical or radiant power includes a parameter substantially different from a parameter of the second electrical or radiant power. In an embodiment, the third electrical or radiant power is derived from the second electrical or radiant power.

In an embodiment, the portable and chargeable energy storage device 1710 includes a portable and chargeable energy storage device configured to store energy derived from the first electrical or radiant power, to supply a second electrical or radiant power, and configured to be carried proximate to a second body portion 1706 of the health care provider 102. In an embodiment, the portable and chargeable energy storage device 1710 includes a rechargeable and portable energy storage device configured to store energy derived from the first electrical or radiant power, to supply a second electrical or radiant power, and configured to be carried proximate to a second body portion of the health care provider. In an embodiment, the portable and chargeable energy storage device includes a refillable portable and chargeable energy storage device configured to store energy derived from the first electrical or radiant power, to supply a second electrical or radiant power, and configured to be carried proximate to a second body portion of the health care provider. In an embodiment, the portable and chargeable energy storage device includes a first portable and chargeable energy storage device portion 1712 and a second portable and chargeable energy storage device portion 1714.

In an embodiment, the portable power-output device 1220 includes a power-output connector configured to releasably couple with a power-receiving connector 1232 connected to the handheld medical device 130, and configured to be carried proximate to the third body portion 1708 of the health care provider. If coupled, the power-output connector and the power-receiving connector are operable to transfer a third electrical or radiant power. In an embodiment, the power-output connector is substantially similar to the power-output connector 120 described in conjunction with FIG. 1. In an embodiment, the portable power-output device includes portable power transmitter configured to wirelessly transfer a third electrical or radiant power to a wireless power receiver connected to a handheld medical device, and, configured to be carried by the health care provider proximate to a third body portion of the health care provider. In an embodiment, the portable power transmitter may be substantially similar to the portable power transmitter 820, and the wireless power receiver may be substantially similar to the wireless power receiver 832, both described in conjunction with FIG. 16.

In an embodiment of the system 1701, the first body portion 1206A.1 of the health care 102 provider is substantially similar to the second body portion 1706 of the health care provider. In an embodiment, the first body portion of the health care provider is not the same as the second body portion of the health care provider. In an embodiment, the third body portion 1708 of the health care provider is substantially similar to the second body portion of the health care provider. In an embodiment, the third body portion of the health care provider is substantially different than the second body portion of the health care provider.

In an embodiment, the system 1701 includes a second connective structure 1740 configured to transfer the second electrical or radiant power between the portable and chargeable energy storage device 1710 and the portable power-output device 1220, and configured to be carried by the health care provider 102. In an embodiment, the second connective structure 1740 may be substantially similar to the connective structure 140 described in conjunction with FIG. 1. In an embodiment, the system includes the controller 1246 operable to manage a parameter of the second electrical or radiant power supplied by the portable and chargeable energy storage device, and to be wearable by the health care provider. In an embodiment, the portable and chargeable energy storage device includes the continuity controller 116. In an embodiment, the portable and chargeable energy storage device includes the power transmitter 818.

FIG. 30 also illustrates an alternative example embodiment of the system 1701. The alternative embodiment of the system includes a portable power receiver, illustrated as the portable power receiver 1280A. The portable power receiver is configured to wirelessly receive a first electrical or radiant power from the wireless power transmitter source, illustrated as the wireless power transmitter source 1210.1. In an embodiment, the portable power receiver is configured to be carried proximate to the first body portion 1704 of the health care provider 102. The alternative embodiment of the system includes a first carrier, illustrated as the first carrier 1452, configured to hold the portable power receiver, and to be physically associatable with the first body portion of the health care provider.

The alternative embodiment includes a portable and chargeable energy storage device configured to store energy derived from the first electrical or radiant power, to supply a second electrical or radiant power. The portable and chargeable energy storage device is illustrated as the portable and chargeable energy storage device 1710. The alternative embodiment of the system includes first connective structure configured to transfer the first electrical or radiant power between the portable power receiver and the portable and chargeable energy storage device. The first connective structure is illustrated as the first connective structure 1742. The alternative embodiment of the system includes a second carrier configured to hold the portable and chargeable energy storage device, and to be physically associatable with a second body portion of the health care provider. The second carrier is illustrated as the second carrier 1752. In an embodiment, the second carrier 1752 may be substantially similar to the first carrier 452 described in conjunction with FIG. 8, or the first carrier 456 described in conjunction with FIG. 9.

The alternative embodiment also includes a portable power-output device, illustrated as the portable power-output device 1220, configured to interact with a power-receiving device, illustrated as the power-receiving device 1232, connected to the handheld medical device 130. The portable power-output device is configured to be carried by the health care provider 102 proximate to a third body portion of the health care provider. If interacting, if interacting, a third electrical or radiant power is transferred from the power-output device to the power-receiving device. The third body portion of the health care provider is illustrated as the third body portion 1708. In an embodiment, the third body portion may be substantially similar to the second body portion 808 described in conjunction with FIG. 16.

The alternative embodiment of the system 1701 includes a third carrier configured to hold the portable power-output device, and to be physically associatable with the third body portion of the health care provider. The alternative embodiment of the system includes a second connective structure configured to transfer the second electrical or radiant power between the portable and chargeable energy storage device and the power-receiving device, and configured to be carried by the health care provider.

FIG. 31 illustrates an example operational flow 1800. After a start operation, the operational flow includes a first carrying operation 1810. The first carrying operation includes carrying proximate to a first body portion of a health care provider a power'receiver configured to wirelessly receive a first electrical or radiant power from a wireless power transmitter source. In an embodiment, the first carrying operation may be implemented by the health care provider 102 wearing the portable power receiver 1280A described in conjunction with FIG. 30.

A second carrying operation 1820 includes carrying proximate to a second body portion of the health care provider a chargeable energy storage device configured to store energy derived from the first electrical or radiant power, and to supply a second electrical or radiant power. In an embodiment, the second carrying operation may be implemented by the health care 102 provider wearing the portable and chargeable energy storage device 1710 described in conjunction with FIG. 30. A third carrying operation 1830 includes carrying a first connective structure configured to transfer the first electrical or radiant power between the portable power receiver and the chargeable energy storage device. In an embodiment, the third carrying operation may be implemented by the health care provider 102 wearing the first connective structure 1742 described in conjunction with FIG. 30.

A fourth carrying operation 1840 includes carrying a power-output device configured to interact with a power-receiving device connected to a handheld medical device. If interacting, the second electrical or radiant power is transferred from the portable power-output device to the power-receiving device. In an embodiment, the fourth carrying operation may be implemented using the portable power-output device described in conjunction with FIG. 30, and illustrated as the portable power-output device 1220. A commence operation 1850 includes activating the handheld medical device with the second electrical or radiant power. The commence operation may be implemented by the health care provider 102 or another health care provider (not shown) switching on the handheld medical device 130 illustrated in FIG. 30. The operational flow includes an end operation.

FIG. 32 illustrates an alternative embodiment of the operation flow 1800 described in conjunction with FIG. 31. In an embodiment, the operational flow may include a first powering-up operation 1860. The first powering-up operation includes activating a wireless transfer of the first electrical or radiant power from the wireless power transmitter source to the portable power receiver. The first powering-up operation may be implemented in the embodiment illustrated in FIG. 30 by the health care provider 102 moving their foot that includes the first body portion 1206A.1 and that carries the portable power receiver 1280A within a substantially effective wireless power transfer range to the wireless power transmitter source 1210.1. In an embodiment, the operational flow includes a second powering up operation 1880. The second powering-up operation includes activating the interacting of the portable power-output device and the power-receiving device connected to a handheld medical device. In an embodiment, the second powering-up operation may be implemented by the health care provider bringing proximate the portable power transmitter and the wireless power receiver, or by the health care provider gripping the handheld medical device. In an embodiment, the operational flow includes a fourth carrying operation 1870. The fourth carrying operation includes carrying a second connective structure configured to transfer the second electrical or radiant power between the chargeable energy storage device and the power-output device.

In an embodiment, the fourth carrying operation 1840 includes carrying proximate to a third body portion of the health care provider a power-output device configured to interact with a power-receiving device connected to a handheld medical device. In an embodiment, the commence operation 1850 includes activating the handheld medical device with the third electrical or radiant power. In an embodiment, the commence operation includes activating the handheld medical device with a fourth electrical or radiant power derived from the third electrical or radiant power.

In an embodiment, the first powering-up operation 1860 includes aligning the portable power transmitter and the wireless power receiver to provide a wireless transfer of the first electrical or radiant power from the wireless power transmitter source to the power receiver. In an embodiment, the second powering up operation 1880 includes the health care provider grasping the handheld medical device. In an embodiment, the second powering up operation includes initiating the interacting of the power-output device and the power-receiving device connected to a handheld medical device. In an embodiment, the commence operation may includes at least one additional operation, such as an operation 1852 (not shown). The operation 1852 includes activating the handheld medical device with the electrical or radiant power.

FIG. 33 illustrates an example system 1900. The system includes means 1910 for wirelessly receiving a first electrical or radiant power from a wireless power transmitter source. The means for wirelessly receiving a first electrical or radiant power is configured to be wearable proximate to a first body portion of a health care provider. The system also includes means 1920 for storing energy derived from the first electrical or radiant power, and for supplying a second electrical or radiant power. The means for storing energy is configured to be wearable proximate to a second body portion of the health care provider. The system further includes means 1930 for interacting with a power-receiving device connected to a handheld medical device. If interacting, a third electrical or radiant power is transferred from the portable means for interacting to the power-receiving device. The means for interacting with a power-receiving device is configured to be wearable proximate to a third body portion of the health care provider.

In an embodiment, the means 1930 includes means 1932 for releasably coupling the second electrical or radiant power with a power-receiving connector connected to a handheld medical device. If coupled, a third electrical or radiant power is transferred from the means for interacting with a power-receiving device to the power-receiving device. In an embodiment, the means 1930 includes means 1934 for wirelessly transferring the third electrical or radiant power to a wireless power receiver connected to a handheld medical device.

Figure 34:
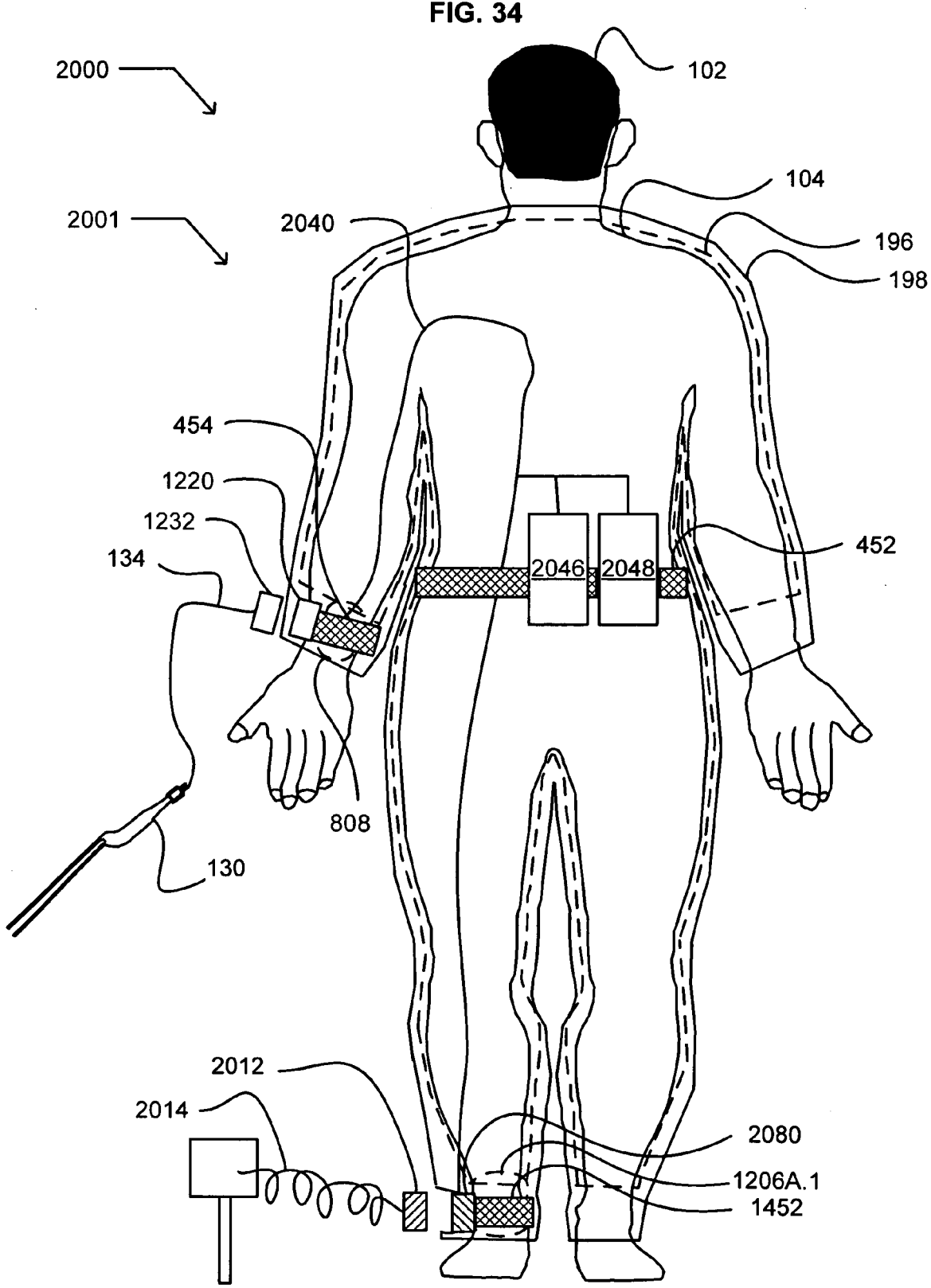
FIG. 34 illustrates an example environment in which an embodiment may be implemented.

FIG. 34 illustrates an example environment 2000. The environment includes the health care provider 102, the handheld medical device 130, and a system 2001. The system includes a power-receiving connector 2080. The power-receiving connector is configured to be usable after sterilization, and to releasably couple with a power-source connector 2012. The power-receiving connector is also configured to be carried by a health care provider proximate to a first body portion of the health care provider, illustrated as the first body portion 1206A.1 of the health care provider 102. If coupled, the power-receiving connector is operable to receive an electrical or radiant power from the power-source connector. In an embodiment, the power-source connector supplied with electrical or radiant power. In an embodiment, the electrical or radiant power is supplied by an energy source (not shown). In an embodiment, the supplied electrical or radiant power includes commonly available 120VAC or 240VAC electrical power supplied by an electrical grid. In another embodiment, the supplied electrical or radiant power includes a specialized electrical power. For example, the specialized electrical power may include an electrical power configured for the handheld medical device. In an embodiment, the power-source connector may include a stationary or a portable power-source connector. In an embodiment, the power-source connector may include a common wall outlet power-source connector.

The system 2001 also includes a power-output device 1220 configured to be usable after sterilization, to interact with a power-receiving device 1232 connected to the handheld medical device 130, and configured to be carried by the health care provider proximate to a second body portion of the health care provider, illustrated as the second body portion 808 of the health care provider 102. If interacting, the received electrical or radiant power is transferred from the power-output device to the power-receiving device. The system further includes a wearable connective structure 2040 configured to be usable after sterilization, and to transfer the received electrical or radiant power from the power-receiving connector to the power-output device. In an embodiment, the connective structure may be substantially similar to the connective structure 140 described in conjunction with FIG. 1.

In an embodiment, the system 2001 includes a first carrier, illustrated as the first carrier 1452, configured to hold the power-receiving connector 2008, and to be physically associatable with the first body portion of the health care provider 102, illustrated as the first body portion 1206A.1. In an embodiment, the system includes the second carrier, illustrated as the second carrier 454, configured to hold the power-output device 2020, and to be physically associatable with the second body portion of the health care provider, illustrated as the second body portion 808.

In an embodiment, the power-receiving connector 2080 includes a power-receiving connector having a body-mounting portion (not shown) configured to be carried by the health care provider 102 proximate to a first body portion 1206A.1 of the health care provider. The power-receiving connection is also configured to be usable after sterilization and to releasably couple with the power-source connector 2012. In an embodiment, the power-receiving connector includes a power-receiving connector having a clothing-engagement portion (not shown) configured to be carried by an article of clothing worn by a health care provider proximate to a first body portion of the health care provider. The power-receiving connection is also configured to be usable after sterilization and to releasably couple with a power-source connector. In an embodiment, the power-receiving connector includes a sterilized power-receiving connector.

In an embodiment, the power-output device 1220 includes a power-output device having a body-mounting portion (not shown) configured to be carried by a health care provider proximate to a second body portion 808 of the health care provider 102. The power-output device is also configured to be usable after sterilization, and to interact with the power-receiving device 1232 connected to the handheld medical device 130. If interacting, the received electrical or radiant power is transferred from the power-output device to the power-receiving device. In an embodiment, power-output device includes a power-output device having a clothing-engagement portion (not shown) configured to engage an article of clothing worn by a health care provider proximate to a second body portion of the health care provider. In an embodiment, power-output device includes a sterilized power-output device.

In an embodiment, the power-output device 1220 includes a power-output connector configured to be usable after exposure to surgical sterilization, to releasably couple with a power-receiving device connected to a handheld medical device 130. The power-output connector is also configured to be carried by the health care 102 provider proximate to a second body portion 808 of the health care provider. If coupled, the electrical or radiant power is transferred from the power-output device to the power-receiving device. In an embodiment, the power-output connector configured to releasably couple with a power-receiving connector is substantially similar to the power-output connector 120 configured to releasably couple with the power-receiving connector 132 described in conjunction with FIG. 1. In an embodiment, the power-output device includes a power transmitter configured to be usable sterilization, to wirelessly transfer the electrical or radiant power to a wireless power receiver connected to a handheld medical device, and configured to be carried by the health care provider proximate to a second body portion of the health care provider. In an embodiment, the power transmitter and the wireless power receiver are substantially similar to the portable power transmitter 1220 and the wireless power receiver 1232 described in conjunction with FIG. 22.

In an embodiment, the system 2001 includes another power-output device (not shown) configured to interact with another power-receiving device connected to another handheld medical device (not show). The another power-output device is further configured to be carried by the health care provider 102. If interacting, the another power-output device and the another power-receiving device are operable to transfer the supplied electrical or radiant power. FIG. 8 illustrates an example of a system having a power-output device and another power-output device, illustrated as the power connector 120 and the second power connector 420B. In an embodiment, the second carrier 454 configured to hold the power-output device 2020 includes a second carrier configured to hold the power-output device and the another power-output device, and to be physically associatable with the second body portion 808 of the health care provider 102. In an embodiment, the system includes a third carrier (not shown) configured to hold the another portable power-output device (not shown), and to be physically associatable with a third body portion (not shown) of the health care provider. In an embodiment, the third carrier includes a third carrier attachable to health care provider, or to clothing wearable by the health care provider, or integrable with clothing wearable by the health care provider.

In an embodiment, the connective structure 2040 includes a connective structure configured to transfer the received electrical or radiant power from the power-receiving connector 2080 to the power-output device 1220, and to be worn at least partially inside the surgical barrier 198. In an embodiment, the connective structure includes a connective structure configured to transfer the received electrical or radiant power from the power-receiving connector to the power-output device, and to be worn at least partially inside an article of clothing or a sterile barrier. In an embodiment, the connective structure includes a connective structure configured to transfer the received electrical or radiant power from the power-receiving connector to the power-output device, and having two or more interconnectable portions. In an embodiment, the connective structure a connective structure configured to transfer the received electrical or radiant power from the power-receiving connector to the power-output device, and structurally integrated with an article of clothing.

In an embodiment, the system 2001 includes a fourth carrier (not shown) configured to hold the connective structure 2040, and to be physically associatable with a fourth body portion (not shown) of the health care provider 102.

In an embodiment, the system 2001 includes a controller 2046 configured to manage a parameter of electrical or radiant power received by the power-receiving connector, and to be wearable by the health care provider 102. In an embodiment, the controller may be substantially similar to the controller 146 described in conjunction with FIG. 1. In an embodiment, the system includes a power converter 2048 operable to convert a form of electrical or radiant power received by the power-receiving connector to another form of electrical or radiant power. In an embodiment, the power converter may be substantially similar to the power converter 148 described in conjunction with FIG. 1.

In an embodiment, the system 2001 includes a portable and chargeable energy storage device configured to store energy derived from the supplied electrical or radiant power, to supply another electrical or radiant power, and configured to be carried proximate to a fifth body portion (not shown) of the health care provider 102. In an embodiment, the portable and chargeable energy storage device may be substantially similar to the portable and chargeable energy storage device 1710 carried proximate to the second body portion 1706 as described in conjunction with FIG. 30.

FIG. 35 illustrates an example operational flow 2100. After a start operation, the operational flow includes a first carrying operation 2110. The first carrying operation includes carrying proximate to a first body portion of a health care provider a power-receiving connector, the power receiving connector configured to be usable after sterilization, and to releasably couple with a power-source connector supplied with electrical or radiant power. If coupled, the power-receiving connector is operable to receive an electrical or radiant power from the power-source connector. In an embodiment, the first carrying operation may be implemented using the sterilizable and portable power-receiving connector 2080 described in conjunction with FIG. 34. A second carrying operation 2130 includes carrying proximate to a second body portion of the health care provider a power-output device configured to be usable after sterilization, and to interact with a power-receiving device connected to a handheld medical device. If interacting, the received electrical or radiant power is transferred from the power-output device to the power-receiving device. In an embodiment, the second carrying operation may be implemented using the sterilizable power-output device 1220 described in conjunction with FIG. 34. A third carrying operation 2140 includes carrying a connective structure configured to be usable after sterilization, and to transfer the received electrical or radiant power from the power-receiving connector to the power-output device. In an embodiment, the third carrying operation may be implemented using the connective structure 2040 described in conjunction with FIG. 34. A commence operation 2160 includes activating the handheld medical device with the supplied electrical or radiant power. The commence operation may be implemented by the health care provider 102 or another health care provider (not shown) switching on the handheld medical device 130 of FIG. 1. The operational-flow includes an end operation.

FIG. 36 illustrates an alternative embodiment of the operational flow 2100 described in FIG. 35. In an embodiment, the operational flow 2100 may include an additional operation, such as a link up operation 2120. The link up operation includes coupling the power-receiving connector and the power-source connector. In an embodiment, the link up operation may be implemented by the health care provider 102 coupling or plugging the sterilizable power-receiving connector 2080 into the power-source connector 2012 described in conjunction with FIG. 35. In an embodiment, the operational flow 2100 may include an additional operation, such as a power up operation 2150. The power up operation includes activating an interaction of the power-output device and the power-receiving device connected to a handheld medical device. In an embodiment, the power up operation may include the health care provider connecting the sterilizable power-output device 1220 and the power-receiving device 1232 described in conjunction with FIG. 35. In an embodiment, the power up operation may include the health care provider bringing proximate the sterilizable power-output device and the power-receiving device, or by the health care provider gripping the handheld medical device. In an embodiment, the operational flow 2100 may include an additional operation, such an operation 2170. The operational flow 2170 includes carrying a controller configured to regulate a parameter of the electrical or radiant power received by the power-receiving connector.

FIG. 37 illustrates another alternative embodiment of the operational flow 2100 of FIG. 36. An alternative embodiment of the power up operation 2150 may include an operation 2152 or an operation 2154. The operation 2152 includes connecting the power-output device and the power-receiving device. The operation 2154 includes coupling the power-output device and the power-receiving device.

FIG. 38 illustrates an example system 2200 configured to be usable after sterilization. The system includes means 2210 for releasably coupling with a power-source connector supplied with electrical or radiant power. If coupled, the means for releasably coupling is operable to receive an electrical or radiant power from the power-source connector. The system also includes means 2220 for wearing proximate to a first body portion of a health care provider the means for releasably coupling with a power-source connector. The system further includes means 2230 for interacting with a power-receiving device connected to a handheld medical device. If interacting, the received electrical or radiant power is transferred from the means for interacting to the power-receiving device. The system includes means 2240 for wearing proximate to a second body portion of the health care provider the means for interacting with a power-receiving device. The system also includes means 2250 for transferring the received electrical or radiant power between the means for releasably coupling with a power-source connector and the means for interacting with a power-receiving device.

FIG. 39 illustrates an example environment 2300. The environment includes a person 2302 having a body 2304, a powerable handheld device 2330, and a wearable power supply system 2301. The system includes the portable energy source 110 configured to supply electrical or radiant power, and configured to be carried proximate to a first body portion 106 of the person 2302. The system includes the portable power-output device 1220 configured to interact with a power-receiving device 1232 connected to the powerable handheld device 2330, and configured to be carried proximate to a second body portion 108 at a position distal of a shoulder joint of the person 2302. If interacting, the supplied electrical or radiant power is transferred from the portable power-output device to the power-receiving device. In an embodiment, the powerable handheld device may include a powerable handheld tool. The system includes the connective structure 140 configured to transfer the supplied electrical or radiant power between the portable energy source and the power-output device.

In an embodiment, the system 2301 includes the first carrier 452 configured to hold the portable energy source 110, and to be physically associatable with a first body portion 106 of the person 2302. In an embodiment, the system also includes the second carrier 454 configured to hold the portable power-output device, and to be physically associatable with the second body portion 108 at a position distal of a shoulder joint of the person.

In an embodiment, the portable energy source 110 configured to supply electrical or radiant power includes a portable energy source having a body-mounting portion configured to be carried by a first body portion of a health care provider and configured to supply electrical or radiant power, and configured to be carried proximate to a first body portion of a person. In an embodiment, the portable energy source includes a portable energy source configured to generate electrical or radiant power, and configured to be carried proximate to a first body portion of a person.

In an embodiment, the portable power-output device 1220 includes a power-output connector configured to releasably couple with a power-receiving connector 1232 connected to the powerable handheld device 2330, and configured to be carried by the person 2302 proximate to a second body portion at a position distal of a shoulder joint of the person. If coupled, the power-output connector and the power-receiving connector are operable to transfer the electrical or radiant power. In an embodiment, portable power-output device includes a portable power transmitter configured to wirelessly transfer electrical or radiant power to a wireless power receiver connected to a powerable handheld device, and configured to be carried by the person proximate to a second body portion at a position distal of a shoulder joint of the person. The transferred electrical or radiant power derived from the electrical or radiant power supplied by the portable energy source.

In an embodiment, the system 2301 includes another portable power-output device (not shown) configured to interact with another power-receiving device (not shown) connected to another powerable handheld device (not shown), and configured to be carried by the person 2302. If interacting, the another portable power-output device and the another power-receiving device are operable to transfer electrical or radiant power. In an embodiment, the second carrier 454 includes a second carrier configured to hold the portable power-output device 1220 and the another portable power-output device (not shown), and to be physically associatable with the second body portion 108 at a position distal of a shoulder joint of the person. In an embodiment, the system includes a third carrier (not shown) configured to hold the another portable power-output device, and to be physically associatable with a third body portion at a position distal of a shoulder joint of the person. In an embodiment, the third carrier includes a third carrier that is at least one of attachable the person, or to clothing wearable by the person, or integrable with clothing wearable by the person. In an embodiment, the system includes a fourth carrier (not shown) configured to hold the connective structure 140, and to be physically associatable with the person.

In an embodiment, the connective structure 140 includes a connective system including a wireless transmitter (not shown) coupled with the portable energy source 110 and a wireless receiver (not shown) coupled with the power-output device 1220. The wireless transmitter and the wireless receiver are configured in combination to transfer power between the portable energy source and the power-output device.

In an embodiment, the system 2301 includes the power converter 148 operable to convert a form of electrical or radiant power supplied by the portable energy source to another form of electrical or radiant power, and to be wearable by the person. In an embodiment, the system includes the controller 146 configured to regulate a parameter of the electrical or radiant power supplied by the portable energy source, and to be wearable by the person.

FIG. 40 illustrates an example operational flow 2400. After a start operation, the operational flow includes a first carrying operation 2410. The first carrying operation includes carrying proximate to a first body portion of a person a portable energy source supplying electrical or radiant power. In an embodiment, the first carrying operation may be implemented by the person 2302 wearing the first carrier 452 holding the portable energy source 110 as described in conjunction with FIG. 8 or 39. A second carrying operation 2420 includes carrying proximate to a second body portion at a position distal of a shoulder joint of the person a portable power-output device configured to interact with a power-receiving device connected to a powerable handheld device. If interacting, the supplied electrical or radiant power is transferred from the portable power-output device to the power-receiving device. In an embodiment, the second carrying operation may be implemented by the person carrying the second carrier 454 holding the portable power-output device 1220 as described in conjunction with FIG. 26 or 39. A third carrying operation 2430 includes carrying proximate to the body of the person a connective structure configured to transfer the supplied electrical or radiant power between the portable energy source and the portable power-output device. In an embodiment, the third carrying operation may be implemented by the person carrying the connective structure 140 described in conjunction with FIG. 1. A power up operation 2440 includes activating the interacting of the portable power-output device and the power-receiving device connected to a powerable handheld device. In an embodiment, the powering up operation may include the person connecting the sterilizable power-output device 1220 and the power-receiving device 1232 described in conjunction with FIG. 39. In an embodiment, the powering up operation may include the person bringing proximate the sterilizable power-output device and the power-receiving device, or by the person gripping the handheld medical device. A commence operation 2450 includes activating the powerable handheld device with the supplied electrical or radiant power. The commence operation may be implemented by the person or another person (not shown) switching on the powerable handheld device 2330 of FIG. 39. The operational flow includes an end operation.

FIG. 41 illustrates an example system 2500. The system includes portable means 2510 for supplying electrical or radiant power. The system also includes means 2520 for wearing proximate to a first body portion of a person the portable means for supplying electrical or radiant power. The system further includes portable means 2530 for interacting with a compatible power-receiving device connected to a powerable handheld device. If interacting, the portable means for interacting with a compatible power-receiving device and the power-receiving device are operable to transfer electrical or radiant power supplied by the portable means for supplying electrical or radiant power. The system includes means 2540 for wearing proximate to a second body portion of the person the portable means for interacting with a compatible power-receiving device connected to a powerable handheld device. The system also includes means 2550 transferring the supplied electrical or radiant power from the portable means for supplying electrical or radiant power to the portable means for interacting. In an embodiment, the system further includes means 2560 for wearing proximate to the body of the person the means for conducting the electrical or radiant power supplied by the portable means for supplying electrical or radiant power.

In some embodiments, one or more of the carriers described herein, such as for example the carrier 452 or the carrier 454 described in FIG. 8 may include a carrier that is removable or removably associatable with the body 104 of the health care provider 102 or the body 2304 of the person 2302.

In some embodiments, "configured" includes at least one of designed, set up, shaped, implemented, constructed, or adapted for at least one of a particular purpose, application, or function.

All references cited herein are hereby incorporated by reference in their entirety or to the extent their subject matter is not otherwise inconsistent herewith.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A or B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    a power-receiving connector configured to be usable after sterilization, to releasably couple with a power-source connector, and configured to be carried by a health care provider proximate to a first body portion of the health care provider, wherein if coupled, the power-receiving connector is operable to receive an electrical or radiant power from the power-source connector;
    a power-output device configured to be usable after sterilization, to interact with a power-receiving device connected to a handheld medical device, and configured to be carried by the health care provider proximate to a second body portion of the health care provider, wherein if interacting, the received electrical or radiant power is transferred from the power-output device to the power-receiving device; and
    a wearable connective structure configured to be usable after sterilization, and to transfer the received electrical or radiant power from the power-receiving connector to the power-output device.

2. The system of claim 1, wherein the power-receiving connector includes:
    a power-receiving connector having a body-mounting portion configured to be carried by a health care provider proximate to a first body portion of the health care provider, and configured to be usable after sterilization, and to releasably couple with a power-source connector, wherein if coupled, the power-receiving connector is operable to receive an electrical or radiant power from the power-source connector.

3. The system of claim 1, wherein the power-receiving connector includes:
    a power-receiving connector having a clothing-engagement portion configured to be carried by an article of clothing worn by a health care provider proximate to a first body portion of the health care provider, and configured to be usable after sterilization and to releasably couple with a power-source connector, wherein if coupled, the power-receiving connector is operable to receive an electrical or radiant power from the power-source connector.

4. The system of claim 1, wherein the power-receiving connector includes:
    a power-receiving connector configured to be usable after an exposure to a surgical sterilization and to releasably couple with a power-source connector, the power-receiving connector further configured to be carried by a health care provider proximate to a first leg, thigh, calf, foot, arm, forearm, wrist, hand, or finger portion of the health care provider, wherein if coupled, the power-receiving connector and the power-source connector are operable to transfer an electrical or radiant power.

5. The system of claim 1, wherein the power-receiving connector includes a sterilized power-receiving connector.

6. The system of claim 1, wherein the power-receiving connector includes a single-use sterilized power-receiving connector.

7. The system of claim 1, wherein the power-receiving connector includes a power-receiving connector configured to withstand an exposure to a surgical sterilization condition and to be usable after the exposure to the surgical sterilization condition.

8. The system of claim 1, wherein the power-receiving connector includes a power-receiving connector configured to be usable after an exposure to autoclave or chemiclave sterilization, and includes a medical grade plastic, stainless steel, or titanium, or an alloy thereof.

9. The system of claim 1, wherein the power-output device includes:
a power-output device having a body-mounting portion configured to be carried by a health care provider proximate to a second body portion of the health care provider, and configured to be usable after sterilization, and to interact with a power-receiving device connected to a handheld medical device, wherein if interacting, the received electrical or radiant power is transferred from the power-output device to the power-receiving device.

10. The system of claim 1, wherein the power-output device includes:
a power-output device having a clothing-engagement portion configured to be engage an article of clothing worn by a health care provider proximate to a second body portion of the health care provider, and configured to be usable after sterilization, and to interact with a power-receiving device connected to a handheld medical device, wherein if interacting, the received electrical or radiant power is transferred from the power-output device to the power-receiving device.

11. The system of claim 1, wherein the power-output device includes:
a power-output device configured to be usable after an exposure to a surgical sterilization, to releasably couple with a power-receiving device connected to a handheld medical device, and configured to be carried by a health care provider proximate to a second body portion at a position distal of a shoulder joint of the health care provider, wherein if coupled, the received electrical or radiant power is transferred from the power-output device to the power-receiving device.

12. The system of claim 1, wherein the power-output device includes:
a power-output device configured to be usable after sterilization, to interact with a power-receiving device connected to a handheld medical device, and configured to be carried by a health care provider proximate to a leg, thigh, calf, foot, arm, forearm, wrist, hand, or finger portion of the health care provider, wherein if interacting, the received electrical or radiant power is transferred from the power-output device to the power-receiving device.

13. The system of claim 1, wherein the power-output device includes a sterilized power-output device.

14. The system of claim 1, wherein the power-output device includes a single-use sterilized power-output device.

15. The system of claim 1, wherein the power-output device includes a power-output device configured to withstand an exposure to a surgical sterilization condition and to be usable after the exposure to the surgical sterilization condition.

16. The system of claim 1, wherein the power-output device includes:
a power-output device configured to be usable after sterilization, to releasably couple with a power-source connector, to be carried proximate to a second body portion of the health care provider, and configured to be carried outside of a surgical barrier having an interior surface enclosing at least a portion of the body of the health care provider.

17. The system of claim 1, wherein the power-output device includes:
a first power-output device configured to be usable after sterilization and to releasably couple with a first power-receiving device connected to a first handheld medical device, and a second power-output device configured to be usable after sterilization and to releasably couple with an second power-receiving device connected to second handheld medical device, both the first power-output device and the second power-output device respectively configured to be carried by the health care provider proximate to the second body portion of the health care provider.

18. The system of claim 1, wherein the power-output device includes:
a first power-output device configured to be usable after sterilization, to releasably couple with a first power-receiving device connected to a first handheld medical device, and configured to be carried by the health care provider proximate to a second body portion of the health care provider, and a second power-output device configured to be usable after sterilization, to releasably couple with an second power-receiving device connected to second handheld medical device, and configured to be carried by the health care provider proximate to a third body portion of the health care provider.

19. The system of claim 1, wherein the power-output device includes:
a power-output connector configured to be usable after sterilization, to releasably couple with a power-receiving device connected to a handheld medical device, and configured to be carried by the health care provider proximate to a second body portion of the health care provider, wherein if coupled, the electrical or radiant power is transferred from the power-output device to the power-receiving device.

20. The system of claim 1, wherein the power-output device includes:
a power transmitter configured to be usable after sterilization, to wirelessly transfer the electrical or radiant power to a wireless power receiver connected to a handheld medical device, and configured to be carried by the health care provider proximate to a second body portion of the health care provider.

21. The system of claim 1, further comprising:
a first carrier configured to hold the power-receiving connector, and to be physically associatable with the first body portion of the health care provider.

22. The system of claim 21, wherein the first carrier includes:
a first carrier structurally integrated with the power-receiving connector, and having a body-mounting portion configured to be carried by the first body portion of the health care provider.

23. The system of claim 21, wherein the first carrier includes:
a first carrier configured to hold the power-receiving connector, and having a body-mounting portion configured to be carried by a first body portion of the health care provider.

24. The system of claim 21, wherein the first carrier includes:
a first carrier configured to be usable after sterilization, to hold the power-receiving connector, and to be associatable with the first body portion of the health care provider.

25. The system of claim 1, further comprising:
a second carrier configured to hold the power-output device, and to be physically associatable with the second body portion of the health care provider.

26. The system of claim 21, wherein the second carrier includes:
a second carrier configured to hold the power-output device substantially inside a sterile barrier, and to be physically associatable with a second body portion of the health care provider.

27. The system of claim 21, wherein the second carrier includes:
a second carrier having at least one of a positioning strap, belt, holder, harness, or material configured to carry the power-output device and to be associatable with the second body portion of the health care provider.

28. The system of claim 21, wherein the second carrier includes:
a second carrier configured to be usable after sterilization, to hold the power-output device, and to be associatable with the second body portion of the health care provider.

29. The system of claim 1, further comprising:
another power-output device configured to be usable after sterilization, to interact with another power-receiving device connected to another handheld medical device, and configured to be carried by the health care provider, wherein if interacting, the another power-output device and the another power-receiving device are operable to transfer the received electrical or radiant power.

30. The system of claim 29, further comprising:
a second carrier configured to hold the power-output device and the another power-output device, and to be physically associatable with a second body portion of the health care provider.

31. The system of claim 29, further comprising:
a third carrier configured to hold the another power-output device, and to be physically associatable with a third body portion of the health care provider.

32. The system of claim 1, wherein the wearable connective structure includes:
a wearable electrical conductor configured to be usable after sterilization, and to transfer the received electrical or radiant power between the power-receiving connector and the power-output device.

33. The system of claim 1, wherein the wearable connective structure includes:
a wearable electromagnetic wave guide or optical connective structure configured to be usable after sterilization, and to transfer the received electrical or radiant power between the power-receiving connector and the power-output device.

34. The system of claim 1, wherein the wearable connective structure includes:
a wearable acoustic wave guide connective structure configured to be usable sterilization, and to transfer acoustic power between the power-receiving connector and the power-output device, the transferred acoustic power derived from the received electrical or radiant power.

35. The system of claim 1, wherein the wearable connective structure includes:
a wearable connective structure configured to be usable after sterilization, to transfer the received electrical or radiant power between the power-receiving connector and the power-output device, and for an association with an article of attire wearable by the health care provider.

36. The system of claim 1, wherein the wearable connective structure includes:
a wearable system configured to be usable after sterilization, the wearable system including a wireless transmitter coupled with the power-receiving connector and a wireless receiver coupled with the power-output device, the wireless transmitter and the wireless receiver configured in combination to transfer electrical or radiant power between the power-receiving connector and the power-output device, the transferred electrical or radiant power derived from the received electrical or radiant power.

37. The system of claim 1, further comprising:
a fourth carrier configured to hold the wearable connective structure, and to be physically associatable with a fourth body portion of the health care provider.

38. The system of claim 1, further comprising:
a controller configured to manage a parameter of electrical or radiant power received by the power-receiving connector, and to be wearable by the health care provider.

39. The system of claim 1, further comprising:
a power converter operable to convert a form of the electrical or radiant power received by the power-receiving connector to another form of electrical or radiant power available to the power-output device.

40. The system of claim 1, further comprising:
a portable and chargeable energy storage device configured to store energy derived from electrical or radiant power received by the power-receiving connector, to supply another electrical or radiant power, and configured to be carried by the health care provider proximate to a fifth body portion of the health care provider.

41. The system of claim 40, wherein the portable and chargeable energy storage device includes:
a portable and chargeable energy storage device configured to supply electrical power having a predetermined voltage, current, waveform, frequency, or reactive component.

42. The system of claim 40, wherein the portable and chargeable energy storage device includes:
a portable and chargeable energy storage device configured to supply electrical power having a user-selectable voltage, current, waveform, frequency, or reactive component.

43. The system of claim 40, wherein the portable and chargeable energy storage device includes:
a portable and chargeable energy storage device configured to store energy derived from electrical or radiant power wirelessly received by the power receiver, and to supply a second or radiant power, and having a body-mounting portion configured to be carried by a first body portion of a health care provider.

44. The system of claim 40, wherein the portable and chargeable energy storage device includes:

a portable and chargeable energy storage device configured to store energy derived from electrical or radiant power wirelessly received by the power receiver, and to supply a second or radiant power, and having a clothing-engagement portion configured to be carried by an article of clothing proximate to a first body portion of a health care provider.

45. A method comprising:

carrying proximate to a first body portion of a health care provider a power-receiving connector, the power receiving connector configured to be usable after sterilization, and to releasably couple with a power-source connector supplied with electrical or radiant power, wherein if coupled, the power-receiving connector is operable to receive an electrical or radiant power from the power-source connector;

carrying proximate to a second body portion of the health care provider a power-output device configured to be usable after sterilization, and to interact with a power-receiving device connected to a handheld medical device, wherein if interacting, the received electrical or radiant power is transferred from the power-output device to the power-receiving device;

carrying a connective structure configured to be usable after sterilization, and to transfer the received electrical or radiant power from the power-receiving connector to the power-output device; and activating the handheld medical device with the supplied electrical or radiant power.

46. The method of claim 45, further comprising:

coupling the power-receiving connector and the power-source connector.

47. The method of claim 45, further comprising:

activating an interaction of the power-output device and the power-receiving device connected to a handheld medical device.

48. The method of claim 47, wherein the activating an interaction of the power-output device and the power-receiving device connected to a handheld medical device includes:

connecting the power-output device and the power-receiving device.

49. The method of claim 47, wherein the activating an interaction of the power-output device and the power-receiving device connected to a handheld medical device includes:

coupling the power-output device and the power-receiving device.

50. The method of claim 45, further comprising:

carrying a controller configured to regulate a parameter of the electrical or radiant power received by the power-receiving connector.

51. A system configured to be usable after sterilization, the system comprising:

means for releasably coupling with a power-source connector supplied with electrical or radiant power, and wherein if coupled, the means for releasably coupling is operable to receive an electrical or radiant power from the power-source connector;

means for wearing proximate to a first body portion of a health care provider the means for releasably coupling with a power-source connector;

means for interacting with a power-receiving device connected to a handheld medical device, wherein if interacting, the received electrical or radiant power is transferred from the means for interacting to the power-receiving device;

means for wearing proximate to a second body portion of the health care provider the means for interacting with a power-receiving device;

means for transferring the received electrical or radiant power between the means for releasably coupling with a power-source connector and the means for interacting with a power-receiving device.

* * * * *